(12) United States Patent
Osumi et al.

(10) Patent No.: US 6,362,885 B1
(45) Date of Patent: Mar. 26, 2002

(54) METHOD OF DETERMINING THE FORMULATING RATIO OF A METALLIC OR PEARLESCENT PIGMENT TO A COLORANT OR THE FORMULATING AMOUNT OF A METALLIC OR PEARLESCENT PIGMENT IN THE COMPUTER-AIDED COLOR MATCHING OF A METALLIC OR PEARLESCENT PAINT

(75) Inventors: Masayuki Osumi, Okazaki; Shuhei Numata, Hirakata; Takao Asaba, Tokyo; Koichi Kuwano, Osaka, all of (JP)

(73) Assignees: Nippon Paint Co., Ltd., Osaka; Nisshimno Industries, Inc., Tokyo, both of (JP)

( * ) Notice: Subject to any disclaimer, the term of this patent is extended or adjusted under 35 U.S.C. 154(b) by 0 days.

(21) Appl. No.: 09/448,978

(22) Filed: Nov. 24, 1999

(51) Int. Cl.$^7$ .................................................. G01J 3/46
(52) U.S. Cl. ...................... 356/402; 356/408; 356/421; 356/422
(58) Field of Search ................................ 356/402, 405, 356/408, 421, 422, 423, 425

(56) References Cited

U.S. PATENT DOCUMENTS

| | | | |
|---|---|---|---|
| 3,916,168 A | * 10/1975 | McCarty et al. ............ | 356/176 |
| 4,887,906 A | * 12/1989 | Koehler ....................... | 356/402 |
| 5,115,874 A | * 5/1992 | Hayahara et al. ............. | 177/70 |
| 5,231,472 A | * 7/1993 | Marcus et al. ............... | 356/402 |
| 5,410,637 A | * 4/1995 | Kern et al. .................... | 395/61 |
| 5,590,251 A | * 12/1996 | Takagi ......................... | 395/131 |
| 5,668,633 A | * 9/1997 | Cheetam et al. ............. | 356/402 |
| 5,723,517 A | * 3/1998 | Campo et al. ............... | 523/303 |
| 5,740,079 A | * 4/1998 | Shigemori et al. .......... | 356/402 |
| 5,907,495 A | * 5/1999 | Snyder et al. ............... | 356/405 |
| 6,081,796 A | * 6/2000 | Takagi et al. .................. | 706/1 |

* cited by examiner

Primary Examiner—Frank G. Font
Assistant Examiner—Roy M. Punnoose
(74) Attorney, Agent, or Firm—O'Malveny & Myers LLP

(57) ABSTRACT

A method of determining the formulating ratio of metallic or pearlescent pigments to colorants for matching the color of a metallic or pearlescent coating to an target color wherein, the spectral reflectances of a plurality of samples varied in the formulation of colorants and metallic or pearlescent pigments are measured with a goniospectrophotometer and stored in a computer memory beforehand and, in performing a CCM using the stored data, reproduction spectral reflectances are calculated by reflecting the changes in spectral reflectance due to changes in the amount of the metallic or pearlescent pigments.

19 Claims, 64 Drawing Sheets

METHOD OF DETERMINING THE FORMULATING RATIO OF A METALLIC OR PEARLESCENT PIGMENT TO A COLORANT OR THE FORMULATING AMOUNT OF A METALLIC OR PEARLESCENT PIGMENT IN THE COMPUTER-AIDED COLOR MATCHING OF A METALLIC OR PEARLESCENT PAINT

TECHNICAL FIELD

The present invention relates to a computer-aided method for color matching or a computer color matching system (CCM system) which comprises computing the formulating amounts of one or a plurality of colorants and one or a plurality of effect materials like metallic or pearlescent pigments (briefly; metallic or pearlescent pigments) which are necessary for coloring a substrate surface to the same goniochromatism as a target color in the coating of a substrate with a coating composition containing metallic or pearlescent pigment (hereinafter a metallic or pearlescent coating composition) by a given application procedure for matching the metallic or pearlescent coating to the target color in goniochromatism. The metallic or pearlescent coating composition mentioned above means a coating composition containing one or a plurality of metallic and/or pearlescent pigments or said metallic pigments and/or pearlescent pigments plus one or a plurality of colorants.

PRIOR ART

In the color matching of a metallic or pearlescent coating composition, it is necessary to match it to a desired color sample (hereinafter referred to as sample color or target color) in goniochromatism. Goniochromatism is the term for the phenomenon whereby the color of a specimen depends on angular conditions of illumination and viewing and a special case of goniochromatism is the case in which the variation in appearance with angle is caused by a variation in the amount of light specularly reflected from the surface which appearance is called luster or briefly lightness flop. Goniochromatism that involves a variation of hue as well as lightness and saturation, thereby exhibiting a color variation with angle that is not perceived as luster, is called goniochromic or briefly hue or color flop. In certain cases, a coating composition must be formulated to reproduce the lightness flop and color flop of the target color according to a given coating thickness on a predetermined substrate using a predetermined coating procedure. In the color matching of a metallic or pearlescent coating composition, it is common practice to use a CCM system to compute the formulating amounts of colorants with respect to a metallic or pearlescent pigment component in a given formulating ratio. The commonly practiced CCM system employs prepared coated plates as base or reference data for evaluating the chromophoric activity of the colorant to be used for coloration of a substrate under a predetermined set of conditions, i.e. using a predetermined proportion of metallic or pearlescent pigment and a predetermined coating procedure. The commonly practiced CCM causes a computer to perform formulation computations using previously input spectral reflectance data of said coated plates.

In the conventional CCM system, the method in broad use comprises measuring the spectral reflectance of said target color, calculating the absorption coefficient and scattering coefficient in visible light from said spectral reflectance obtained from the colored plate as base data in accordance with the Kubelka-Munk optical density model for computing the predicted spectral reflectance of a given formulation of a plurality of colorants to be used for coloration and comparing the predicted spectral reflectance with the reflectance of the target color to find a colorant formulation conforming to the target color. In this comparison, if the difference between the target color and the predicted color exceeds a predetermined value, the colorant formulation is altered until it has come into a predetermined range and if the difference is found to be within the predetermined range, the result is used as the formulation value in actual formulation.

In the CCM of a metallic or pearlescent coating composition, the base data samples used are formulation samples comprising the respective chromatic colorants to be used and a metallic or pearlescent pigment for matching a target color. Using those data as reference data representing the chromaticity of the chromatic colorants with respect to the metallic or pearlescent pigment, the predicted reflectance that will be obtained on mixing a plurality of chromatic colorants with the metallic or pearlescent pigment is computed as follows. The spectral reflectances of the base data as measured beforehand are transformed to the optical density K/S, which is the ratio of the absorption coefficient K to the scattering coefficient S of the colored layer using the Kubelka-Munk equation and the optical density K/S is computed by the 2-constant method which is based on Duncan's theoretical expression of color mixing. This K/S is further transformed to reflectance to compute the formulating ratio of the colorants to the metallic or pearlescent pigment.

To improve the prediction accuracy in the above procedure, a transformation to ideal reflectance is performed using Sanderson's equation to correct for the influences of internal mirror reflection as well as the difference in refractive index at the boundary between the resin layer constituting the paint and the air layer on spectral reflectance measurement, then a color mixing computation is carried out. For matching a colorant formulation to the target color by adjusting the formulating ratio of the colorants, the computation according to the Newton-Raphson formula is repeated and for evaluating the chromaticity matching between the * target reflectance distribution and predicted reflectance distribution, the metameric method in which a convergence is sought by means of the Newton-Raphson formula while the difference between the target and predicted values is assessed by utilizing the chromaticity values. XYZ and L*a*b as calculated from reflectance, or the isomeric method in which a converging calculation is made while assessing the square sum of the difference between the target reflectance and the predicted reflectance.

Formulation of colorants matching a target color using this CCM system comprises a series of computations for finding the formulating values of said colorants under a specific set of conditions, such as a given coating thickness, a given substrate surface and other fixed conditions. On the other hand, the formulating amount of the metallic or pearlescent pigment for attaining the desired goniochromatism is determined by empirical judgment using the information available beforehand. Then, an actual coating composition is prepared according to the desired conditions and goniochromism of the target color sample so prepared is compared with that of the target color sample and, in addition, the luster of the color sample is compared with the desired luster. In the absence of sufficient agreement in goniochromism or in luster, the combination of colorants used for color matching and the kind and formulating amount of the metallic or pearlescent pigment are modified, and the CCM for correction is performed again, or the colorant formation and metallic or pearlescent pigment formulation that are not sufficiently matching are evaluated visually and empirically and adjusted against the empirical yardstick. This adjustment is repeated until sufficient matches have been obtained to the target hue and luster.

In the above prior art technology, the calculation means for finding the formulating values of the colorants and metallic or pearlescent pigment for realizing the desired goniochromatism has not been implemented in the CCM system and in order to arrive at a colorant and metallic or pearlescent pigment formulation giving a sufficient match to the desired hue and luster, the CCM must be repeated a plurality of times or the visual and empirical adjustment be made on a trial-and-error basis. This is because, in the matching to the desired hue and luster, the hue is not only influenced by the kinds of colorants but also by the formulating amount of the metallic or pearlescent pigment and the luster is influenced not only by the kind of metallic or pearlescent pigment but also by the colorant formulation and the coating thickness, thus necessitating it to compute the formulating ratio of the colorants to the metallic or pearlescent pigment taking such influences into account.

For the purpose of determining an adequate formulating ratio of colorants to metallic or pearlescent pigments or an adequate overall formulation, which will be faithful matching to the target color in both hue and luster, the conventional technology has to depend on many empirical judgments and it is extremely difficult even for a well experienced specialist to make accurate adjustments or perform a pertinent trial. Therefore, due to the relatively high number of trials and errors required to achieve the target colorant-metallic or pearlescent formulation, conventional color matching for coatings containing metallics and pearlescents requires much time and labor and is relatively expensive. Furthermore, since a critical color matching calls for much experience and cognitive expertise, there is no guarantee that the desired hue and luster can be obtained by conducting such trials.

OBJECT OF THE INVENTION

In view of the above state of the art, the object of the present invention is to provide a method for computer-aided color matching that easily and accurately computes a formulating ratio of colorants to metallic or pearlescent pigments with the desired hue and luster characteristics of a metallic or pearlescent coating composition.

SUMMARY OF THE INVENTION

Developed to accomplish the above object, the present invention is a method of determining a formulating ratio of a colorant to a metallic or pearlescent pigment or a formulating amount of a metallic or pearlescen: pigment in a computer color matching of a coating composition containing a metallic or pearlescent pigment which comprises measuring the spectral reflectances of a plurality of coated plate specimens of varied formulating amount of the metallic or pearlescent pigment to be used or formulating ratio of the metallic or pearlescent pigment to be used to the colorant with a goniospectrophotometer, storing the resulting data in a memory of a computer in advance and executing an algorithm for predicting reproduction gonio-spectral reflectances while inputting changes in gonio-spectral reflectances as caused by varying the level of addition of the metallic or pearlescent pigment using said stored data to find an adequate formulating amount of said metallic or pearlescent pigment or an adequate formulating ratio of said metallic or pearlescent pigment to the colorant.

The method of the present invention is further characterized in that, while determining the formulating ratio of the metallic or pearlescent pigment to the colorant or the formulating amount of the metallic or pearlescent pigment in the computer color matching of the coating composition containing the metallic or pearlescent pigment, the predictive reproduction gonio-gonio-spectral reflectances is subjected to correction procedure comprising the steps of i) generating the gonio-spectral reflectance data of a coating comprising one or more metallic or pearlescent pigments or one or more metallic or pearlescent pigments and one or more colorants inclusive of a translucent pigment and the formulating amount or ratio data thereof or said two kinds of data and coating thickness data for taking into account the influence of under coating color or substrate color and coating thickness as measured for one or a plurality of coated plate samples, ii) storing said data in a memory of the computer in advance and iii) correcting for the difference between the stored data and the gonio-spectral reflectance predicted by the computerhm over the entire measuring wavelength range and entire angular range by a fuzzy logic (same as; a fuzzy deduction algorithm) to thereby improve the accuracy of color matching.

The method of the present invention thus preferably is that, for determining the formulating ratio of the metallic or pearlescent pigment to the colorant or the formulating amount of the metallic or pearlescent pigment in a computer-aided color matching of a coating composition containing one or more colorants and one or more metallic or pearlescent pigments as the target color for reproduction, the color matching comprises measuring the spectral reflectances of the colorants and metallic or pearlescent pigments of said target color with a goniospectrophotometer, predicting gonio-spectral reflectances taking into account the changes in spectral reflectance which occur depending on the illumination angle and receiving light angle which is characterize of a metallic-pearlescent coating, and determining an adequate formulating ratio of the metallic or pearlescent pigment to the colorant or the formulating amount of the metallic or pearlescent pigment using the steps consisting of:

(a) performing a predictive computation of reproduction gonio-spectral reflectances from the previously measured gonio-spectral reflectance data of the colorant and metallic or pearlescent pigment, (b) computing the optical densities suitable for a metallic or pearlescent coating which are necessary for the prediction of reproduction gonio-spectral reflectances, (c) performing a color matching computation to determine the formulating ratio of the metallic or pearlescent pigment to the colorant or the formulating amount of the metallic or pearlescent pigment, and (d) storing the gonio-spectral reflectance, formulating ratio, formulating amount and coating condition data of a coating prepared beforehand for use as a reference in a memory of the computer and executing a fuzzy deduction algorithm to correct for the difference between reproduction gonio-spectral reflection data and said reference gonio-spectral reflection data over the entire measuring wavelength range and entire angular range.

BRIEF DESCRIPTION OF THE DRAWINGS

FIG. 4 is a diagram showing a fourth example of metallic or pearlescent pigment (3024)—clear base formulation in metallic or pearlescent pigment base data.

DETAILED DESCRIPTION OF THE PREFERRED EMBODIMENTS

Figure 1:
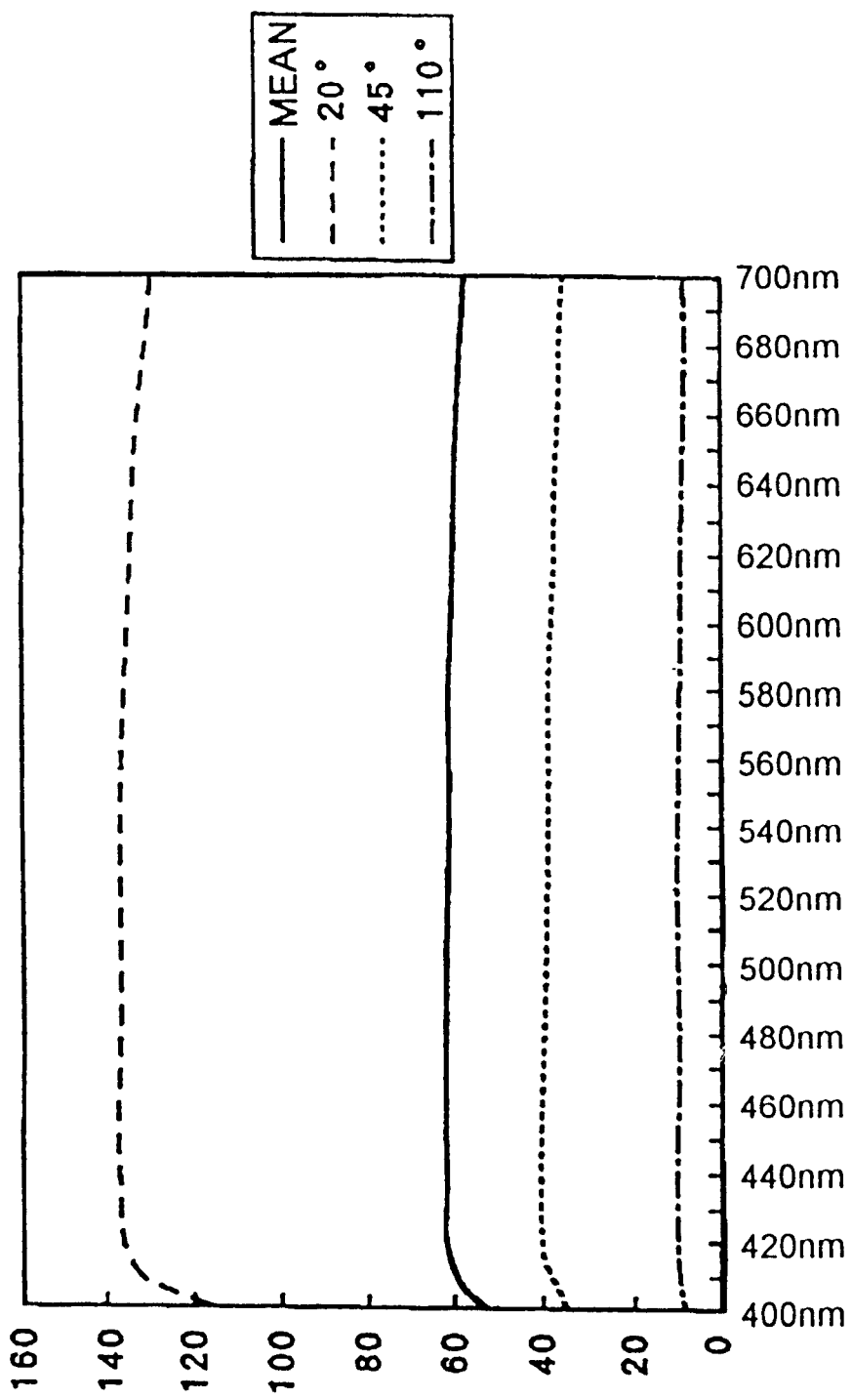
FIG. 1 shows a first example of colorant (3396)—standard metallic or pearlescent pigment formulation in colorant base data.

The computation system for executing the method of the present invention comprises the following four algorithms.

(1) a computing algorithm for predicting spectral reflectance which computes the spectral reflectance values at a plurality of angles representing illuminating and receiving angles of observation light contributory to luster from the formulation of a plurality of colorants and a plurality of metallic or pearlescent pigments of a coated specimen prepared under defined coating conditions.

(2) a computing algorithm which computes the luster according to the formulation of a metallic or pearlescent pigment.

(3) a fuzzy deduction algorithm which, using gonio-spectral reflectance data of coated samples prepared in optional formulations using a plurality of colorants and a plurality of metallic or pearlescent pigments, sample formulation data, and sample coating condition data as stored in a memory of a computer ahead of time, preparing fuzzy membership functions necessary to correct for the difference between the predicted gonio-spectral reflectance computed in (1) and the gonio-spectral reflectances predicted from the data stored in said memory by fuzzy deduction over the entire measurement wavelength range at all the angles, and using said membership functions, adjusting the predicted gonio-spectral reflectance determined by said computing algorithm (1).

(4) A formulating ratio computing algorithm which, by using said algorithms (1), (2) and (3) in combination computes an adequate formulating ratio of metallic or pearlescent pigments to colorants for matching the spectral reflectance at a plurality of angles of the illumination and reception of observing light contributory to the desired luster and hue.

Hereinafter, the first computing algorithm is now described. Generally in the predictive computation of spectral reflectance from a plurality of colorants and a white pigment used in the formulation of an ordinary coating composition, it is necessary to determine the absorption coefficient and scattering coefficient for the measuring wavelength range of the measured spectral reflectance of each colorant. For the determination of said absorption coefficient and scattering coefficient, the Kubelka-Munc optical density expression and the two-constant calculus according to Dancan's theory of color mixing are known. The optical density expression of Kubelka-Munc is:

$$(K/S)_\lambda = \{(1-R_\lambda)^2\}/\{2 \cdot R_\lambda\} \quad (0 < R_\lambda <)$$

$(K/S)_\lambda$: Kubelka-Munc optical density function at wavelength $\lambda$

K: absorption coefficient

S: scattering coefficient $R_\lambda$: reflectance at wavelength $\lambda$ $\lambda$: wavelength The theoretical expression of Dancan's color mixing is:

$$K_m/S_m = \{K_1 \cdot P_1 + K_2 \cdot P_2 + \cdots K_i(1-\Sigma P_i)\}/\{S_1 \cdot P_1 + S_2 \cdot P_2 + \cdots S_i(1-\Sigma P_i)\}$$

$K_m$: absorption coefficient after color mixing $S_m$: scattering coefficient after color mixing $K_i$: absorption coefficient of colorant i $S_i$: scattering coefficient of colorant i $P_i$: formulating ratio of colorant i The optical density expression of Kubelka-Munc calculates the ratio of absorption coefficient and scattering coefficient from reflectance, and in order to perform a color mixing computation using Duncan's theoretical expression of color mixing, the absorption coefficient and scattering coefficient must be respectively determined. For this purpose, the following relative method and absolute method are generally used.

The relative method determines the absorption coefficient of a white pigment and the absorption coefficient and scattering coefficient of a color pigment in relative terms with the scattering coefficient of the white pigment being taken as unity, i.e. 1 (one), and uses the following expression.

$$S_W = 1$$

$$K_W = (K/S)_W$$

$$S_p = (C_W/K_W) \cdot \{(K/S)_{Ld} - (K/S)_W\}/\{(K/S)_{Mt} - (K/S)_{Ld}\}$$

$$K_p = S_p (K/S)_{Mt}$$

$S_W$: scattering coefficient of white pigment
$K_W$: absorption coefficient of white pigment
$(K/S)_W$: Kubelka-Munk optical density of white pigment
$(K/S)_{Ld}$: optical density of a white pigment-colorant mixture
$(K/S)_{Mt}$: Kubelka-Munc optical density of colorant
$C_W$: formulating ratio of white pigment
$C_p$: formulating ratio of colorant On the other hand, the absolute method uses the following expression for determining the scattering coefficient and absorption coefficient.

$$R_{sp\infty} = \{-B + SQR(B^2 - 4A^2)\}/(2 \cdot A)$$

$$A = R_{sp1} \cdot R_{G2} - R_{sp2} \cdot R_{G1}$$

$$B = (R_{G1} - R_{G2})(1 + R_{sp1} \cdot R_{sp2}) - (R_{sp1} - R_{sp2})(1 + R_{G1} \cdot R_{G2})$$

$$S_{sp} = [\log_e \{(R_{sp\infty} - R_{G1})(1/R_{sap\infty} - R_{sp1})\}/\{(R_{sp\infty} - R_{sp1})(1/R_{sp\infty} - R_{G1})\}]/\{X(1/R_{sp\infty} - R_{sp\infty})\}$$

$$K_{ps} = (K/S)_{sp} \cdot S_{sp}$$

$$K_p = \{K_{sp} - K_s(1-P_p)\}/P_p$$

$$S_p = \{S_{sp} - S_s(1-P_p)\}/P_p$$

$R_{sp\infty}$: spectral reflectance of a white pigment-colorant mixture after Saunderson correction
$R_{sp1}$: spectral reflectance of a white pigment-colorant mixture on white substrate
$R_{sp2}$: spectral reflectance of a black pigment-colorant mixture on black substrate
$R_{c1}$: spectral reflectance of white substrate
$R_{c2}$: spectral reflectance of black substrate
$(K/S)_{sp}$: Kubelka-Munc optical density of a white pigment-colorant mixture
$K_a$: absorption coefficient of white pigment
$S_s$: scattering coefficient of white pigment
$K_{sp}$: absorption coefficient of a white pigment-colorant mixture
$S_{sp}$: scattering coefficient of a white pigment-colorant mixture
$K_p$: absorption coefficient of colorant
$S_p$: scattering coefficient of colorant
$P_p$: formulating ratio of colorant
X: coating thickness In the case where the ideal reflectance is to be converted to the actual reflectance, the following expression is used when it include light in specular angle.

$$R' = k_1 + (1/k_1)(1-k_2)\{R/(1-k_2R)\}$$

$$k_1 = ((n-1)/(n+1))^2$$

$R'$: actual reflectance
$R$: ideal reflectance
$K_1$: reflectance at an angle of incidence perpendicular to the boundary
$K_2$: internal mirror reflectance
n: refractive index of material (resin) constituting the coating composition To compute the measured state exclusive of specular angle, the following expression is used.

$$R' = (1/k_1)(1-k_2)\{R/(1-k_2R)\}$$

Furthermore, to compute the ideal state from the state measured to the exclusion of specular reflection, the following expression is used.

$$R = (R' - k_1)/\{(1/k_1)(1-k_2) + k_2 \cdot R' - k_1 \cdot k_2\}$$

To convert the state measured to the exclusion of specular reflection to an ideal state, the following expression is used.

$$R = R'/\{(1/k_1)(1-k_2) + k_2 R'\}$$

The procedure for predicting the spectral reflectance on mixing a colorant by means of the above expressions from the base reference data generated under a given set of conditions is as follows:

1) Actual spectral reflectance of a base data sample is converted to the ideal reflectance according to the measuring parameter settings of a spectrophotometer used for measurement.
2) Using the ideal reflectance obtained by the above conversion, a transformation is made to a Kubeka-Munc optical density.
3) From the optical density, the absorption coefficient and scattering coefficient at each measuring wavelength of the white pigment used in preparation of the base data is calculated and, then, the absorption and scattering coefficients at each measuring wavelength of each colorant used in the preparation of the base data is calculated.
4) According to Duncan's color mixing theoretical expression, the optical density, $(K/S)_m$, which prevails when i kinds of colorants are mixed according to a formulation $P_i$, is computed.
5) From the optical density $(K/S)_m$, the spectral reflectance $R_m$ is computed.
6) $R_m$ is converted to the actual spectral reflectance $R'_m$, since the spectral reflectance $R_m$ thus found is an ideal reflectance, Thus, the spectral reflectance of a coating composition obtainable by mixing colorants in a given formulating ratio can be found by the above steps 1)–6). However, when absorption and scattering coefficients are determined according to the Kubelka-Munk optical density expression, which does not take reflectances over 100% into account, the K/S value increases again as reflectance exceeds 100%, with the result that the color mixing theory loses validity, thus making the color mixing computation impossible.

However, in order to adjust the luster of a metallic or pearlescent coating composition, the spectral reflectance must be brought into agreement at a plurality of angles representing illumination and receiving light which is dependent on luster and hue and an ordinary spectrophotometer capable of multi-angle measurement is calibrated with the perfectly diffusing surface of barium sulfate being taken as 100%. Thus, when a metallic or pearlescent coating composition is measured at an angle close to the specular reflection, where the illuminating angle and receiving angle of viewing light are equal, a spectral reflectance over 100% is apt to be observed. Therefore, in such a situation, the color matching computation is impossible by a technique based on the Kubelka-Munc optical density equation. In the present invention, therefore, the following method is used for performing measurements with a goniospectrophotometer and color mixing computations.

In the first place, measurements with a goniospectrophotometer are explained. The goniospectrophotometer is capable of measuring spectral reflectances over the entire visible region of the spectrum or over the wavelength range outside of said visible region depending on models, at a plurality of viewing angles with the angle of incidence of observing light being fixed or at a plurality of incidence angles and viewing angles. Now, the measured reflectance is expressed by the following equation.

$$R = R(\theta_{in}, \theta_{out}, \lambda)$$

where R: spectral reflectance $\theta_{in}$: the angle of incidence of observing light which is normal to the surface of the specimen $\theta_{out}$: the viewing angle from the direction normal to the surface of the specimen $\lambda$: wavelength Generally speaking, spectrophotometer readings are corrected with the perfectly diffusing surface of barium sulfate being taken as a reflectance (100%). Thus, the result of measurement after such correction is written as follows.

$$R_{BaSO4}(\theta_{in}, \theta_{out}, \lambda) = 1$$

where $R_{BaSO4}$ is the measured spectral reflectance of the perfectly diffusing surface of barium sulfate.

In the measurement with a goniospectrophotometer, particularly when the viewing angle $\theta_{out}$ is close to the angle of incidence of observing light $\theta_{in}$, the specular reflection component exerts a significant influence. This tendency is particularly pronounced for a portable type spectrophotometer in which the distance of the light source position and receiving position from the specimen surface is small relative to the measuring area, i.e. the illuminated area of the sample. In such cases, the interfering component is measured using a perfect mirror surface reflector beforehand and a correction is made. The perfect mirror surface reflector is preferably an optical plane mirror obtainable by the vacuum vapor deposition of aluminum on a glass plate having an extremely flat and smooth surface. The interfering component $*R_M$ mentioned above can be expressed as follows.

$$*R_M = R_M(\theta_{in}, \theta_{out}, \lambda) / R_{A1}(\lambda)$$

where $R_M$: the influence of the specular reflection component, i.e. the stray light component in the viewing position $R_M(\theta_{in, \theta_{outs}}, \lambda)$: measured reflectance of a perfect mirror surface $R_{A1}(\lambda)$: intrinsic reflectance of aluminum Therefore, the actually measured spectral reflectance is first subjected to the correction represented by the following expression.

$$R(\theta_{in}, \theta_{out}, \lambda) = R_R(\theta_{in}, \theta_{out}, \lambda) - *R_M(\theta_{in}, \theta_{out}, \lambda)$$

where $R(\theta_{in}, \theta_{out}, \lambda)$: spectral reflectance after correction $R_R(\theta_{in}, \theta_{out}, \lambda)$: actually measured reflectance $*R_M(\theta_{in}, \theta_{out}, \lambda)$: the stray light component determined from the result of measurement of a perfect mirror surface Secondly, the procedure for generating base data to be used in computing the reproduction spectral reflectance on mixing a colorant with a metallic or pearlescent pigment in a given ratio is now explained. The base data of the metallic or pearlescent pigment can be represented by the following expression.

$$R_B = R_B(\theta_{in}, \theta_{out}, \lambda, C_B)$$

where $R_B$: the base data of spectral reflectance of a metallic or pearlescent base $C_B$: the formulating ratio of the metallic or pearlescent pigment in the coating composition formulation ($0 \leq C_B \leq 1$).

The colorant base data is remarkably influenced by coating thickness because the colorant as it is alone has a comparatively large molecular extinction coefficient and a high transmittance value and moreover, with the colorant alone, substantive data inclusive of an interaction with the metallic or pearlescent pigment cannot be obtained, thus the base data sample is prepared by formulating a standard metallic or pearlescent pigment, for example an aluminum base with the mean particle size. This relation can be expressed as follows.

$$R_G = R_G(\theta_{in}, \theta_{out}, \lambda, C_{Bs}, C_G)$$

$$C_{Bs} + C_G = 1$$

where $R_G$: base data of spectral reflectance of colorant $C_{Bs}$: formulating ratio of standard metallic or pearlescent pigment in the coating composition formula $C_G$: formulating ratio of colorant in the coating composition formula Then, the procedure for predicting the gonio-spectral reflectance in the case where only the metallic or pearlescent pigment is formulated in a given amount is now explained. As mentioned hereinbefore, the measured gonio-spectral reflectance of a metallic or pearlescent pigment easily exceeds 100% under the conditions where both the illuminating angle and the viewing angle are close to the direction of specular reflection. With regard to the reflection of a metallic or pearlescent pigment, the following orientation-trap model is applied. Thus, within the paint film layer, the metallic or pearlescent pigment exposed to observing light gives scattering reflections at various angles depending on its form and coating conditions used. Moreover, the illuminating light incident on the gaps between the metallic or pearlescent pigment particles is trapped in the gaps. Assuming that the energy of illuminating light is $I_i$ and the energy of the light observed at the viewing angle $\theta$ is $I_o$, these parameters can be represented by the following expressions, provided that the paint layer is provided with sufficient hiding power.

$$I_i(\lambda) = \int I_o(\theta, \lambda) d\theta$$

$$I_o(\theta, \lambda) = I_i(\lambda) \times C_{ori}(\theta, \lambda) \times \{1 - T_{trap}(\lambda, x)\} \times R_m(\theta, \lambda)$$

$$\int C_{ori}(\theta, \lambda) d\theta = 1$$

$$R_{true}(\theta, \lambda, x) = I_o(\theta, \lambda)/I_i = C_{ori}(\theta, \lambda) \times \{1 - T_{trap}(\lambda, x)\} \times R_m(\theta, \lambda)$$

where $I_i(\lambda)$ the incident energy of viewing light at wavelength $\lambda$ $I_o(\theta, \lambda)$: the energy of light received at viewing angle $\theta$ and wavelength $\lambda$ $C_{ori}(\theta, \lambda)$ the scattering orientation function of light provided by metallic or pearlescent pigment $T_{trap}(\lambda, x)$: the efficiency of trapping of viewing light at metallic or pearlescent pigment concentration x x: metallic or pearlescent pigment concentration $R_{true}(\theta, \lambda, x)$ the reflectance at incidence angle $\theta$, wavelength $\lambda$ and metallic or pearlescent pigment concentration x in ideal state $R_m(\theta, \lambda)$ : the intrinsic reflectance of metallic or pearlescent pigment That the intrinsic reflectance $R_m(\theta, \lambda)$ is a function of the incidence angle $\theta$ is to cope with a pearlescent interference type metallic or pearlescent pigment. Since the reflectance found in this manner is the reflectance in ideal state, actually a correction is made for stray light as described hereinbefore. It is also necessary to correct for the influences of the surface reflection and internal refractive index of the resin of the coating composition.

The procedure for making said correction for the influences of the surface reflection of the resin layer and internal mirror reflectance is now described. For this correction, samples each carrying a coating layer composed exclusively of said paint resin on a white and a black substrate, respectively, are measured with a goniospectrophotometer. Then, the surface reflection light alone is calculated and the modified Sanderson's method of correction for ideal reflectance is applied.

Thus, $$R(\theta, \lambda) = \{R'(\theta, \lambda) - K_1(\theta, \lambda)\}/[\{(1/K_1(\theta, \lambda))(1-k_2) + k_2 19\, R'(\theta, \lambda) - K_1(\theta, \lambda) \cdot k_2\}]$$

$$K_1(\theta, \lambda) = [R_B(\theta, \lambda) \cdot R_{Wg}(\theta, \lambda) - R_W(\theta, \lambda) \cdot R_{Bg}(\theta, \lambda)]/\{R_{Wg}(\theta, \lambda) - R_{Bg}(\theta, \lambda)\}$$

$R(\theta, \lambda)$: ideal reflectance $R'(\theta, \lambda)$: measured reflectance after correction for stray light $K_1(\theta, \lambda)$: reflectance at boundary $K_2$: internal mirror reflectance $R_W(\theta, \lambda)$: measured reflectance of resin layer on white ground after correction for stray light $R_B(\theta, \lambda)$: measured reflectance of resin layer on black ground after correction for stray light $R_{Wg}(\theta, \lambda)$: measured reflectance of white ground after correction for the stray light $R_{Bg}(\theta, \lambda)$: measured reflectance of black ground after correction for the stray light The ideal reflectance $R_{true}(\theta, \lambda, x)$ is used after said correction. Furthermore, when the specimen for base data of the luster coating composition is lacking in sufficient hiding power, too, the gonio-spectral reflectances of coating layers on a white and a black substrates are measured and submitted to the computation after correction for stray light and the correction described just above.

Referring to the metallic or pearlescent pigment base data, the gonio-spectral reflectances of a formulation comprising a plurality of metallic or pearlescent pigments cannot be determined by the mere computation of ideal reflectance $R_{true}(\theta, \lambda, x)$. As the base data, the orientation function and trap efficiency, which contribute to scattering, must be determined as relative values with respect to a standard metallic or pearlescent pigment. Let it be assumed that the ideal reflectance due to the standard metallic or pearlescent pigment is $R_{true's}(\theta, \lambda, x)$.

$$C_{ori's}(\theta, \lambda) = R_{true's}(\theta, \lambda, 1)/R_{true's}(45, \lambda, 1)$$

$$T_{trap's}(\lambda, x) = 1 - R_{true's}(45, \lambda, x)/R_{true's}(45, \lambda, 1).$$

From the above equations, $C_{ori's}(\theta, \lambda)$ and $T_{trap's}(\lambda, x)$ are calculated. Then, from $R_{m's}(\theta, \lambda, x) = R_{true's}(\theta, \lambda, x)/\{C_{ori's}(\theta, \lambda) \times \{1 - T_{trap's}(\lambda, x)\}\}$, $R_{m's}(\theta, \lambda, x)$ is calculated. The predicted reflectance in the case where a plurality of metallic or pearlescent pigments are formulated can be expressed as follows.

$$R_{true,M}(\theta, \lambda, x_1, x_2, \cdots, x_n) = \Sigma\{C_{ori,n}(\theta, \lambda, X_n) \cdot x_n\}/\Sigma x_n \times \{1 - \Sigma\{T_{trap,n}(\lambda, x_n) \cdot x_n\}/\Sigma x_n \times \Sigma\{R_{m,n}(\theta, \lambda, x_n) \cdot x_n\}/\Sigma x_n$$

The procedure for predictive computation of the goniospectral reflectance in the case where a colorant is formulated is now described. The colorant base data is generated by measurements in the presence of the metallic or pearlescent pigment. Assuming that the metallic or pearlescent pigment concentration is x and the colorant concentration is y, the measured reflectance is corrected for stray light, surface reflection and internal mirror surface reflection, as it is the case with the metallic or pearlescent pigment base data, as follows. When the corrected value is $$R_{true'G}(\theta, \lambda, x, y),$$

the absorbance A due to the colorant is $$A = R_{true'GM}(\theta, \lambda, x, y) - R_{true'G}(\theta, \lambda, x).$$

Absorbance A has the following relationship to transmittance T.

$$T = A - 1$$

Because a metallic or pearlescent pigment is highly transmissive and has a low scattering power, the Lanbert-Beer law holds:

$$Abs_{true'G}(\theta, \lambda, x, y) = -\log(T)$$

Taking the light-path length of the paint layer into consideration, the following equation can be derived.

$$Abs_{true'G}(\theta, \lambda, x, y) = L_{true'M}(\theta, x) \cdot y \cdot Abs_{true'GU}(\lambda)$$

where $L_{true'M}(\theta, x)$: the light-path length which depends on the metallic or pearlescent pigment in the paint layer $Abs_{true'GU}(\lambda)$: the intrinsic absorption spectrum of the colorant Here, $L_{true,M}(\theta, x)$ is determined for the metallic or pearlescent pigment in the coating composition using a standard colorant beforehand. The predicted gonio-spectral reflectance in the case where a plurality of metallic or pearlescent pigments and a plurality of colorants are formulated can be expressed as follows.

$$Abs_{true,GM}(\theta, \lambda, x_n, y_n) = \Sigma L_{true,n}(\theta, x_n)/\Sigma x_n \cdot \Sigma\{y_n \cdot Abs_{true,Gnu}(\lambda)\}$$

$$T = pow\{10, -Abs_{true,GM}(\theta, \lambda, x_n, y_n)\}$$

$$R_{true,GM}(\theta, \lambda, x_n, y_n) = R_{true,G}(\theta, \lambda, x_n, y_n) - (1-T)$$

The computational procedure for spectral reflectance at each angle in the case where a metallic or pearlescent pigment is formulated, which constitutes the second computing algorithm of the invention, is now described. In this second computing algorithm, it is a primary objective to grasp the change in spectral reflectance at each angle according to the addition level of a metallic or pearlescent pigment. The preparation of sample for a base data for accomplishing the objective and the associated computational procedure are described below.

Usually, as the addition level of a metallic or pearlescent pigment is increased, the light illuminating the surface of the pigment containing color layer of a paint film is irregularly reflected by the metallic or pearlescent pigment having particle size generally ranging from a few microns to hundreds of microns and, as a result, a luster is perceived by the viewer. Therefore, the higher the scattering power per unit area within the color layer is, in other words the lower the density of the metallic or pearlescent pigment existing in the color layer is, the lower is the luster. Therefore, when the addition level of the metallic or pearlescent pigment is increased within the range where the change in scattering power is not affected, that is to say within the range not reaching a point of saturation, the luster is increased more or less monotonically.

This trend of increase is such that, after addition of the metallic or pearlescent pigment in a sufficient amount, any further increase in the amount of the metallic or pearlescent pigment does not result in any remarkable increase in luster. Therefore, the relationship of luster to the addition level of a metallic or pearlescent pigment is proportional and can be represented by a monotonic increasing function giving a positive linear differential and a negative quadratic differential. With base data samples, the spectral reflectance at each angle is measured while the amount of addition of the metallic or pearlescent pigment is gradually increased and the relation between the addition level of this metallic or pearlescent pigment and the flop value is used to estimate the flop value for the addition level of the metallic or pearlescent pigment. This relation, in its simple form, can be expressed as follows $$F=f(x)$$

where F: flop value f(x): an estimation function of flop value x: the addition level of the metallic or pearlescent pigment Here, f(x) is the estimation function of flop value, which is determined by plotting the flop value against the level of addition of the metallic or pearlescent pigment as measured discretely beforehand. This may be determined either by simple linear interpolation or by an n-order interpolation technique using Lagrangean or spline function. Moreover, when the reproducibility of base data samples or the measurement error is an important consideration, said f(x) may be determined by defining a certain higher function and applying a regression technique to the function.

Furthermore, for improving the accuracy of interpolation or regression, it is effective to replace the flop value with a monotonic increasing function giving a positive linear differential and a quadratic differential close to 0 with respect to the level of addition of the metallic or pearlescent pigment. Thus, $$F_t=t(F)=t(f(x))$$

$$F=t^{-1}(Ft)$$

where $F_t$: the flop value transformed by t(x)

f( ): a function for estimating the relationship of the flop value transformed by t(x) to the metallic or pearlescent pigment t( ): a transformation function for bringing the flop value into a monotonic increasing relation giving a positive linear differential and a near-zero quadratic differential with respect to the level of addition of the metallic or pearlescent pigment.

x: the addition level of the metallic or pearlescent pigment $t^{-1}$( ): the inverse function of t( )

This method has the following advantage. Thus, the value of $F_t$ holds generally a directly proportional relation to the level of addition of the metallic or pearlescent pigment and, therefore, when a plurality of metallic or pearlescent pigments must be formulated, the additivity of the respective transformed flop $F_t$ values against the level of addition has more validity as compared with simple interpolation so that the flop value in the case where a plurality of metallic or pearlescent pigments are formulated can be estimated with greater accuracy.

This transformation function t(x) can be any function that will convert a function having a negative linear differential and a positive quadratic differential to a function having a positive linear differential and a quadratic differential of 0, and for example, the use of functions of the following expressions may be suggested.

$$t(F)=1-(F/100)^{1/n}$$

$$t(F)=\{-\log(F/100)\}^n$$

$$t(F)=(1-F)^n/F$$

where t(F): transformation function

F: flop value n: the order necessary to adjust the quadratic differential to 0, which is not less than 1

The following is an example of performing a linear interpolation of the relation between the discretely measured metallic or pearlescent pigment and the transformed flop value $F_t$ and determining the flop value F for the case in which the metallic or pearlescent pigment is added at concentration x.

$$Ft(x_i)=t(F_i)$$

$$Ft(x)=[\{t(F_i)-t(F_{i-1})\}/(x_i-x_{i-1})]x+t(F_{i-1})$$

$x_i$: the level of addition of ith metallic or pearlescent pigment in base data sample x: the level of addition of metallic or pearlescent pigment $F_i$: ith flop value of base data sample t( ): transformation function of flop value $F_1$: flop value transformed by t( ).

$t^{-1}$( ): inverse function of t( ).

In this manner, the flop value against the level of addition of the metallic or pearlescent pigment is estimated.

The third computing algorithm, that is to say the fuzzy deduction system which corrects for the difference from the spectral reflectance found by predictive computation over the entire measuring wavelength range by fuzzy logic and the adjusting computational system for preparing the membership functions to be used in this computation are now described. The predicted spectral reflectance determined by the algorithm described for the first computing algorithm is, after all, an estimated value and it is difficult to attain an exact and practical formulation by using this value alone. Therefore, the value found by said algorithm is corrected by fuzzy deduction logic from the spectral reflectance data of a coating composition of known formulation as previously registered on a computer memory.

This technique is now described in detail. In fuzzy deduction, ambiguity is defined by using the membership function in the fuzzy theory of sets. Thus, the fuzzy set A in the whole set U is defined by the membership function $\mu A$: $U \to [0, 1]$, and the value of $\mu A(u)$ ($\in [0, 1]$) represents the grade of $u(\in U)$ in A.

For application to inference, the technique using a fuzzy production rule is often used. This production rule R consists of an antecedent clause (IF clause) and a consequent clause (THEN clause) and is generally represented by the following expression (an example of 2 antecedent propositions and 1 consequent).

$$R_j: \text{if } x_1 \text{ is } A_{i1} \text{ and } x_2 \text{ is } A_{i2}, \text{ then y is } B_i \text{ (i=1,2, ,n)}$$

where $x_1$: the concept of antecedent proposition 1

$x_2$: the concept of antecedent proposition 2

$A_{i1}$: the ith membership function of antecedent proposition 1 (fuzzy label)

$A_{i2}$: the ith membership function of antecedent proposition 2 (fuzzy label)

y: the concept of consequent $B_i$: the membership function of consequent (fuzzy label)

While a various specific techniques have so far been developed for fuzzy inference, the most representative one is the technique devised by Mamdani. Assuming that the observed values of the antecedent propositions are $x_1^0$, $x_2^0$, the goodness of fit $\omega i$ of the ith rule is $$\omega i = A_{i1}(x_1^0) \wedge A_{i2}(x_2^0)$$

The output is $$B^0(y) = [\omega_1 \wedge B_1(y) \vee [\omega_2 \wedge B_2(y)] \vee \cdots \vee [\omega_n \wedge B_n(y)] y^0 = \int B^0(y) \, ydy / \int B^0(y) dy$$

where $B^0(\ )$: a function of the result of inference of the consequent (THEN) clause membership function $y^0$: the output obtained by defuzzification of the inference output The above expression shows that barycentric coordinates are calculated for defuzzification. In regard of this defuzzification, too, several techniques have been proposed.

In this invention, it is an objective to determine the formulation of colorants $x_1, x_2, x_3, \cdots x_i$, white pigment $x_W$, and metallic or pearlescent pigments $y_1, y_2, y_3 \cdots y_j$ which will give the target spectral reflectance R and target flop value F when the spectral reflectance of the under coating or substrate color is $R_g$ and the coating thickness is t. Therefore, if the predictive computation of the spectral reflectance and flop value for the formulation of colorants, white pigment and metallic or pearlescent pigments is performed accurately under the designated under coating or substrate color reflectance and film thickness conditions, the accuracy of the formulation computation will be improved. For this purpose, the following expression can be proposed. $R(\theta, \lambda, x_1, x_2, \cdots x_i, x_w, y_1, y_2, \cdots y_j, t) = R_t(\theta, \lambda, x_1, x_2, \cdots x_i, x_w, y_1, y_2, \cdots y_j, t) + \text{Corr}(\theta, \lambda, x_1, x_2, \cdots x_i, x_w, y_1, y_2, \cdots y_j, t)$ $R_1$: predicted reflectance at wavelength $\lambda$ $x_1, x_2, \cdots x_i$: formulation of i kinds of colorants $x_w$: formulation of white pigment $y_1, y_2, \cdots y_j$: formulation of i kinds of metallic or pearlescent pigments t: thickness of coating composition color layer $R_t$: purely theoretical predicted reflectance at wavelength $\lambda$ Corr: amount of correction as computed by a fuzzy logic using a correction function for reflectance at wavelength $\lambda$ Here, Corr is a correcting function comprising a fuzzy logic, and the fuzzy production rule for carrying out a fuzzy deduction is such that the antecedent clause consists of colorant i+metallic or pearlescent pigment j+film thickness t, i.e. i+j+t=3, and the consequent clause consists in a correction value. Therefore, when 3 kinds of colorants and one kind of metallic or pearlescent pigment are involved, the fuzzy rule consists of 5 antecedent propositions and 1 consequent.

The fuzzy label of the antecedent clause for the colorant, white pigment, or metallic or pearlescent pigment takes the expression system of "much" and "little", each modified by the degree. In the case of a coating composition, the total sum of the proportion of colorants and white pigment is always equal to 100. Therefore, as the antecedent space, only the colorant formulation is considered, with the while pigment formulation being disregarded. The colorant formulation may be simply expressed in orthogonal coordinates but in the inference in the present invention, it is expressed in a coordinate system consisting of the total formulating amount of colorants and the formulating proportions of respective colorants in the total amount. Thus, when 3 kinds of colorants are involved, the formulation is expressed in prismatic coordinates consisting of an axis representing the total formulation value and regular triangle coordinates representing the formulating amounts of the respective colorants.

Since the sum of formulating ratios lies somewhere between 0 and 100, the dimension from 0 to 100 is divided by n ($n \leq 2$). This division may be equi-spaced. However, in the light color region where the total formulating amount of colorants is comparatively small, even a slight change in formulation exerts a significant influence on the reproduced hue and conversely in the dark color region where the total formulating amount of colorants is comparatively large, the influence of change in formulation on hue is small. Therefore, it is more effective to vary the degree of division exponentially so that the division is denser in the light color region and sparser in the dark color region.

The inference space of the antecedent clause includes the coating thickness t and the amount of metallic or pearlescent pigment $y_j$ in addition to the colorant formulation.

The coating thickness t may be a measured value but since the measured value is fuzzified, it need not be an actual thickness but may for example be a bar coater number. By presupposing an expected coating thickness range and dividing it either at equal or unequal intervals, fuzzy labels are established. As to the metallic or pearlescent pigment, because there is an upper limit to the level of addition in many cases, a maximum level of addition is presupposed and the dimension is divided either at regular intervals or at exponentially unequal intervals as in the case of the total formulation of colorants for the establishment of fuzzy labels.

The fuzzy labels at wavelength $\lambda$ in the case of 3 colorants and one metallic or pearlescent pigment may be summarized as follows.

$$x_1^0 = x_1/(x_1+x_2+x_3)$$

$$x_2^0 = x_2/(x_1+x_2+x_3)$$

$$x_3^0 = (x_1+x_2+x_3)/100$$

$$x_4^0 = R_{tg\lambda}$$

$$x_5^0 = t_0/t_{max}$$

$$x_6^0 = x_g/x_{gmax}$$

$x_1$: formulation of $1^{st}$ colorant $x_2$: formulation of $2^{nd}$ colorant $x_3$: formulation of $3^{rd}$ colorant $R_{ig\lambda}$: transformed reflectance of round at wavelength $\lambda$ $t_o$: coating thickness $t_{max}$: expected maximum coating thickness $y_g$: the level of addition of metallic or pearlescent pigments $y_{gmax}$: expected maximum level of addition of metallic or pearlescent pigments $x_1^0$: observed proportion of $1^{st}$ colorant in the total of colorants $x_2^0$: observed proportion of $2^{nd}$ colorant in the total of colorants $x_3^0$: observed size of all colorants formulated $x_4^0$: observed degree of ground reflectance at wavelength $\lambda$ $x_5^0$: observed degree of coating thickness $x_6^0$: observed degree of the level of addition of metallic or pearlescent pigment Let it be assumed that the membership functions for fuzzification of 6 kinds of observed values are $A_{i1}$, $A_{i2}$, $\cdots$ $A_{i6}$. Since said observed values $x_1^0$, $x_2^0$, $\cdots$ $x_6^0$ have all been normalized in the range of [0, 1], the range of [0, 1] is divided, where necessary, by $n_i$ either at equal intervals or at unequal intervals and the membership functions are prepared for the dividing points. As regards the form of the membership function, exponential and several other forms have heretofore been proposed but for simplification of computation and in consideration of the smoothness of outputs obtainable by fuzzy inference, the triangular function is most effective. The fuzzy production rule for fuzzy inference can be written as follows.

$R_i$: if $F_1$ is $A_{i1}$ and $F_2$ is $A_{i2}$ and $F_3$ is $A_{i3}$ and $F_4$ is $A_{i4}$ and $F_5$ is $A_{i5}$ and $F_6$ is $A_{i6}$ then y is $B_i$ (i=1,2,$\cdots$, n)

In the above rule, y is the output concept of the consequent clause and represents the degree of difference between the optical density calculated from the actually measured spectral reflectance of a coated plate prepared under a given set of conditions and the theoretical optical density as calculated from the preparation conditions. $B_i$ is the membership function of the ith consequent.

y, which represents the difference between measured reflectance and theoretical reflectance, is computed according to the following expression.

$$y = R_{T\lambda}/R_{R\lambda}$$

$R_{T\lambda}$: optical density at wavelength $\lambda$ as found by theoretical computation $R_{R\lambda}$: measured optical density at wavelength $\lambda$ In this arrangement, the range for the value of y can be easily postulated and the smoothness of the results of inference can also be easily insured. For example, the range of y may be postulated to be [0.2, 2.0]. This dimension is divided by n at equal or unequal intervals and the membership function of the consequent (THEN) clause is defined. When the division is made at unequal intervals, it is more effective to do so with a higher density in the neighborhood of 1.0 and a lower density near the minimum and maximum extremes of the dimension.

In the present invention, the preparation conditions of coated plates prepared under the conditions of n points beforehand and the actually measured reflectances are stored in a computer memory and using this data the consequent clause membership function and the fuzzy production rule are adjusted so as to produce an accurate fuzzy output y. This adjustment is virtually impossible by the above-described technique of determining barycentric coordinates and performing defuzzification because it requires a regression computation of a high-order function.

Therefore, in the present invention, the necessary computation is performed by a defuzzification technique using the simple height method. In the height method, the membership function does not have a spread in the dimension of output concept y but becomes a mere function of the position on the y-axis and its height. The inference is then as follows.

$$B^0(y_i) = [\omega_1 \wedge B_1(y_i)] \vee [\omega_2 \wedge B_2(y_i)] \vee \cdots \vee [\omega_n \wedge B_n(y_i)] y^0 = \Sigma B^0(y_i) y_i / \Sigma B^0(y_i)$$

The procedures for adjusting the consequent clause membership function and the fuzzy production rule are now described.

First step of adjustment:

When the number of data on the actually measured reflectance and preparation conditions of a coated plate prepared under a given set of conditions as stored in a computer memory is small, that is to say when, after transformation of the conditions to observed data, only one datum exists in the same cell of a six-dimensional fuzzy label, $B_i$ is set at height 1. In the fuzzy production rule, said particular cell is regarded as it has flashed, and a production rule $R_i$ is established in order that $B_i$ may be derived from the logic of the antecedent clause.

When n data exist in the same cell of the fuzzy label, the value of $B_i$ and the corresponding fuzzy production rule are set by extrapolation in nearby cells where respective observed values flash. When the number of antecedent propositions is 6, the number of relevant nearby cells is a maximum of 64 (=$2^6$). The respective membership functions $B_i$ are estimated in the direction to which said n data are relevent and the position on the y-axis is shifted so that the output value will agree with the observed value. This procedure is performed for all the n data stored in the memory.

Second step of adjustment:

The number of fuzzy production rules $R_i$ is the product of the numbers of divisions of the respective dimensions of the antecedent clause membership functions further multiplied by the number of measuring wavelengths of spectral reflectances. Therefore, the number of production rules available when each dimension is divided by 10 will amount to an enormous number of $31 \times 10^6$. Therefore, the chances for all the cells flashing is virtually nil. Here, as to the cell which did not flash in the first step of adjustment, the production rule for the cell which flashed is either interpolated or extrapolated. In this case, the fuzzy cells are arranged in 6-dimensional orthogonal coordinates and the rules are extrapolated.

By the above procedure, a system is constructed for performing a theoretical computation at wavelength $\lambda$ and estimating the correction of actually measured optical density. In this manner, an accurate prediction of optical density, that is to say spectral reflectance is made possible and the accuracy of the color matching computation for an target color can be dramatically increased.

While the computation method for spectral reflectance has been described above, a system for correcting for the difference between the theoretical and measured values can be constructed for the flop value by exactly the same procedure. The fundamental formula for computation of the flop value is as follows.

$$F_t(x_1, x_2, \cdots x_i, x_w, x_g/R_g, t) = G_{tT}(x_1, x_2, \cdots x_i, x_w, x_g, R_g, t)$$
$$+ \text{Corr}(x_1, x_{2,\,2}, \cdots x_i, x_w, x_g, R_g, t)$$

F: predicted flop $x_1, x_2, \cdots x_i$: formulation of i kinds of colorants $x_w$: formulation of white pigment $x_g$: formulation of metallic or pearlescent pigments $R_g$: reflectance of ground color t: thickness of coating composition color layer $F_{tT}$: Purely theoretical predicted flop value Corr: amount of correction as computed by a fuzzy inference using a flop correction function.

Compared with the computation system for spectral reflectance, the antecedent (IF) clause and consequent (THEN) clause and the antecedent clause membership function are respectively quite the same. However, the wavelength does not exist in the case of the flop value.

By incorporating the above-described fuzzy deduction algorithm for correction computation of spectral reflectance and that for correction computation of the flop value in the fourth computing algorithm, the colorant formulation and the addition level of metallic or pearlescent pigments for matching the hue and luster of an target color under the conditions of coating thickness t and a given color can be accurately computed.

A computational system incorporating said first to third computing algorithms for computing the proper formulation of colorants and metallic or pearlescent pigments matching the spectral reflectances at a plurality of angles of illumination and reception of observing light contributory to the luster of an target color in the color matching of a coating composition containing a plurality of colorants and a plurality of metallic or pearlescent pigments is now described.

The predicted spectral reflectance under the conditions of spectral reflectance of under coating or substrate color $R_g$, coating thickness t, colorants $x_1, x_2, x_3 \cdots x_i$, white pigment $x_w$, and metallic or pearlescent pigments $y_1, y_2, y_3 \cdots y_j$ has been described hereinbefore. The case in which 3 kinds of aluminum varying in particle size distribution (coarse, medium and fine) are used as metallic or pearlescent pigments is now explained by way of illustration. Since each particle size distribution has a certain breadth, mixing coarse and fine metallic or pearlescent pigments in a given ratio may result in agreement with the particle size distribution of the medium-sized metallic or pearlescent pigments. In this case, two solutions of computation exist for the metallic or pearlescent pigment and if a converging computation is carried out by the iterative method, divergence occurs so that no solution is obtained in many instances. In the present invention, this influence is eliminated by computing predicted spectral reflectance upon the change of the colorant and metallic or pearlescent pigment formulation in a number of steps by means of the algorithm described in the combination of the first and third computing algorithms in the first place, then computing the chromaticity coordinates such as CIELAB space at respective angles from those spectral reflectance, and storing the coordinates as well as the colorant and metallic or pearlescent pigment formulation data in a computer memory. To perform a color matching computation, a sample color is measured and an approximate color search is made for use as the initial value in the iterative computation.

EXAMPLES

An example of the computer color matching (CCM) utilizing the method of the invention is now explained in further detail, however the present invention is not limited to these examples.

Preparation of Base Data

In carrying out the invention, base data on the respective colorants and metallic or pearlescent pigments necessary to reproduce the predicted color value according to the following formulation are prepared ahead of time.

Colorants used (1) 3396 (cyanine blue)

(2) 3604 (shadow green)

(3) 3411 (tinting black)

Metallic or Pearlescent Pigments Used (1) 3032 (white M fine)

(2) 3034 (white M coarse)

(3) 3024 (high spark rough)

Colorant Base Data

As the base colorant data, the respective colorants are mixed with white M fine as a standard metallic or pearlescent pigment in the following formulating ratios.

(1) 3396

Colorant 0.00%+metallic or pearlescent pigment 100.00% $\cdots$ (FIG. 1)

Figure 2:
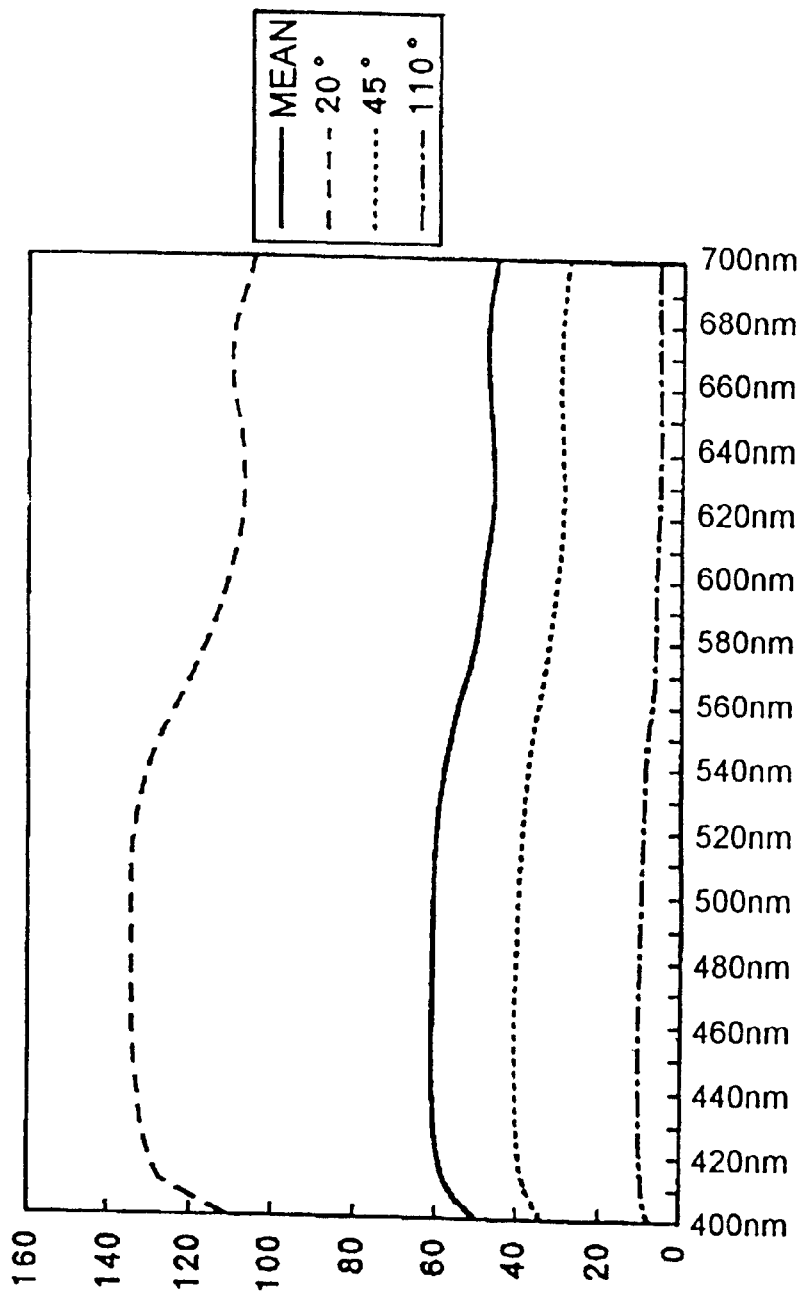
FIG. 2 shows a second example of colorant (3396)—standard metallic or pearlescent pigment formulation in colorant base data.

Colorant 2.99%+metallic or pearlescent pigment 97.01% $\cdots$ (FIG. 2)

Figure 3:
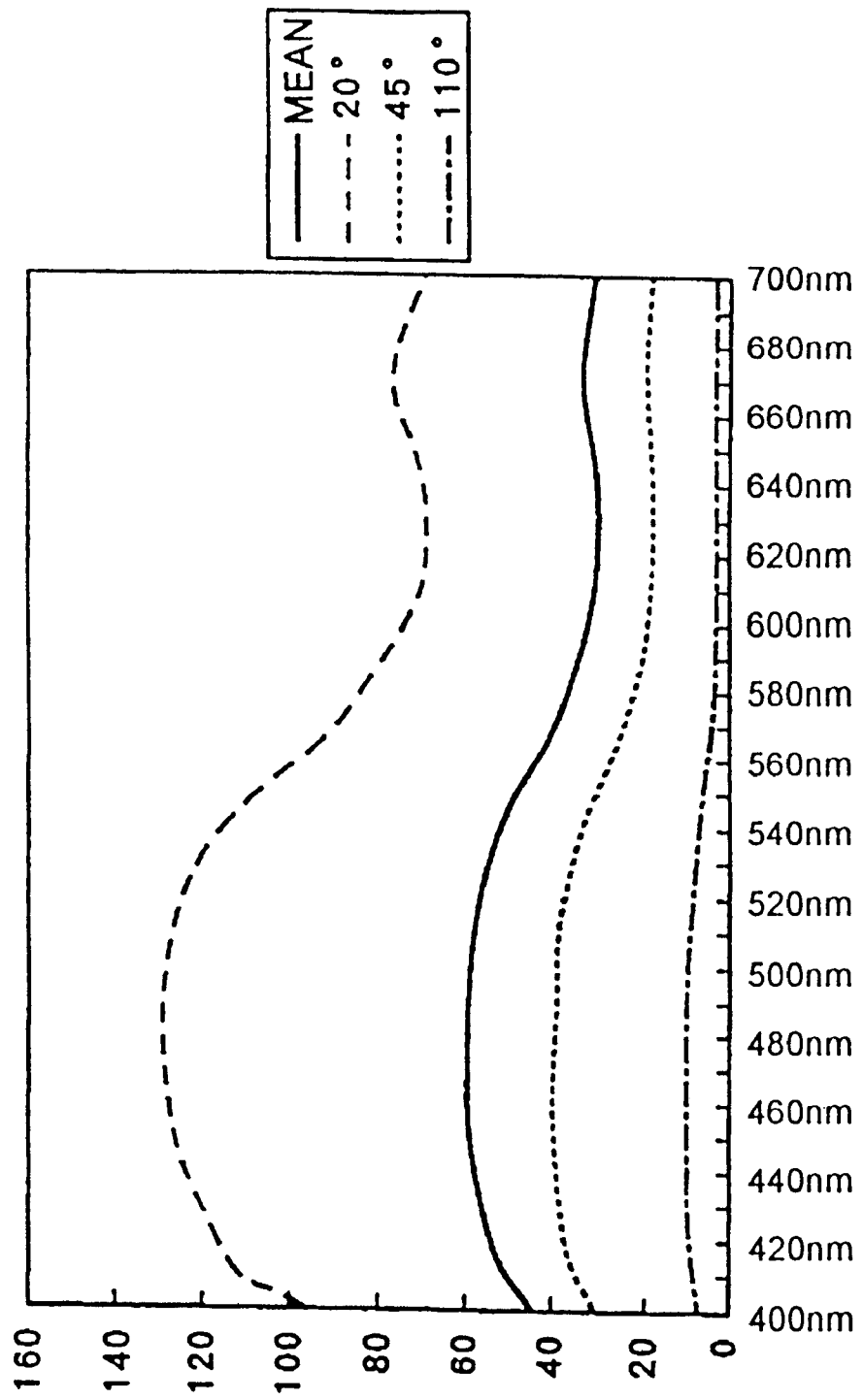
FIG. 3 shows a third example of colorant (3396)—standard metallic or pearlescent pigment formulation in colorant base data.

Colorant 9.99%+metallic or pearlescent pigment 90.01% $\cdots$ (FIG. 3)

Figure 4:
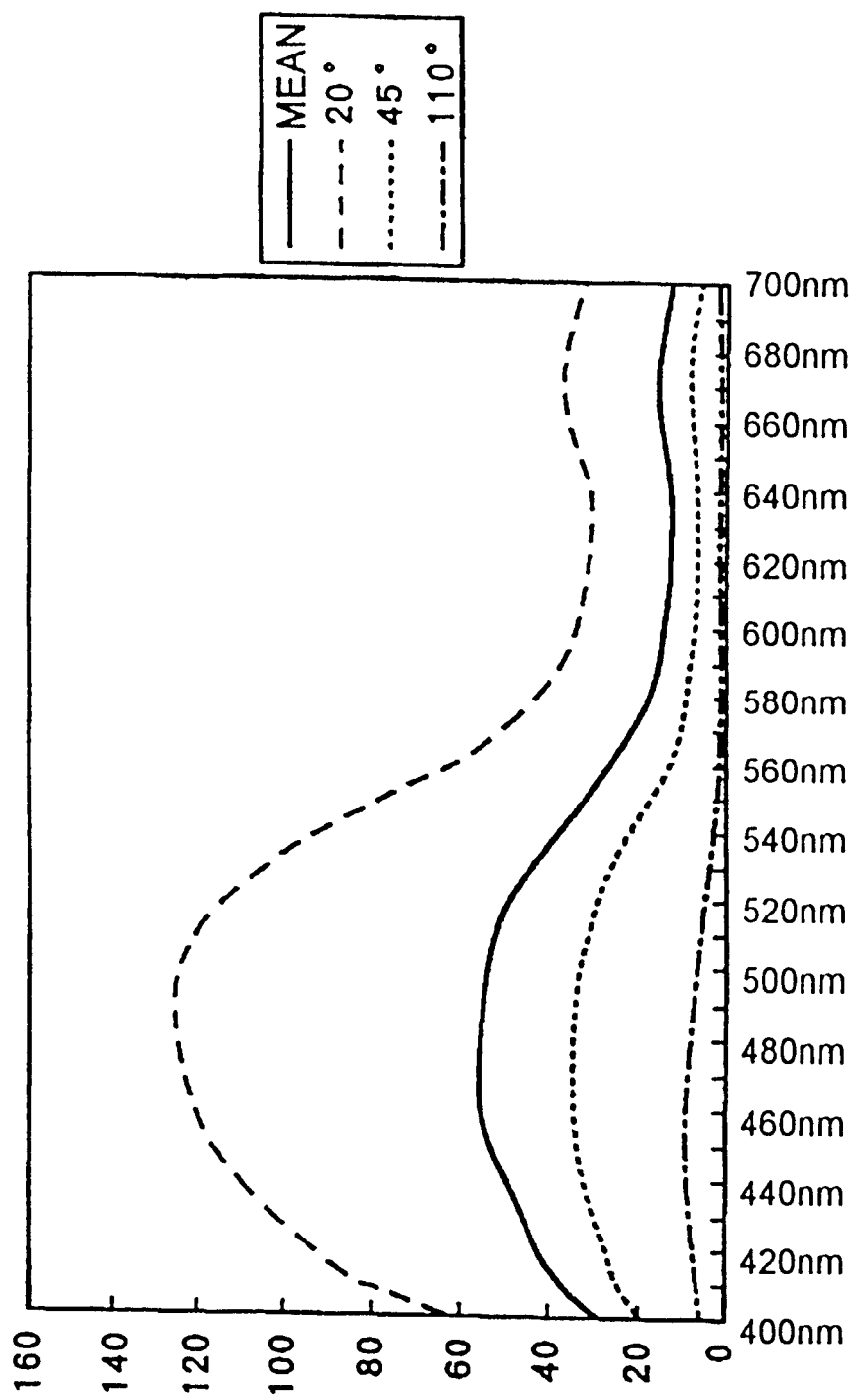
FIG. 4 shows a fourth example of colorant (3396)—standard metallic or pearlescent pigment formulation in colorant base data.

Colorant 29.99%+metallic or pearlescent pigment 70.01% $\cdots$ (FIG. 4)

Figure 5:
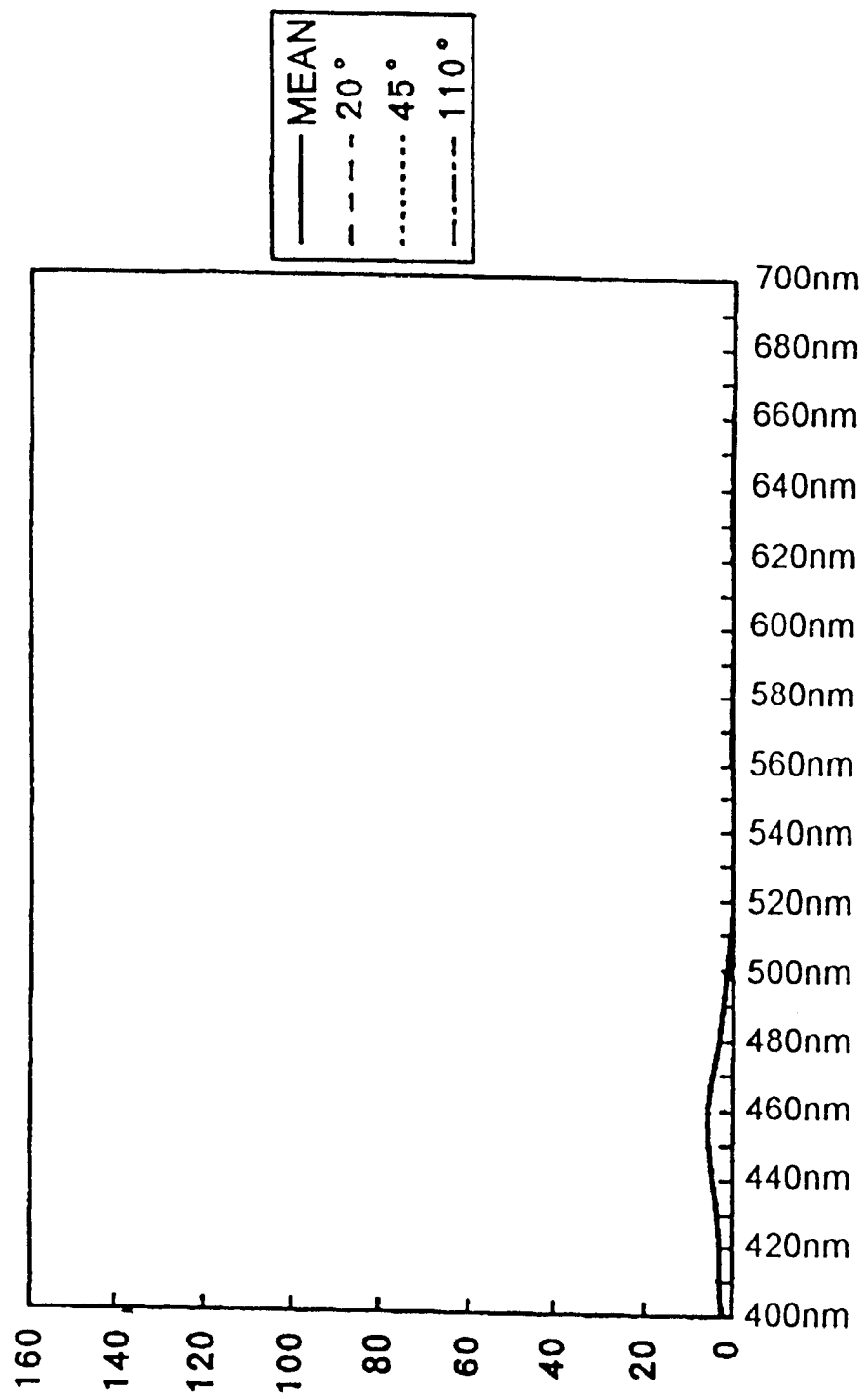
FIG. 5 shows a fifth example of colorant (3396)—standard metallic or pearlescent pigment formulation in colorant base data.

Colorant 100%+metallic or pearlescent pigment 0% $\cdots$ (FIG. 5)

(2) 3604

Figure 6:
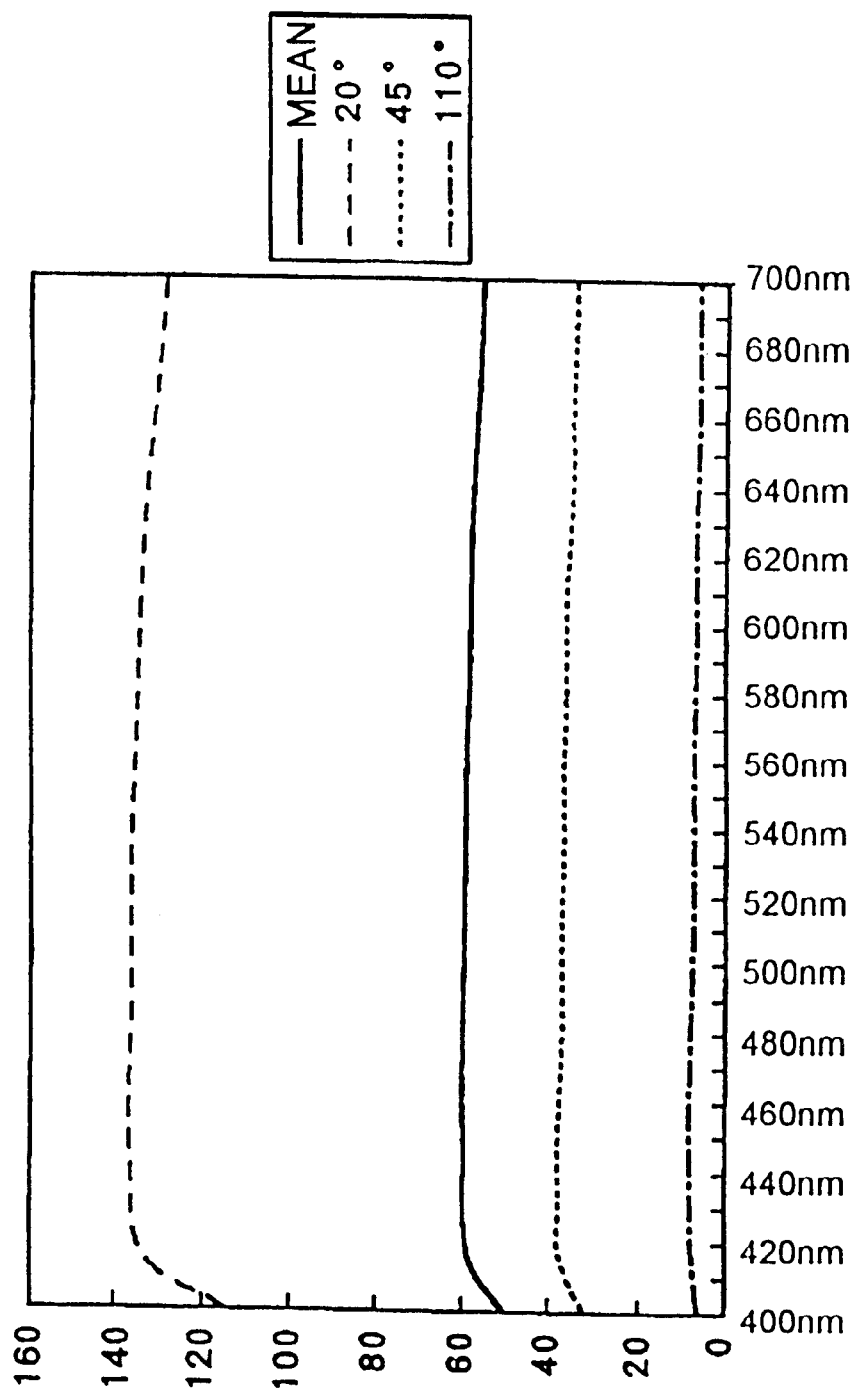
FIG. 6 shows a first example of colorant (3604)—standard metallic or pearlescent pigment formulation-in colorant base data.

Colorant 0.00%+metallic or pearlescent pigment 100.00% $\cdots$ (FIG. 6)

Figure 7:
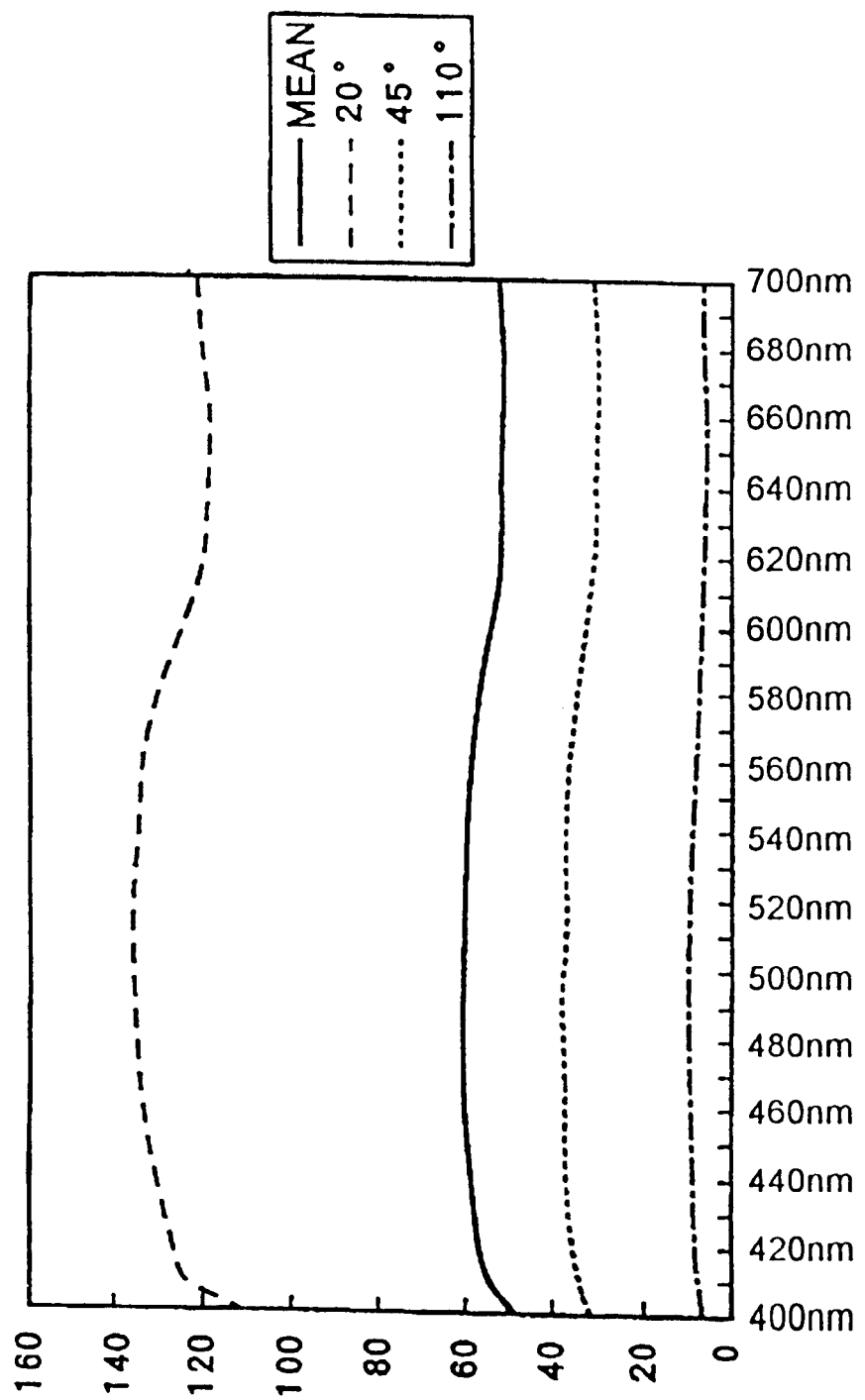
FIG. 7 shows a second example of colorant (3604)—standard metallic or pearlescent pigment formulation in colorant base data.

Colorant 3.00%+metallic or pearlescent pigment 97.00% $\cdots$ (FIG. 7)

Figure 8:
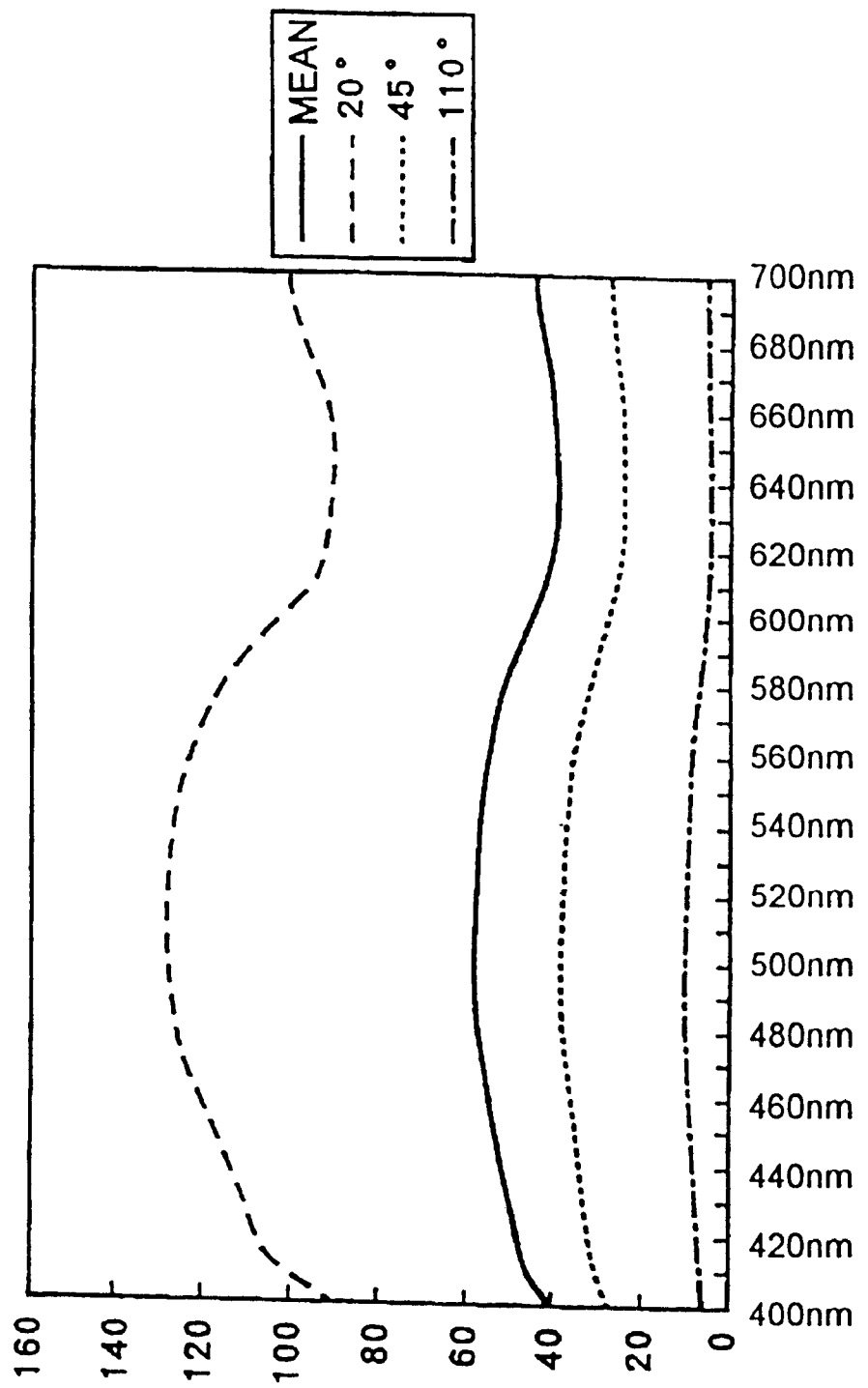
FIG. 8 shows a third example of colorant (3604)—standard metallic or pearlescent pigment formulation in colorant base data.

Colorant 10.10%+metallic or pearlescent pigment 89.90% $\cdots$ (FIG. 8)

Figure 9:
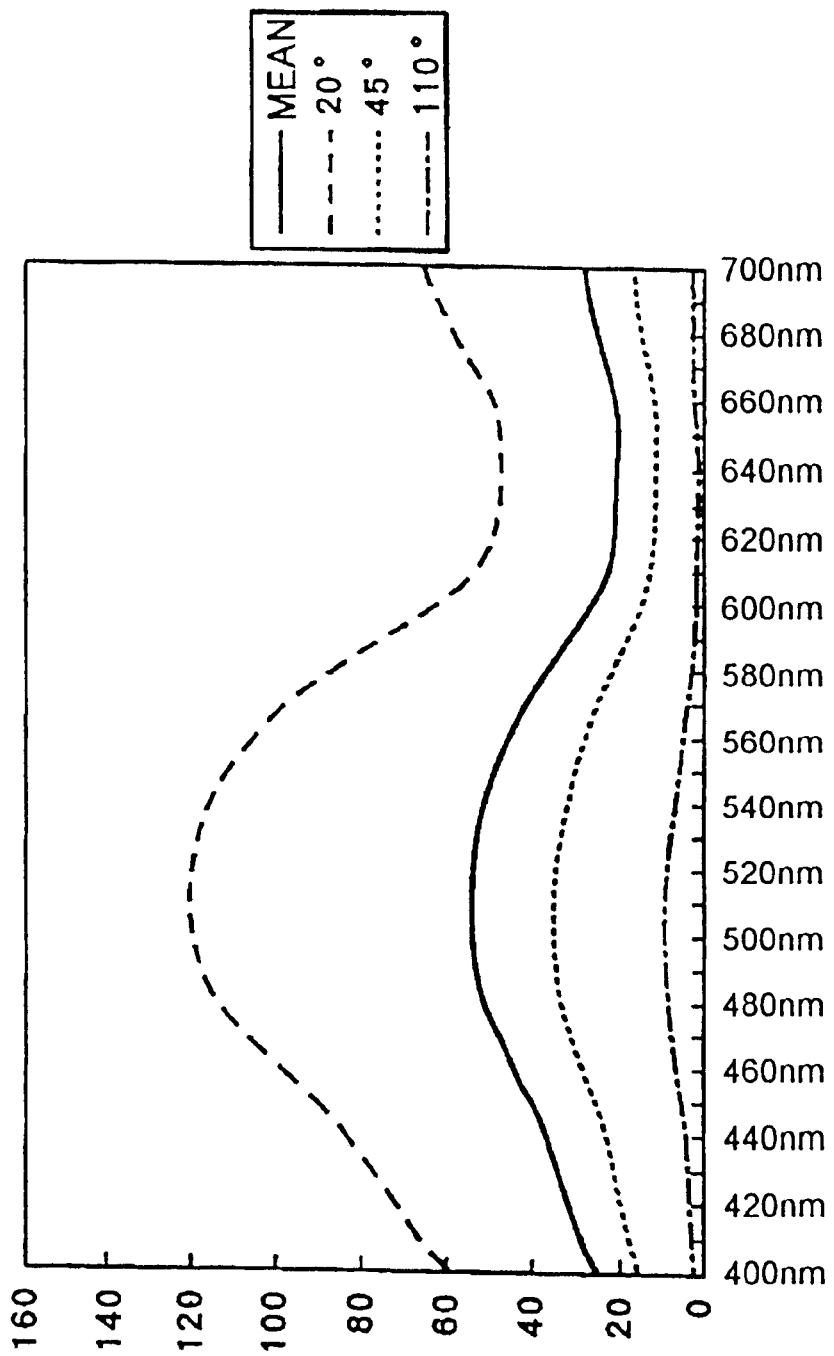
FIG. 9 shows a fourth example of colorant (3604)—standard metallic or pearlescent pigment formulation in colorant base data.

Colorant 29.77%+metallic or pearlescent pigment 70.23% $\cdots$ (FIG. 9)

Figure 10:
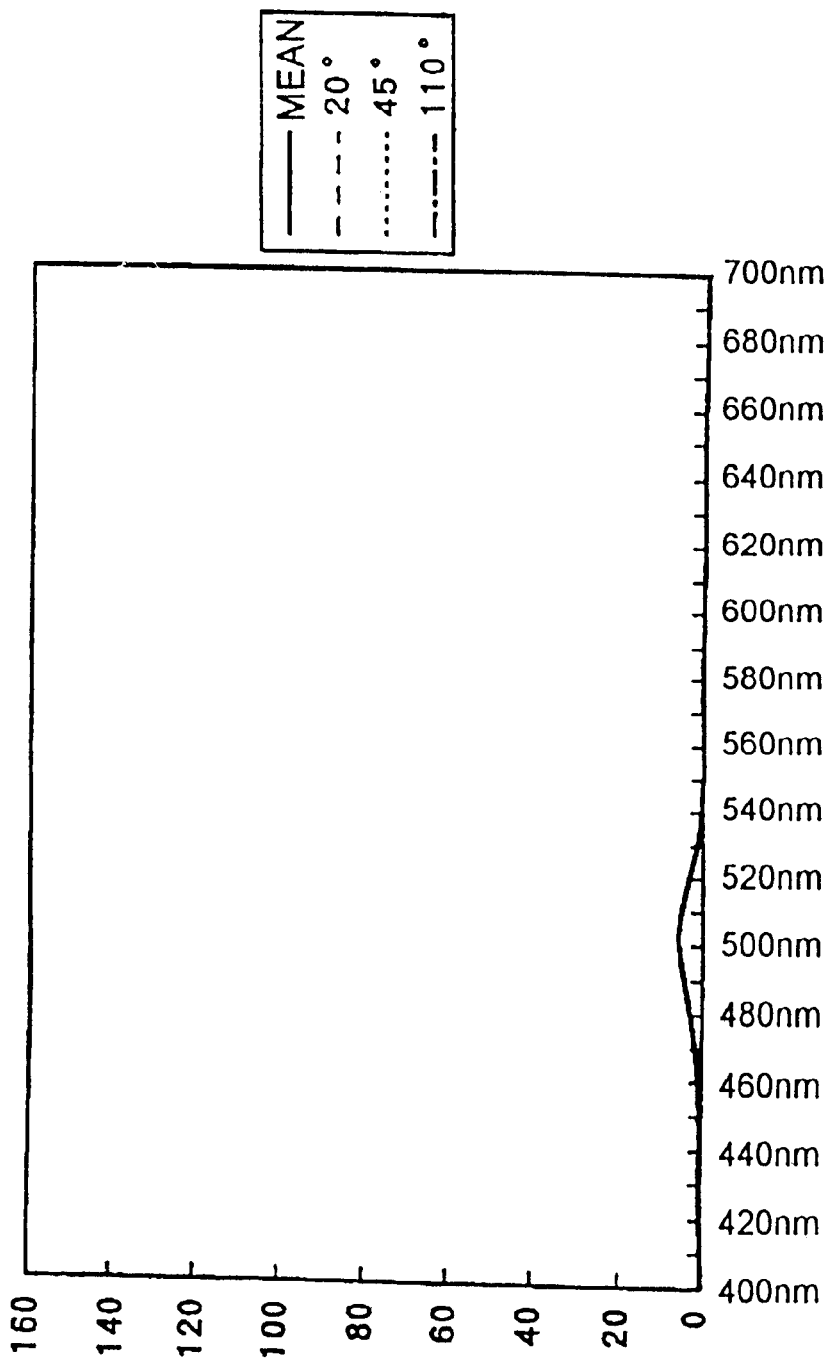
FIG. 10 shows a fifth example of colorant (3604)—standard metallic or pearlescent pigment formulation in colorant base data.

Colorant 100%+metallic or pearlescent pigment 0% $\cdots$ (FIG. 10)

(3) 3411

Figure 11:
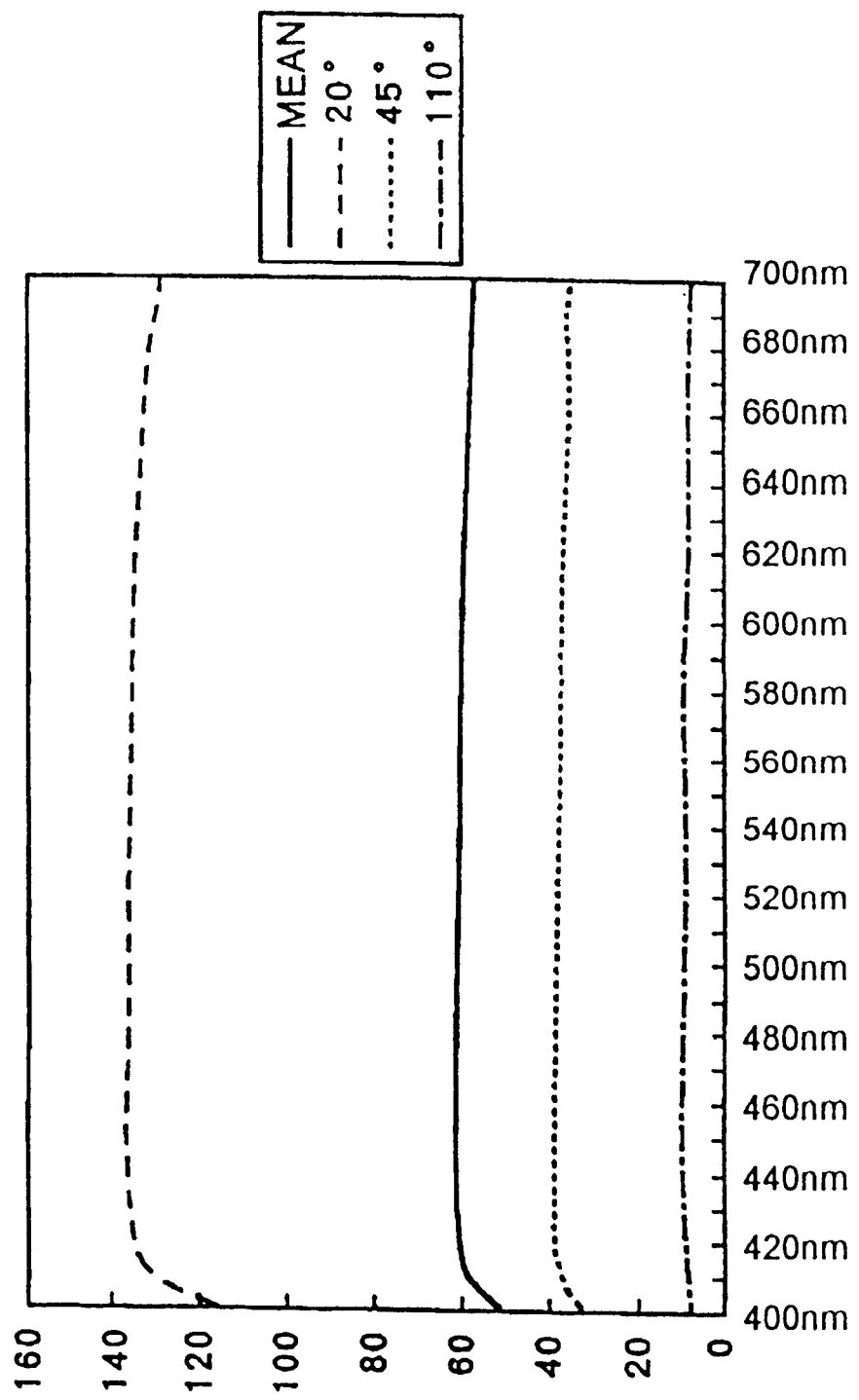
FIG. 11 shows a first example of colorant (3411)—standard metallic or pearlescent pigment formulation in colorant base data.

Colorant 0.00%+metallic or pearlescent pigment 100.00% $\cdots$ (FIG. 11)

Figure 12:
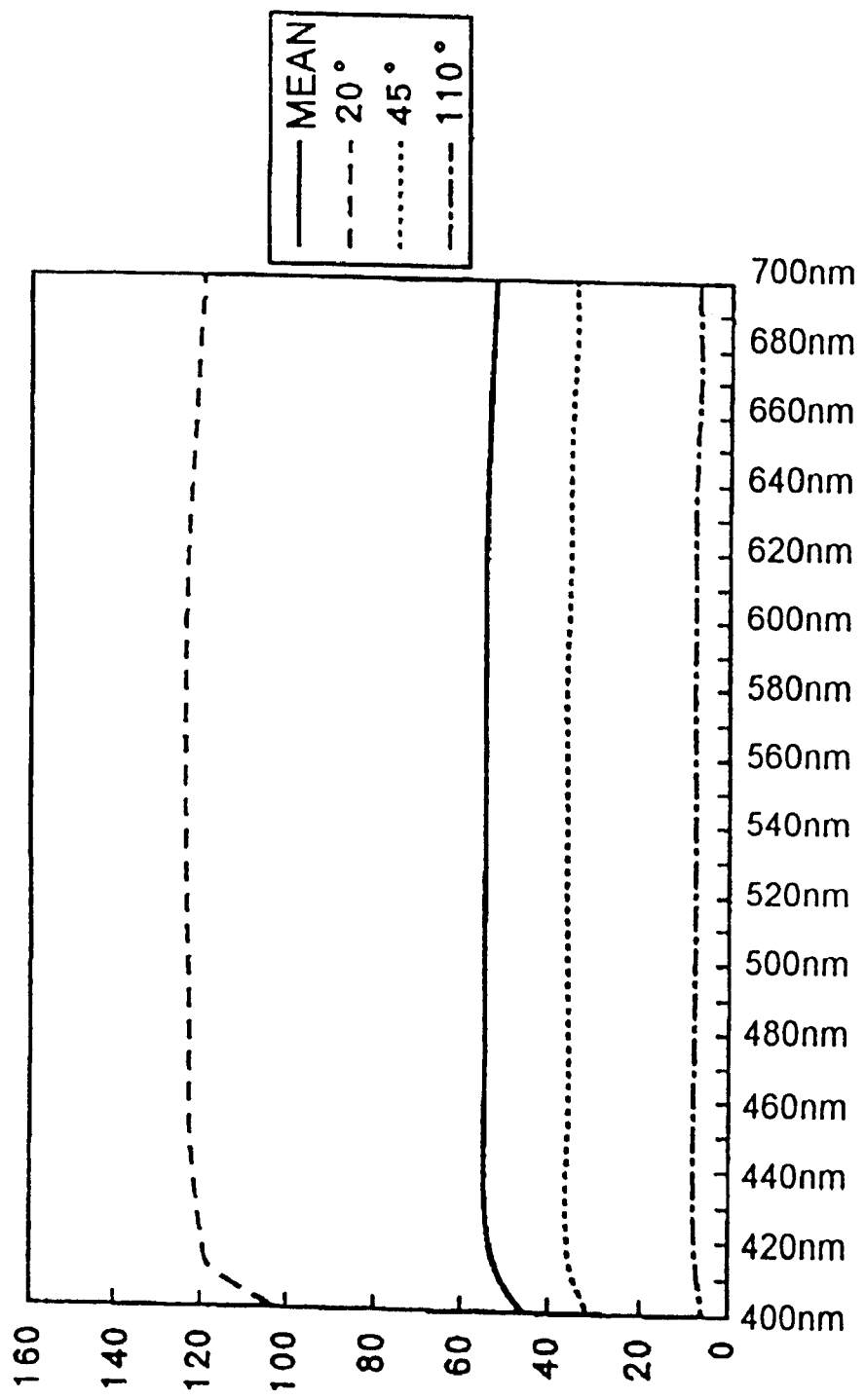
FIG. 12 shows a second example of colorant (3411)—standard metallic or pearlescent pigment formulation in colorant base data.

Colorant 3.03%+metallic or pearlescent pigment 96.97% $\cdots$ (FIG. 12)

Figure 13:
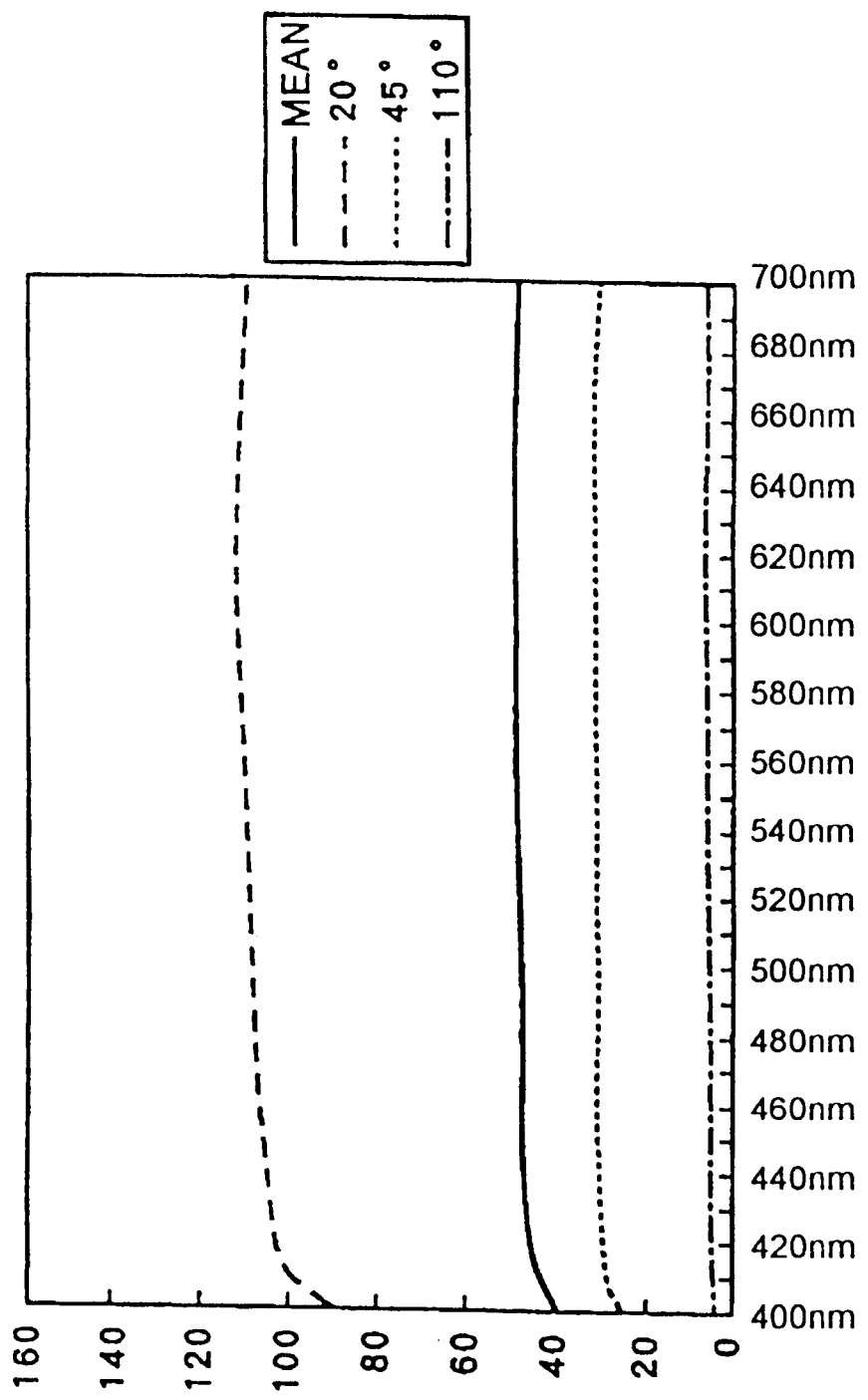
FIG. 13 shows a third example of colorant (3411)—standard metallic or pearlescent pigment formulation in colorant base data.

Colorant 10.39%+metallic or pearlescent pigment 89.61% $\cdots$ (FIG. 13)

Figure 14:
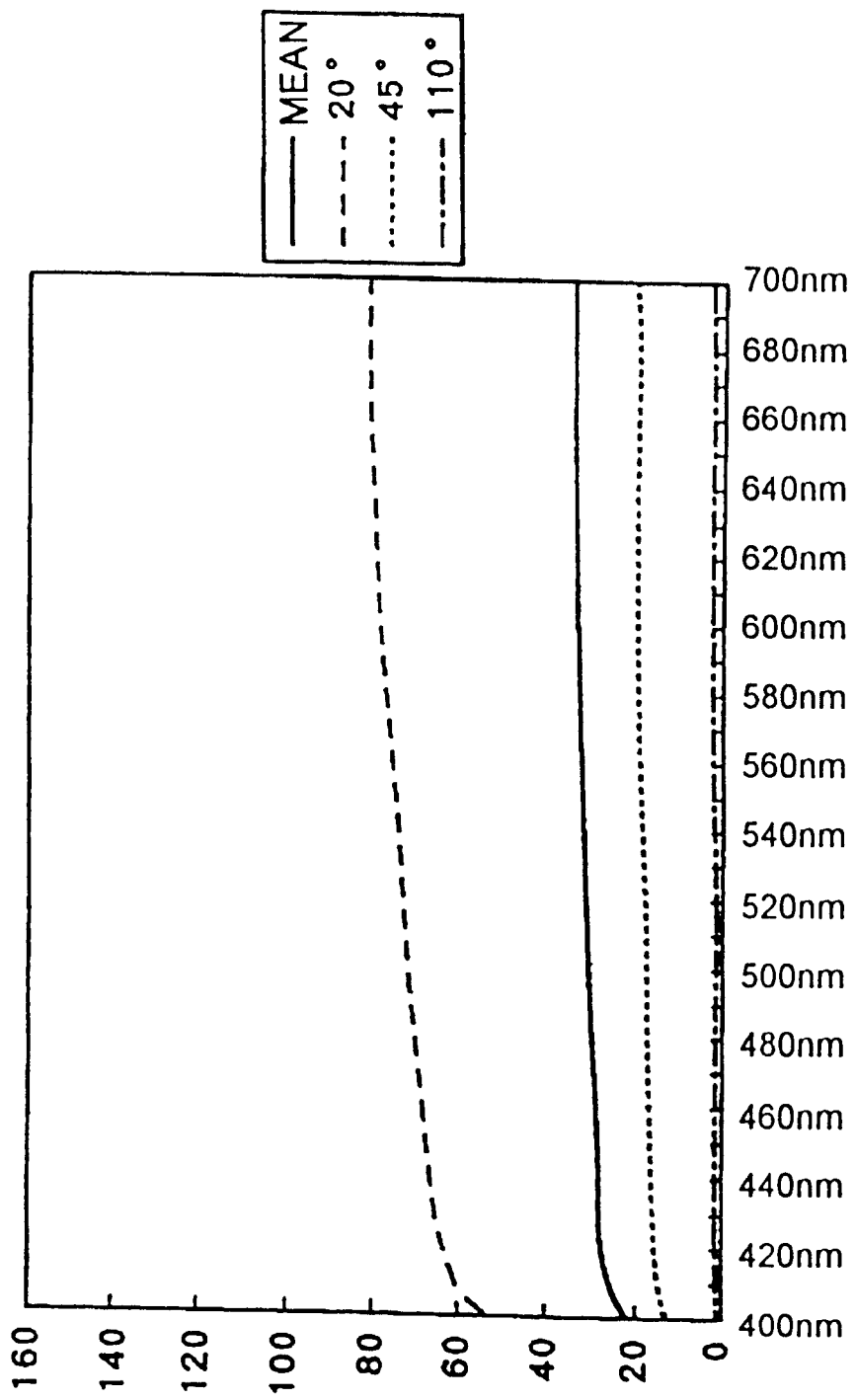
FIG. 14 shows a fourth example of colorant (3411)—standard metallic or pearlescent pigment formulation in colorant base data.

Colorant 29.91%+metallic or pearlescent pigment 70.09% $\cdots$ (FIG. 14)

Figure 15:
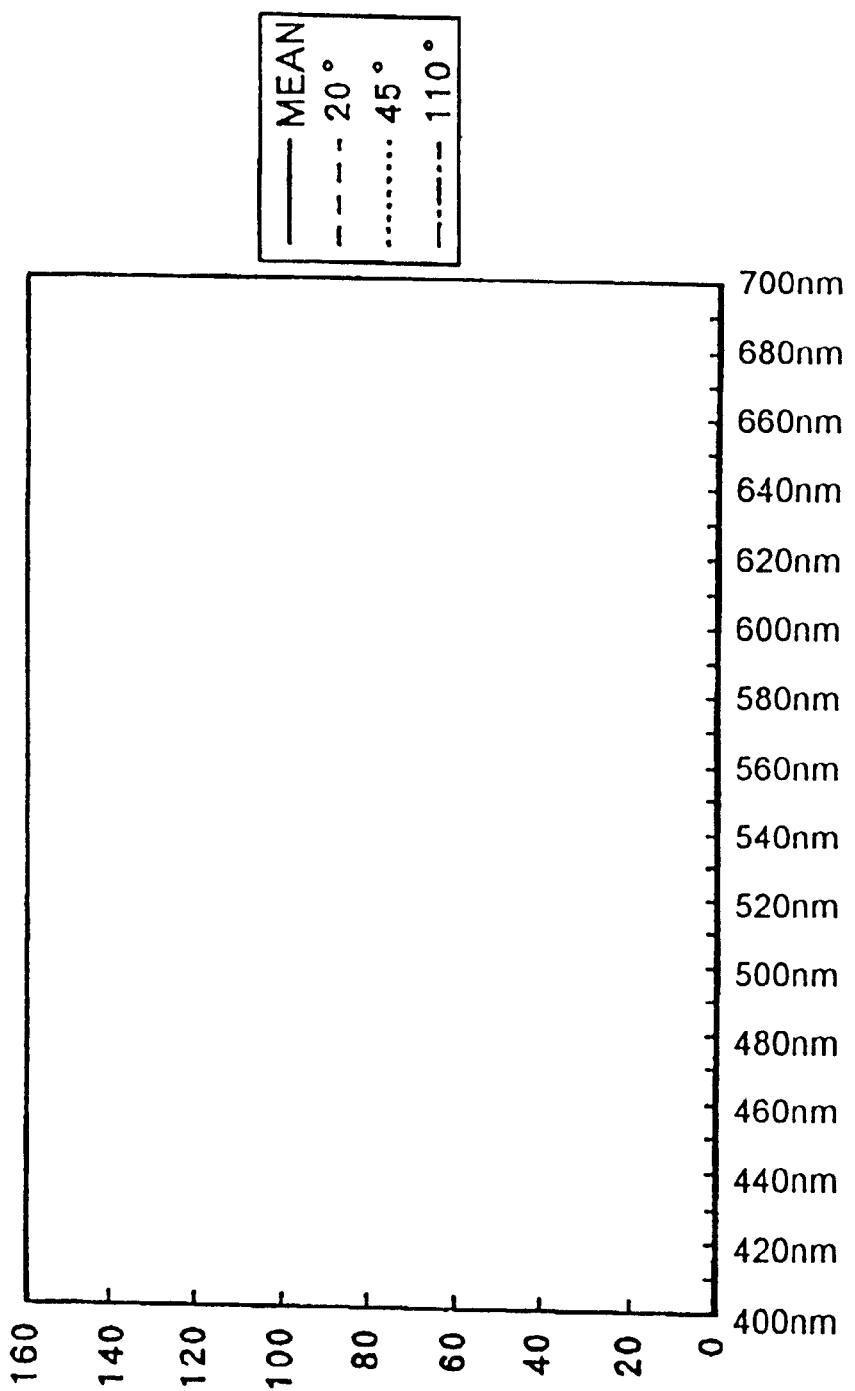
FIG. 15 shows a fifth example of colorant (3411)—standard metallic or pearlescent pigment formulation in colorant base data.

Colorant 100%+metallic or pearlescent pigment 0% $\cdots$ (FIG. 15)

Metallic or Pearlescent Base Data

To generate metallic or pearlescent pigment base data, the respective metallic or pearlescent pigments are mixed with a clear base in the following formulating ratios.

(1) 3032

Figure 16:
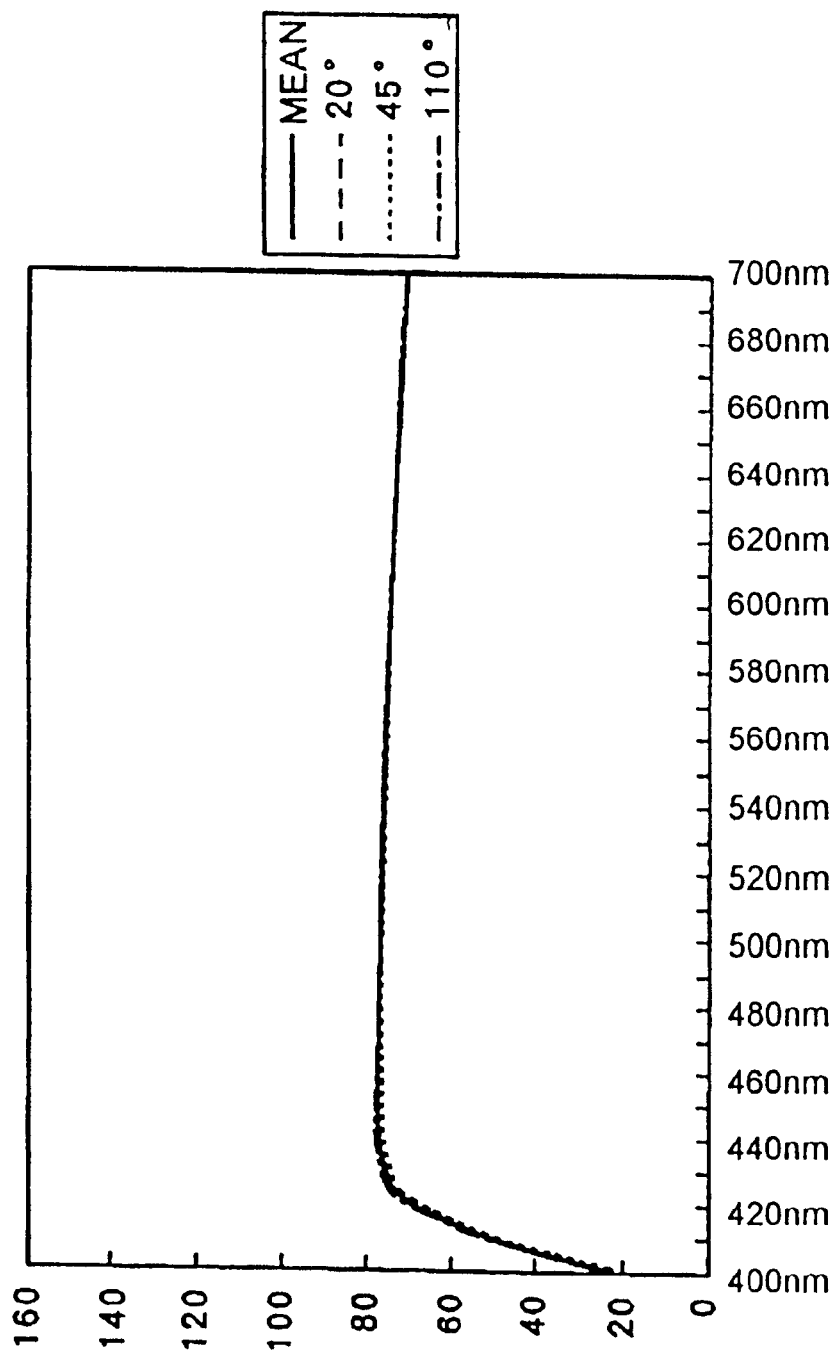
FIG. 16 is a diagram showing a first example of metallic or pearlescent pigment (3032)—clear base formulation in metallic or pearlescent pigment base data.

Metallic or pearlescent pigment 0.00%+clear base 100.00% $\cdots$ (FIG. 16)

Figure 17:
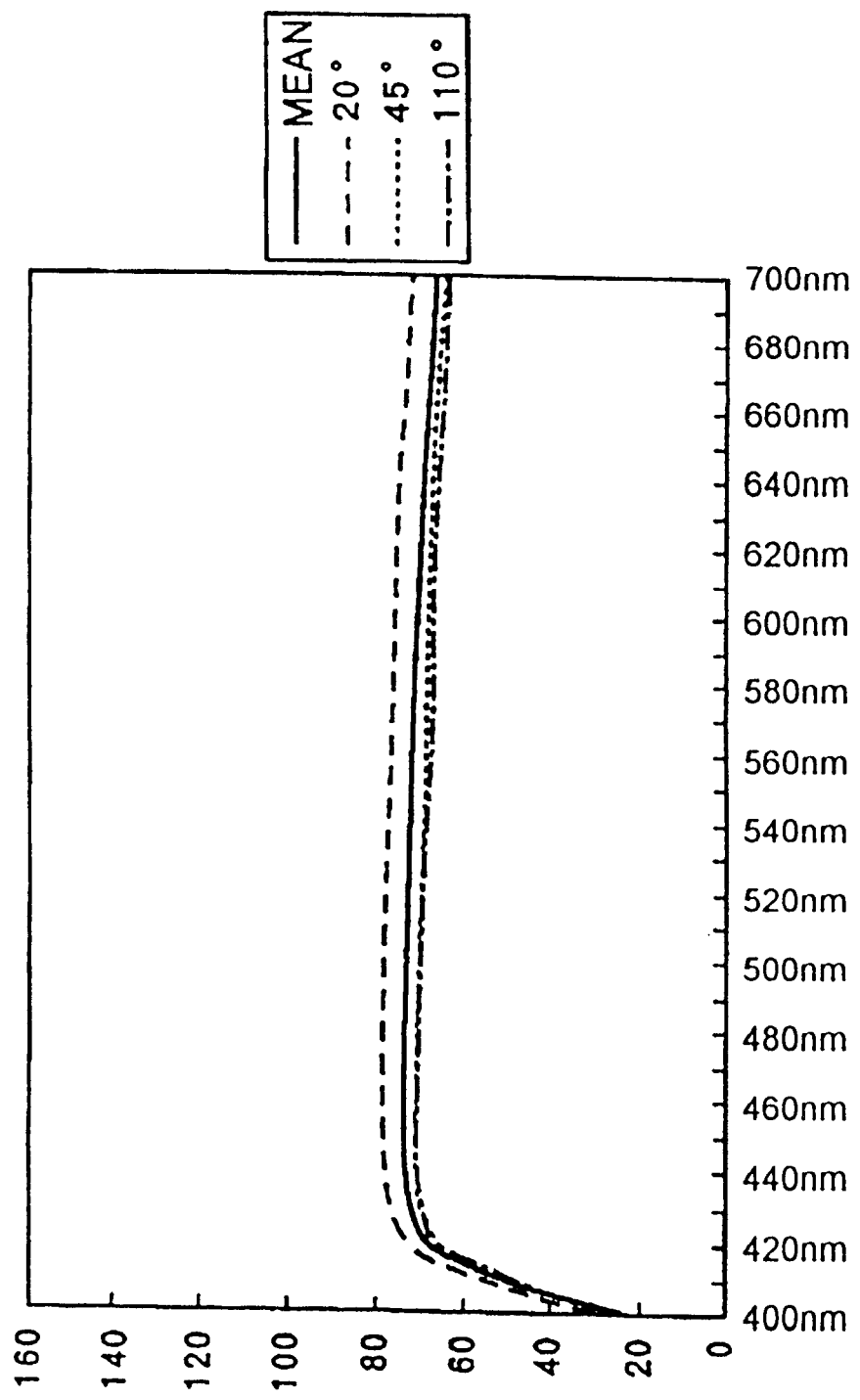
FIG. 17 is a diagram showing a second example of metallic or pearlescent pigment (3032)—clear base formulation in metallic or pearlescent pigment base data.

Metallic or pearlescent pigment 1.06%+clear base 98.94% $\cdots$ (FIG. 17)

Figure 18:
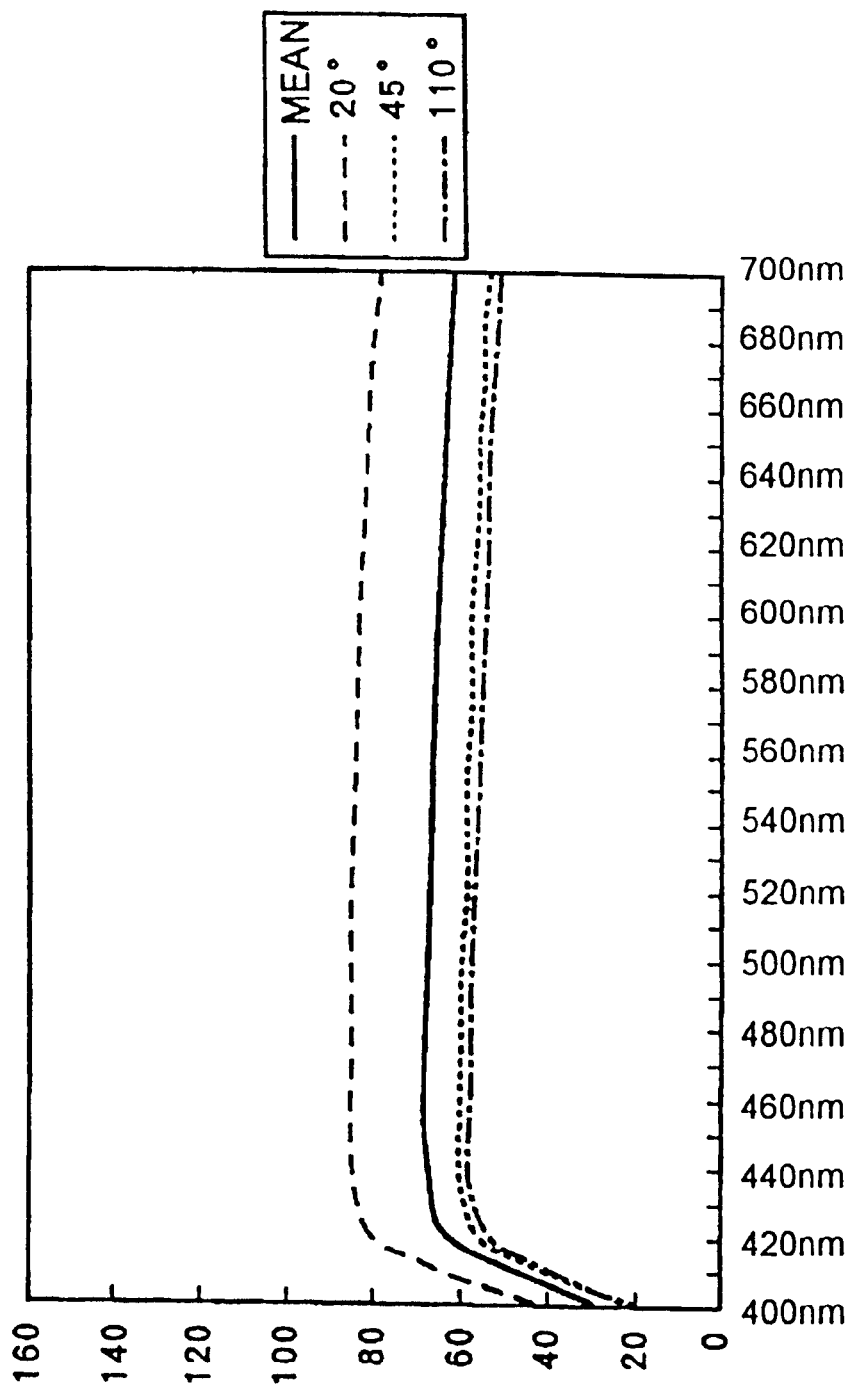
FIG. 18 is a diagram showing a third example of metallic or pearlescent pigment (3032)—clear base formulation in metallic or pearlescent pigment base data.

Metallic or pearlescent pigment 3.06%+clear base 96.94% $\cdots$ (FIG. 18)

Figure 19:
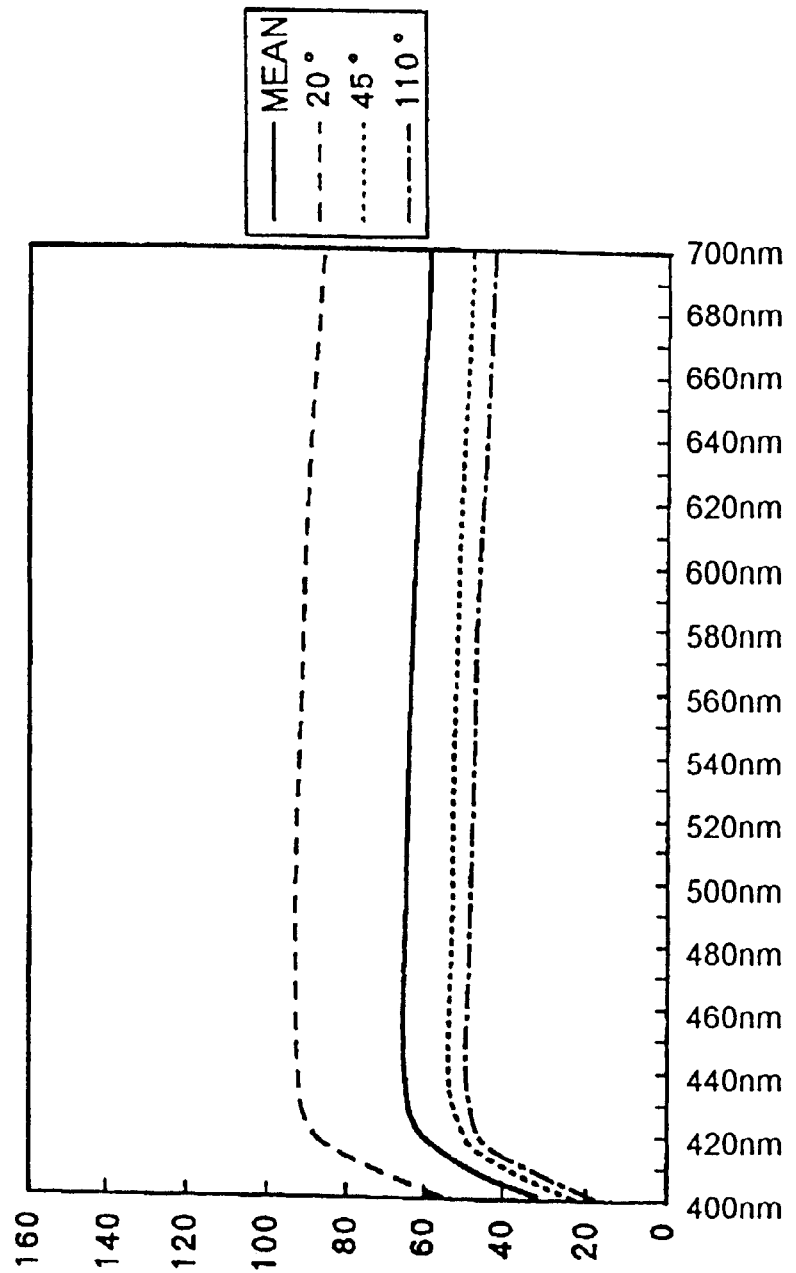
FIG. 19 is a diagram showing a fourth example of metallic or pearlescent pigment (3032)—clear base formulation in metallic or pearlescent pigment base data.

Metallic or pearlescent pigment 5.03%+clear base 94.97% · · · (FIG. 19)

Figure 20:
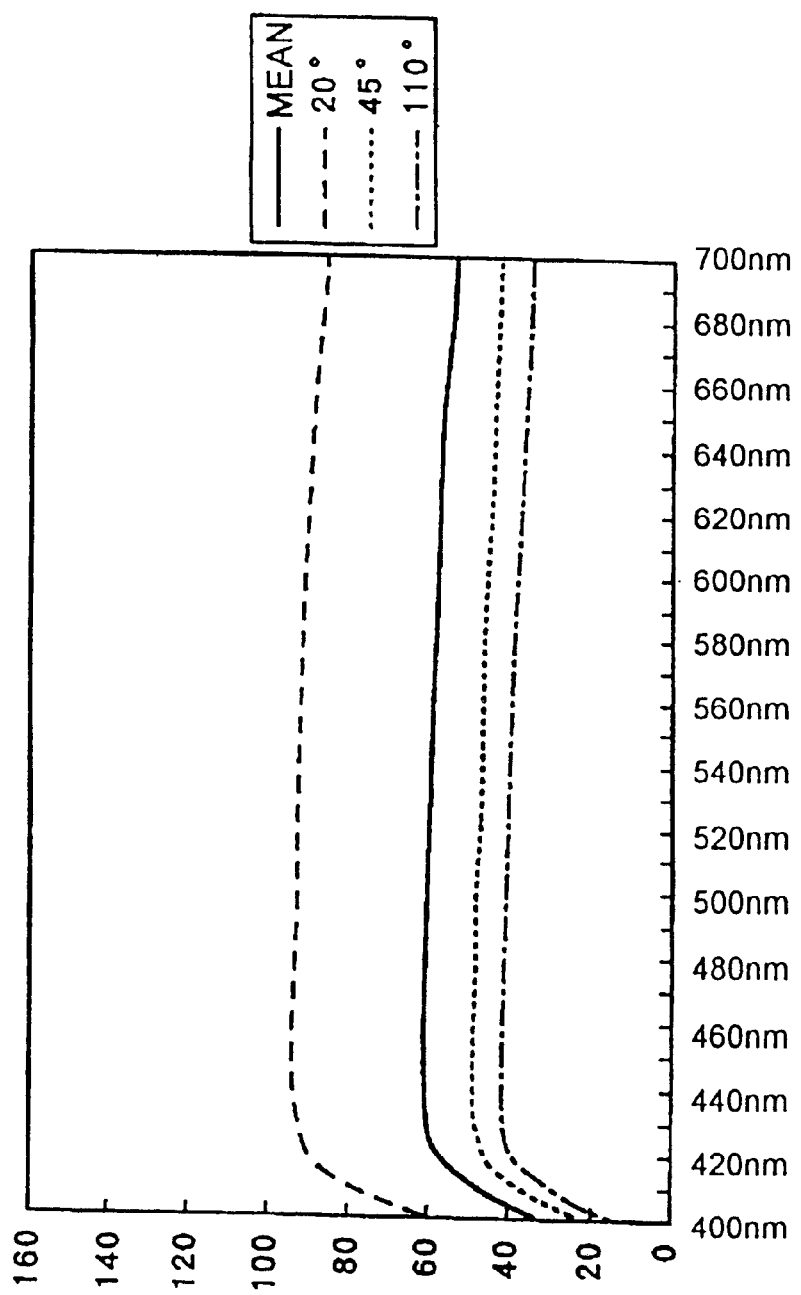
FIG. 20 is a diagram showing a fifth example of metallic or pearlescent pigment (3032)—clear base formulation in metallic or pearlescent pigment base data.

Metallic or pearlescent pigment 7.06%+clear base 92.94% · · · (FIG. 20)

Figure 21:
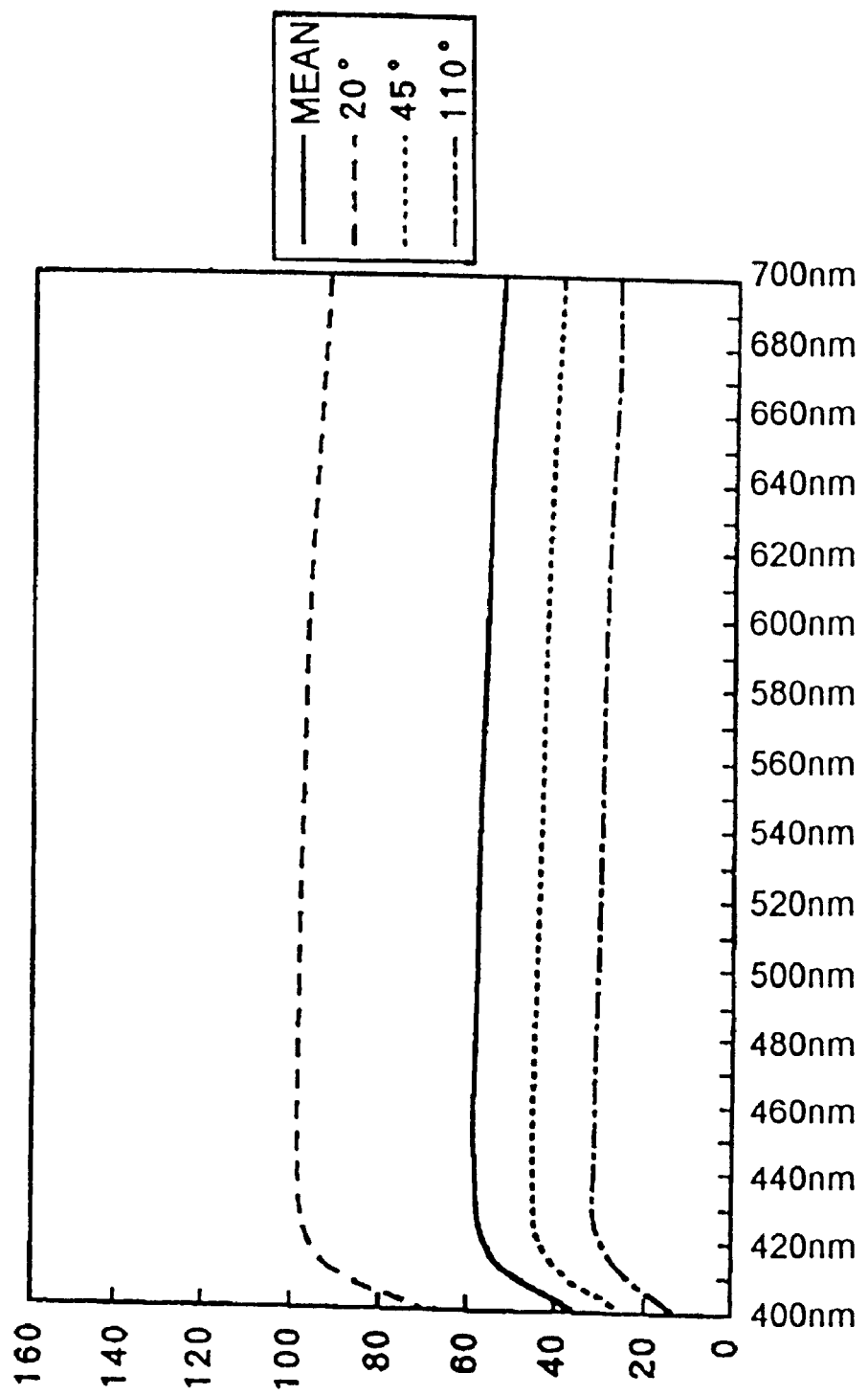
FIG. 21 is a diagram showing a sixth example of metallic or pearlescent pigment (3032)—clear base formulation in metallic or pearlescent pigment base data.

Metallic or pearlescent pigment 10.01%+clear base 89.99% · · · (FIG. 21)

Figure 22:
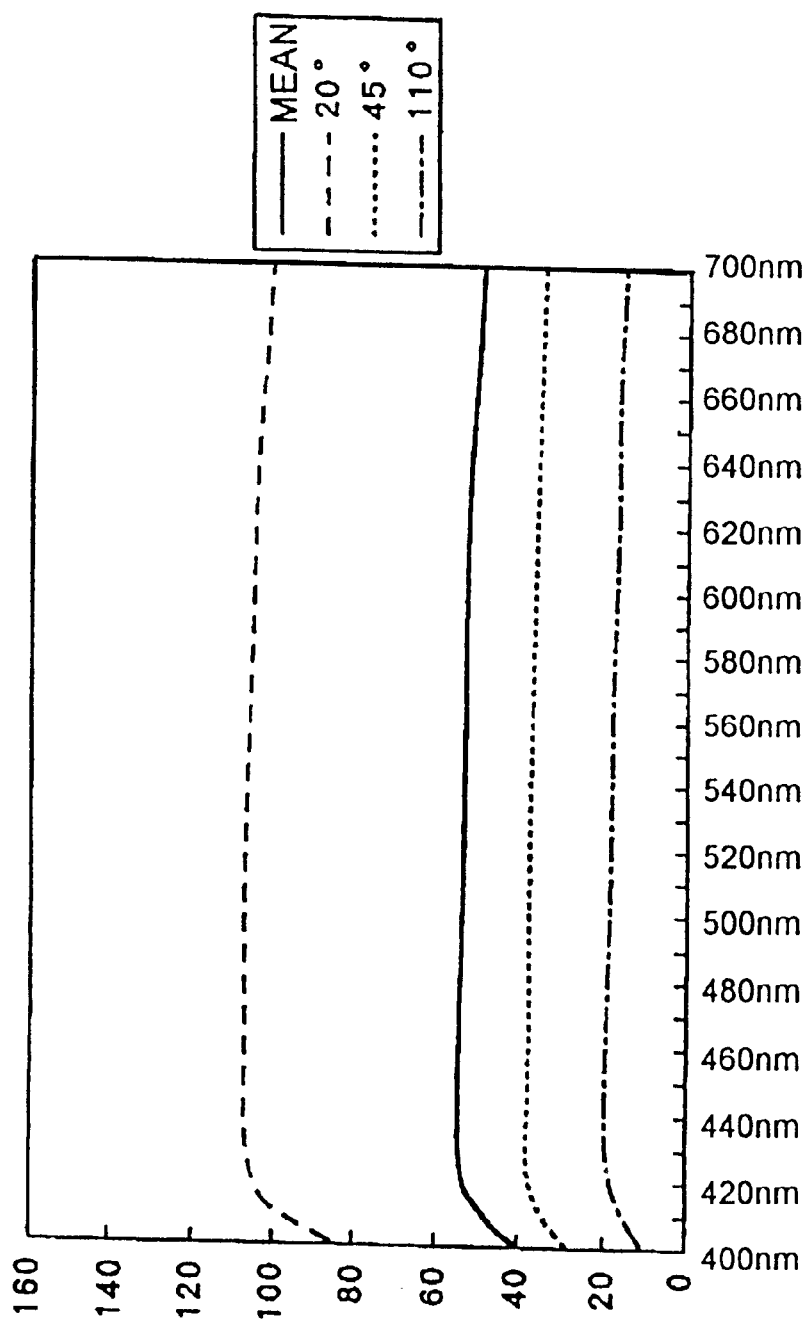
FIG. 22 is a diagram showing a seventh example of metallic or pearlescent pigment (3032)—clear base formulation in metallic or pearlescent pigment base data.

Metallic or pearlescent pigment 20.41%+clear base 79.59% · · · (FIG. 22)

Figure 23:
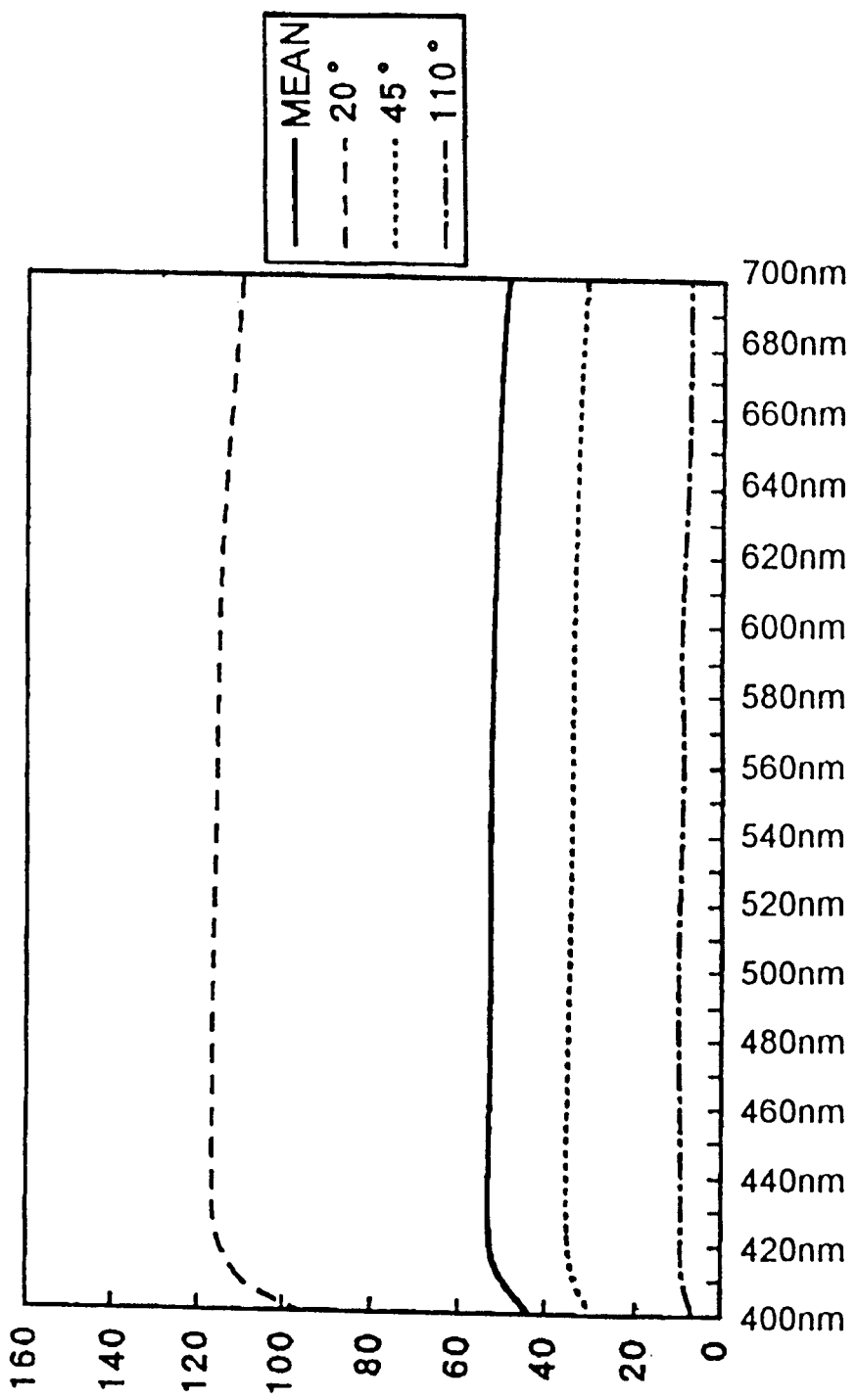
FIG. 23 is a diagram showing a eighth example of metallic or pearlescent pigment (3032)—clear base formulation in metallic or pearlescent pigment base data.

Metallic or pearlescent pigment 29.83%+clear base 70.17% · · · (FIG. 23)

Figure 24:
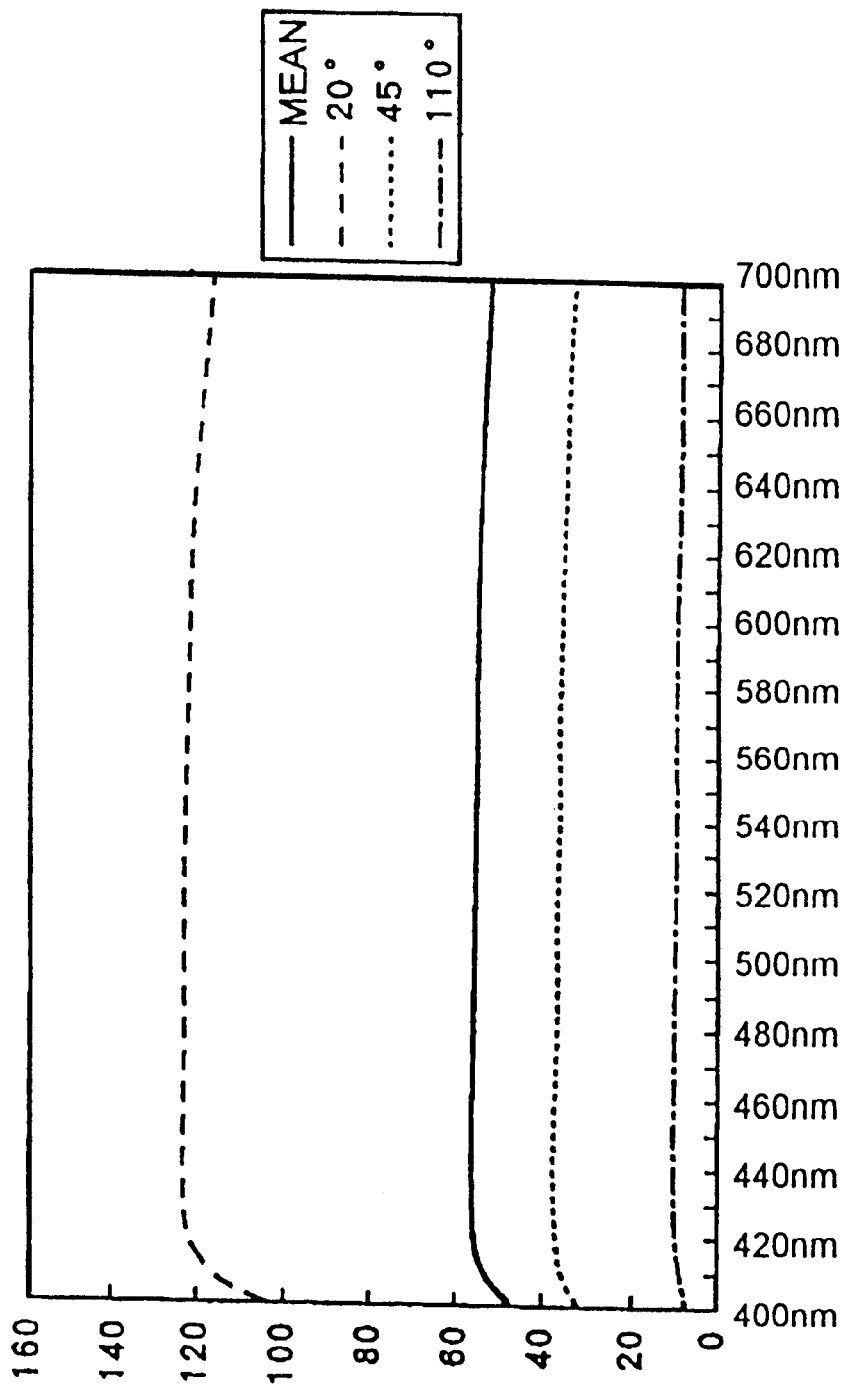
FIG. 24 is a diagram showing a ninth example of metallic or pearlescent pigment (3032)—clear base formulation in metallic or pearlescent pigment base data.

Metallic or pearlescent pigment 49.83%+clear base 50.17% · · · (FIG. 24)

Figure 25:
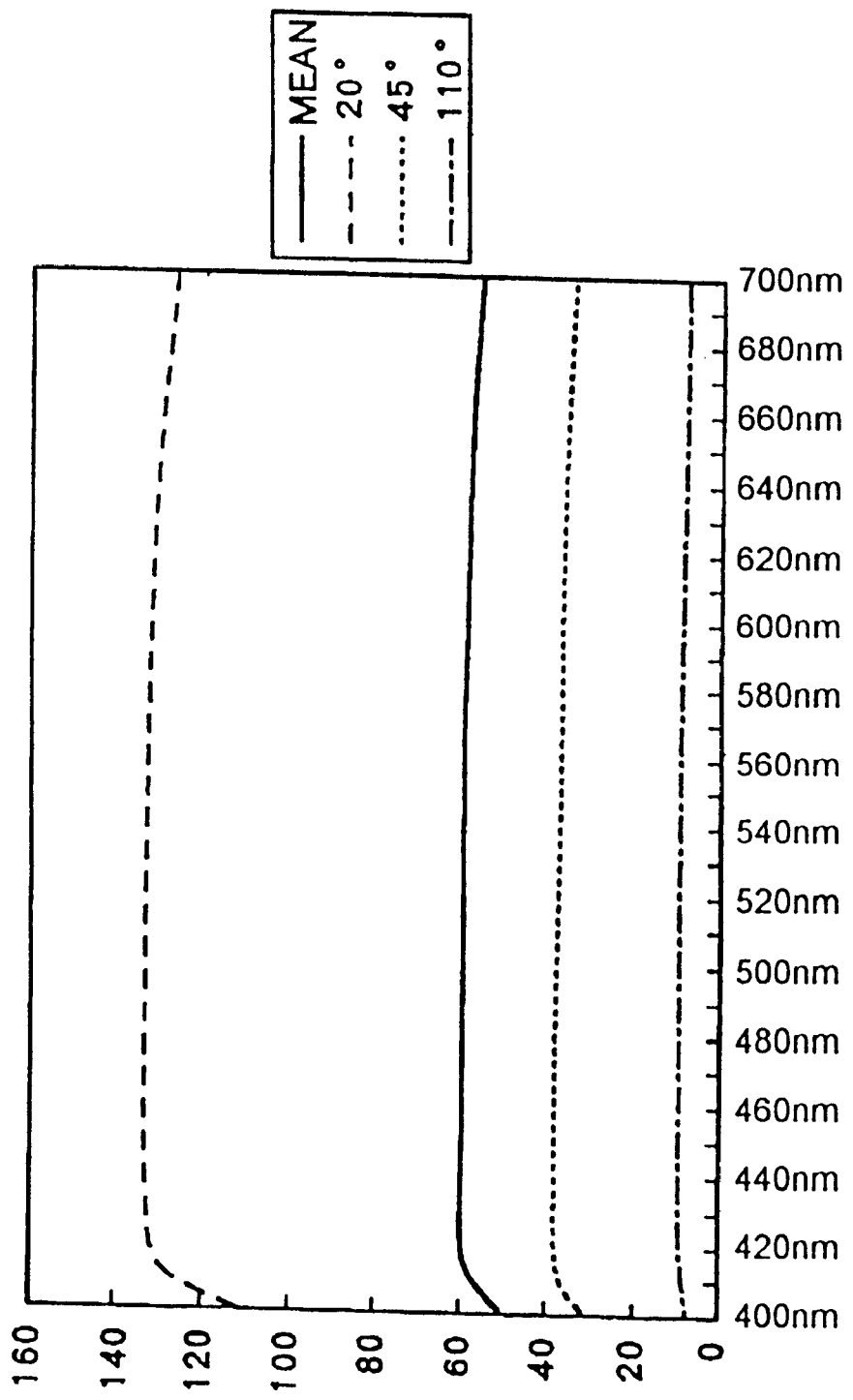
FIG. 25 is a diagram showing a tenth example of metallic or pearlescent pigment (3032)—clear base formulation in metallic or pearlescent pigment base data.

Metallic or pearlescent pigment 69.80%+clear base 30.20% · · · (FIG. 25)

Figure 26:
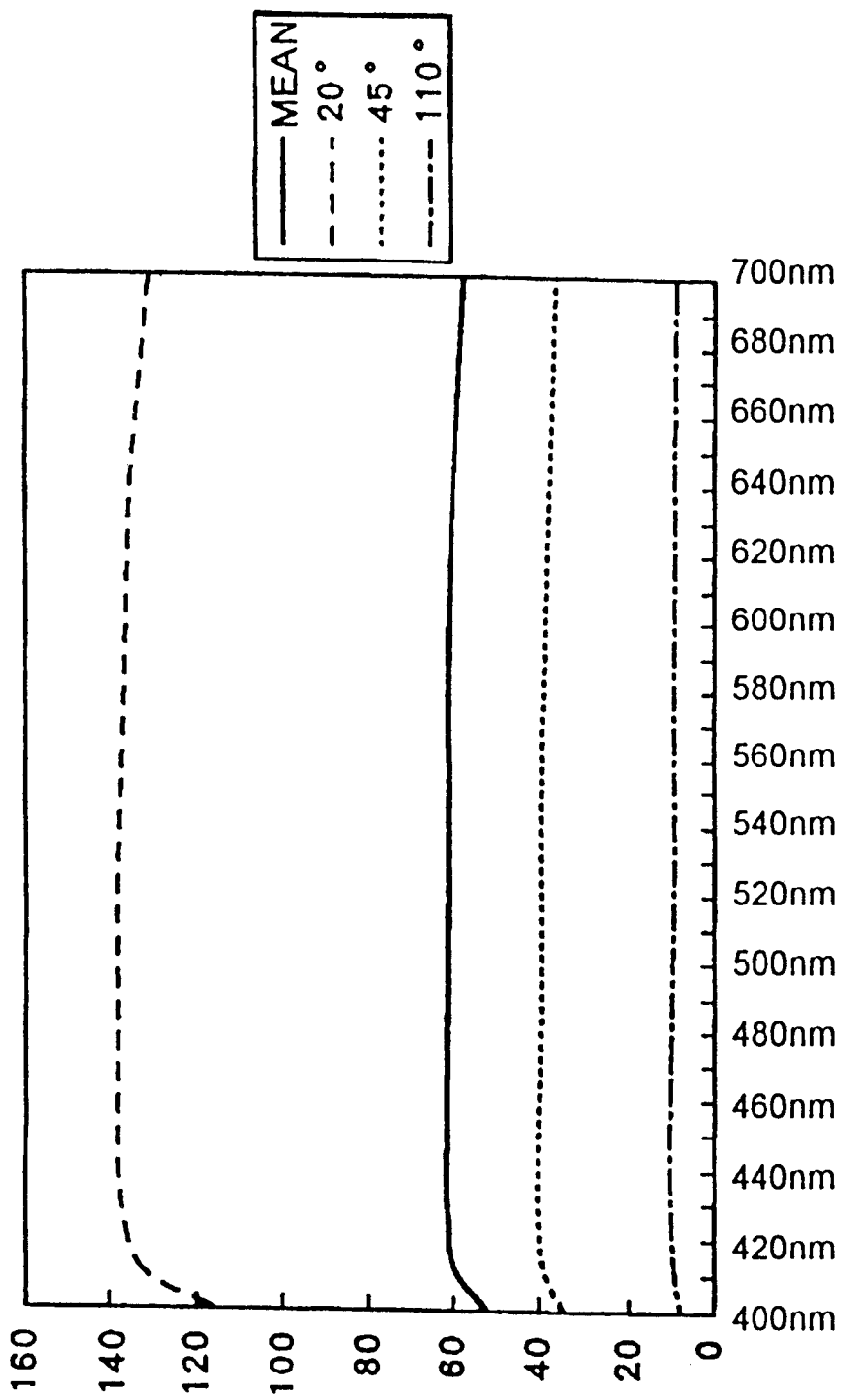
FIG. 26 is a diagram showing a eleventh example of metallic or pearlescent pigment (3032)—clear 1base formulation in metallic or pearlescent pigment base data.

Metallic or pearlescent pigment 100.00%+clear base 0.00% · · · (FIG. 26)

(2) 3034

Figure 27:
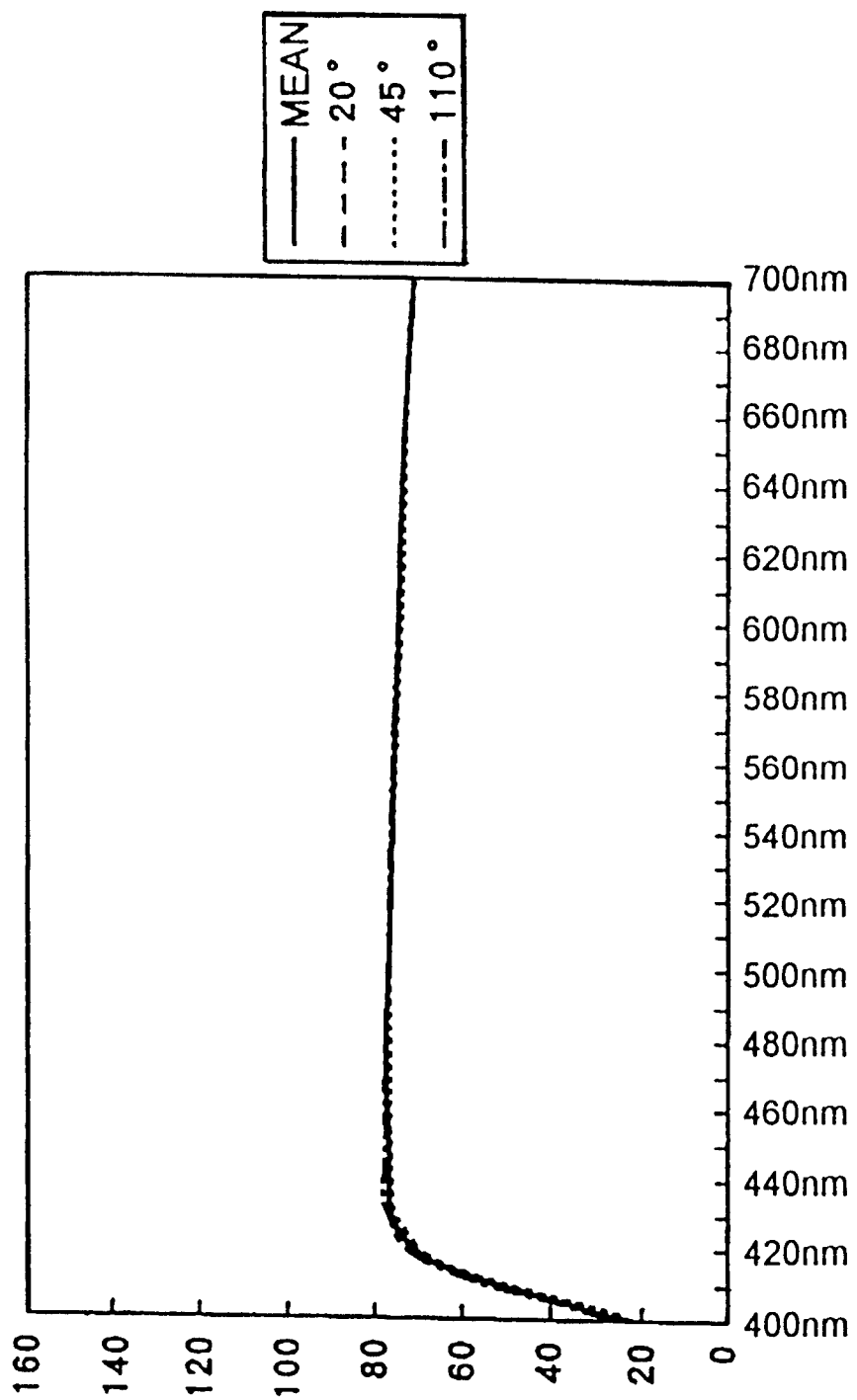
FIG. 27 is a diagram showing a first example of metallic or pearlescent pigment (3034)—clear base formulation in metallic or pearlescent pigment base data.

Metallic or pearlescent pigment 0.00%+clear base 100.00% · · · (FIG. 27)

Figure 28:
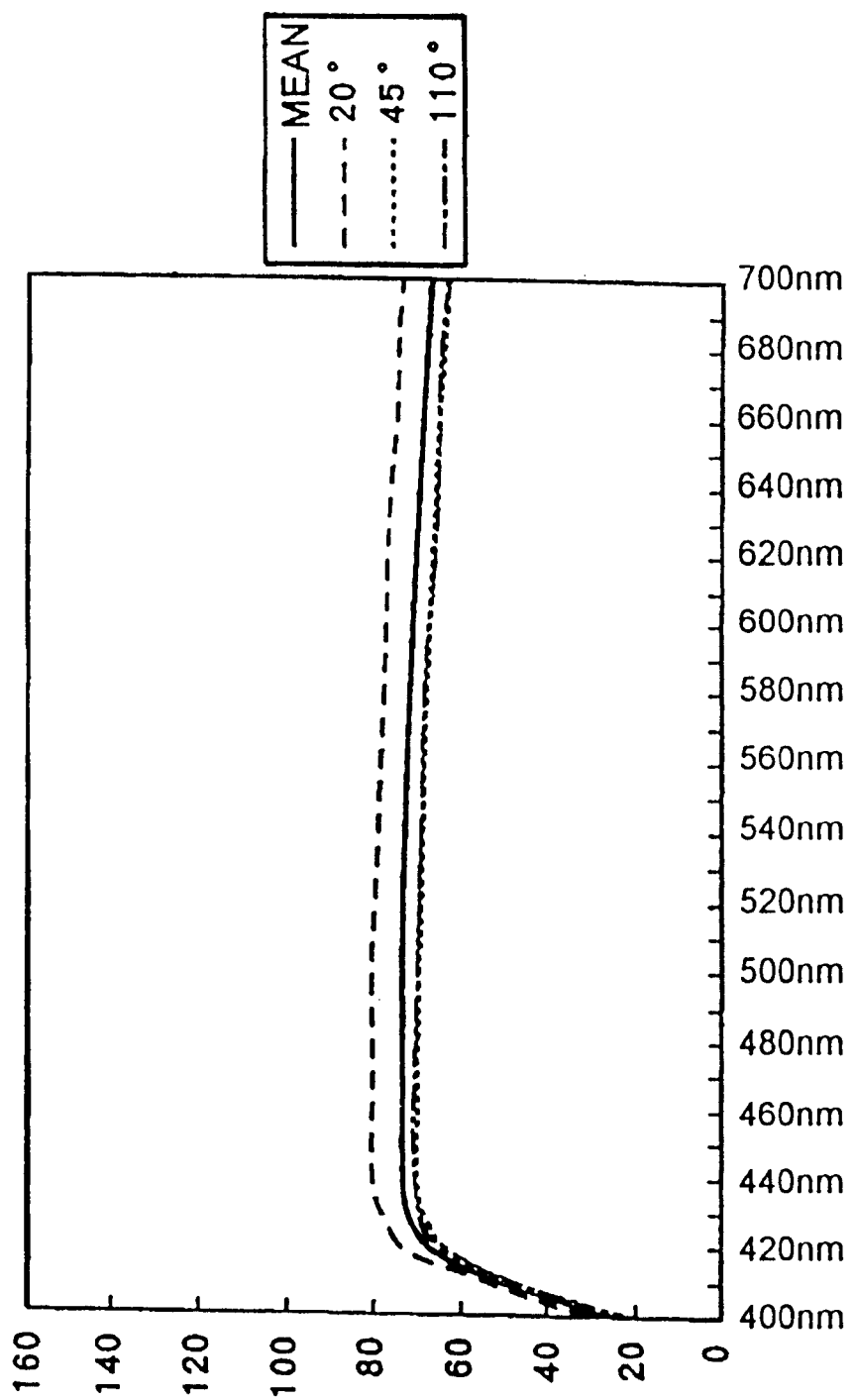
FIG. 28 is a diagram showing a second example of metallic or pearlescent pigment (3034)—clear base formulation in metallic or pearlescent pigment base data.

Metallic or pearlescent pigment 1.02%+clear base 98.98% · · · (FIG. 28)

Figure 29:
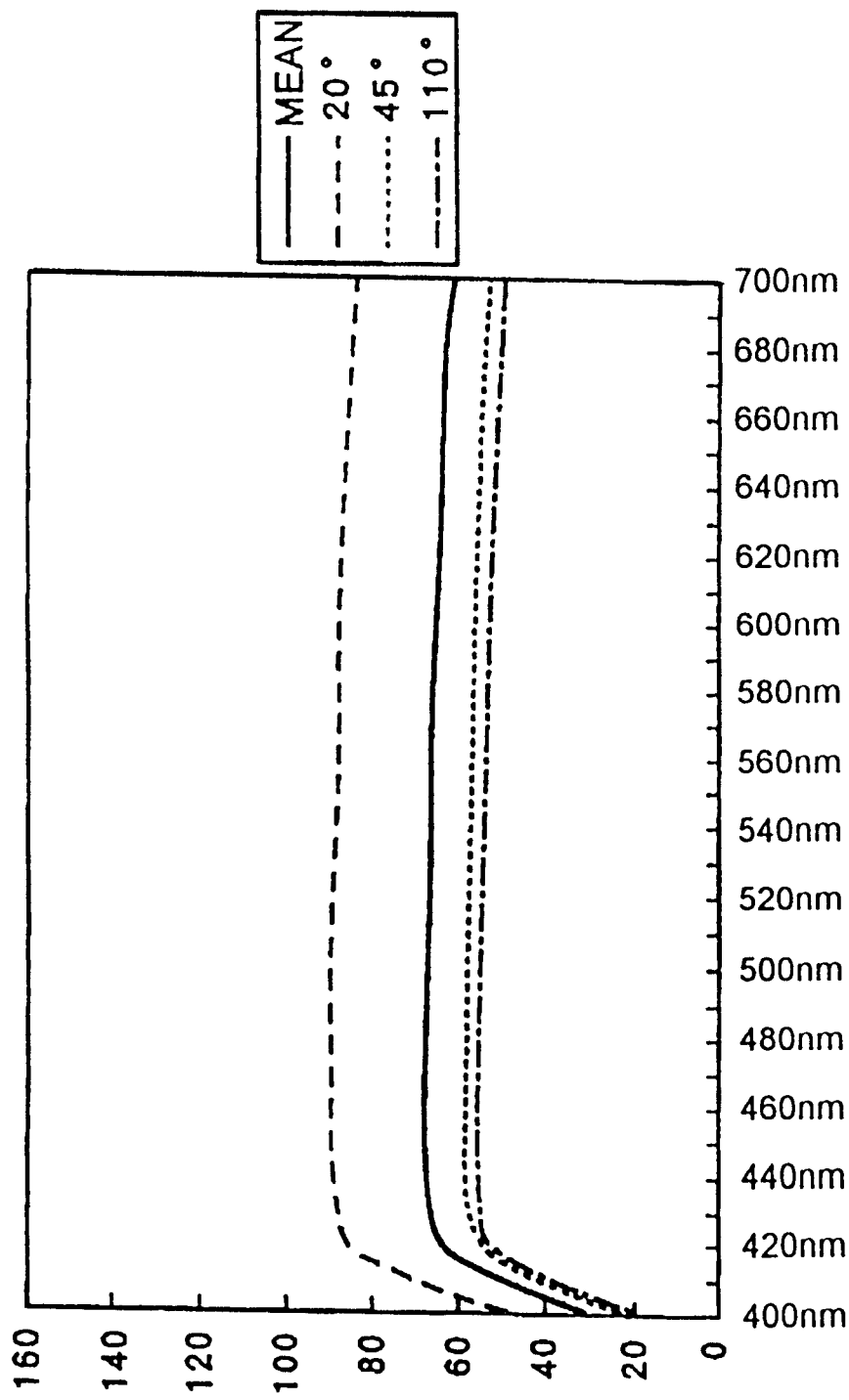
FIG. 29 is a diagram showing a third example of metallic or pearlescent pigment (3034)—clear base formulation in metallic or pearlescent pigment base data.

Metallic or pearlescent pigment 3.04%+clear base 96.96% · · · (FIG. 29)

Figure 30:
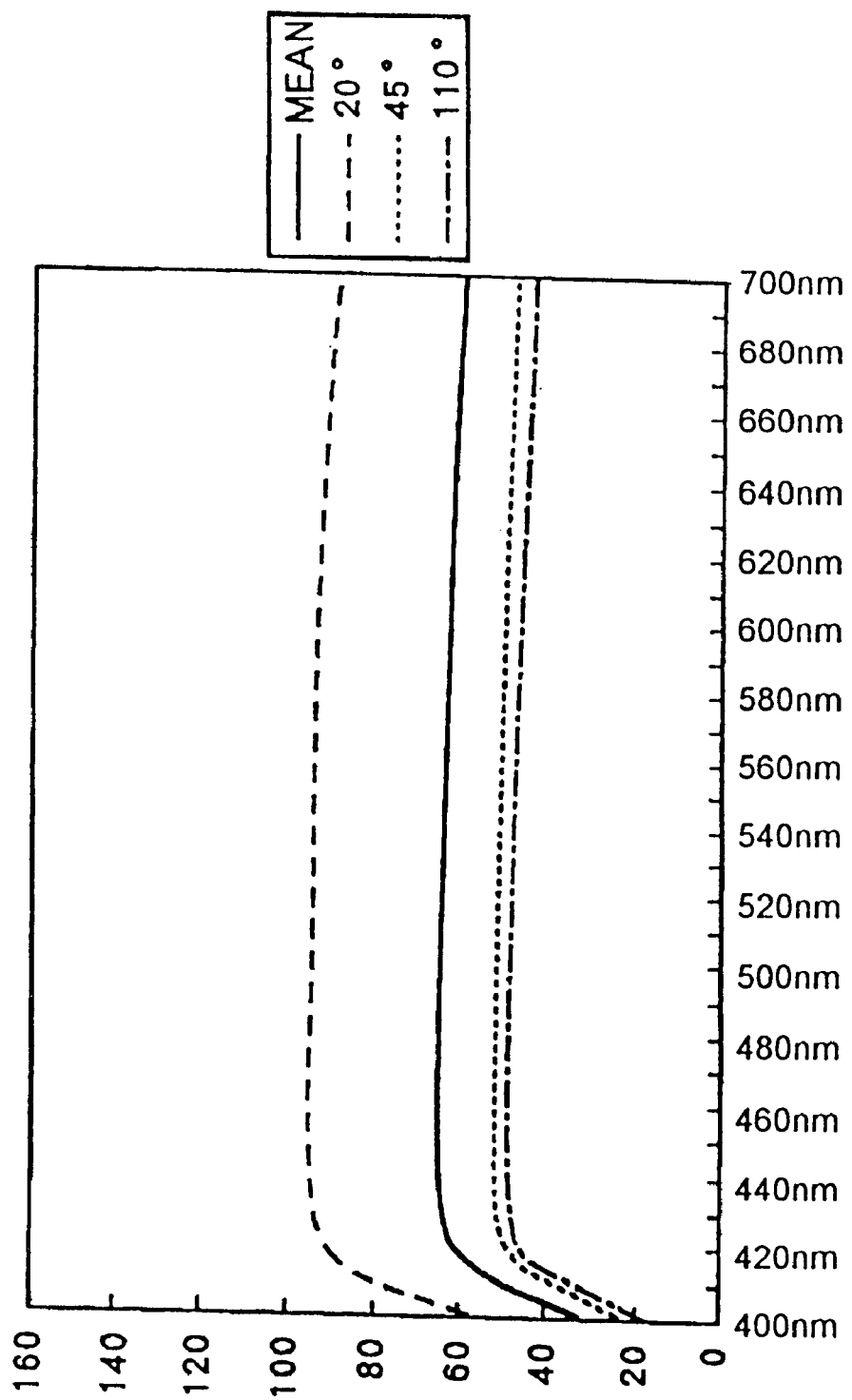
FIG. 30 is a diagram showing a fourth example of metallic or pearlescent pigment (3034)—clear base formulation in metallic or pearlescent pigment base data.

Metallic or pearlescent pigment 5.00%+clear base 95.00% · · · (FIG. 30)

Figure 31:
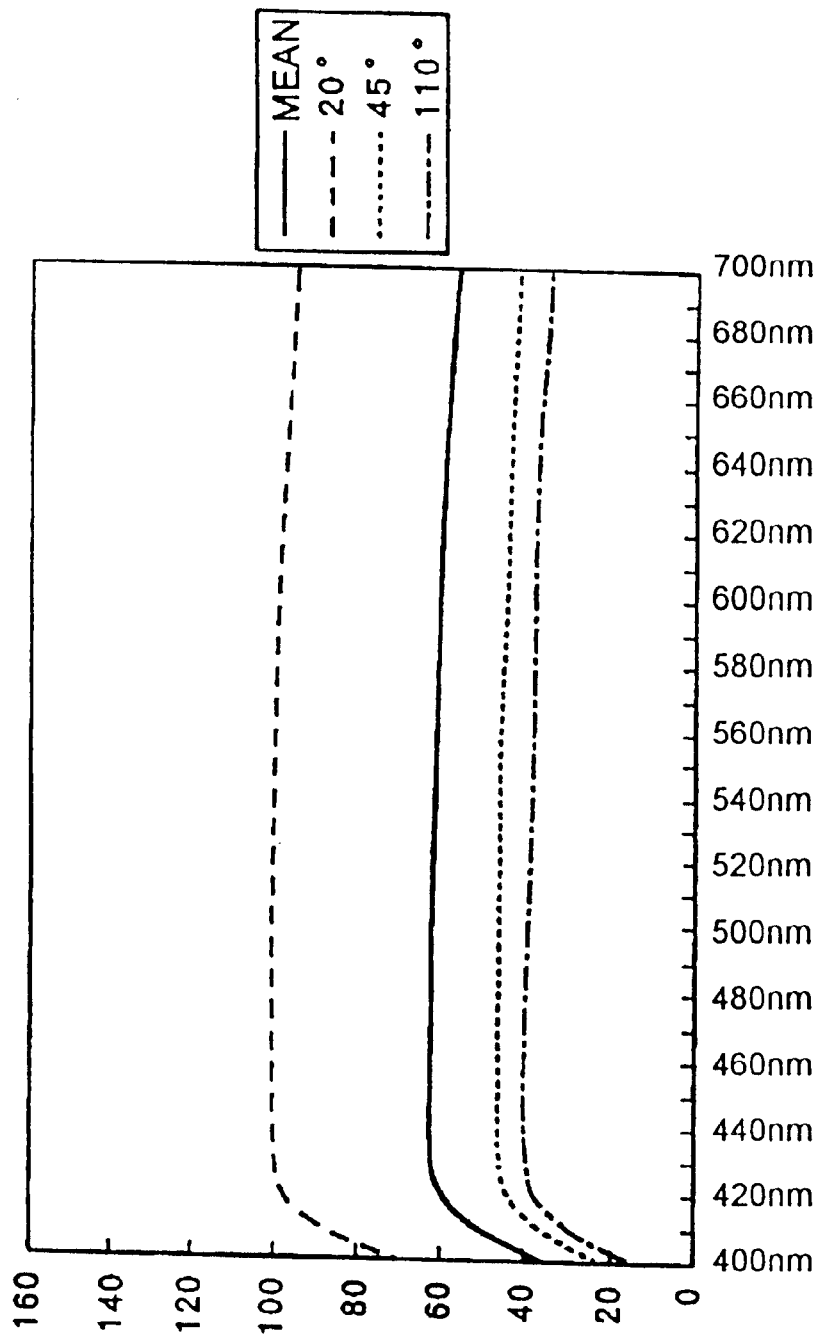
FIG. 31 is a diagram showing a fifth example of metallic or pearlescent pigment (3034)—clear base formulation in metallic or pearlescent pigment base data.

Metallic or pearlescent pigment 7.00%+clear base 93.00% · · · (FIG. 31)

Figure 32:
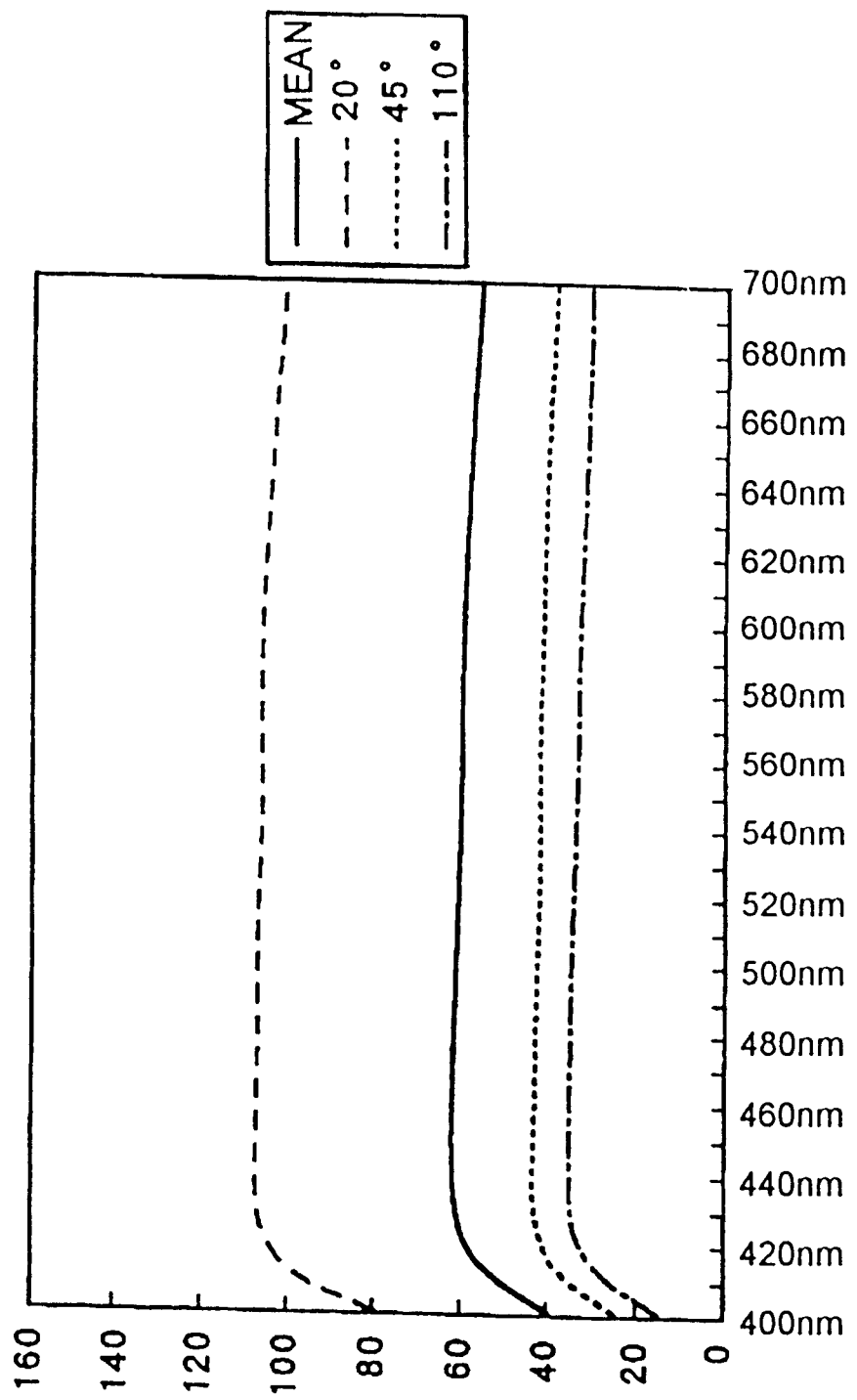
FIG. 32 is a diagram showing a sixth example of metallic or pearlescent pigment (3034)—clear base formulation in metallic or pearlescent pigment base data.

Metallic or pearlescent pigment 9.99%+clear base 90.01% · · · (FIG. 32)

Figure 33:
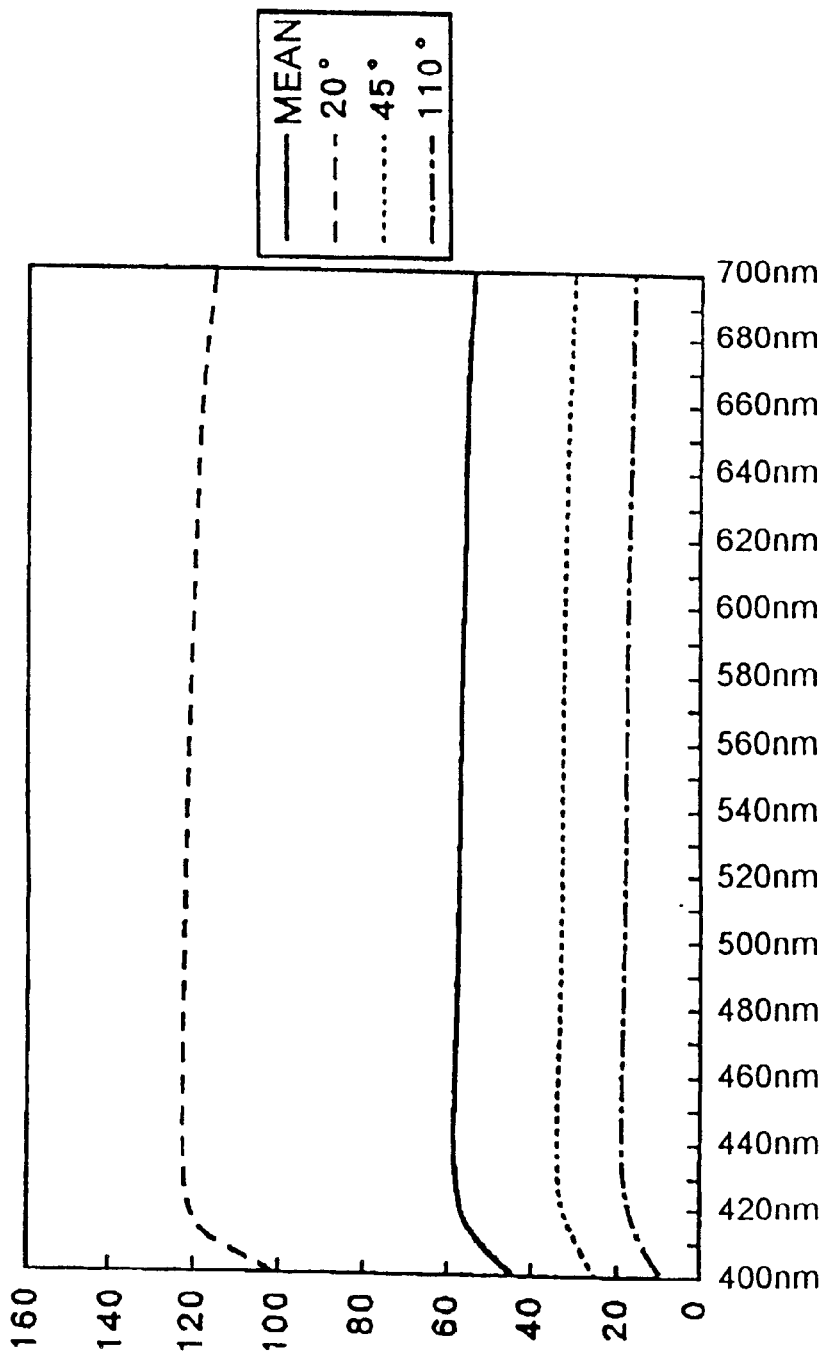
FIG. 33 is a diagram showing a seventh example of metallic or pearlescent pigment (3034)—clear base formulation in metallic or pearlescent pigment * base data.

Metallic or pearlescent pigment 19.96%+clear base 80.04% · · · (FIG. 33)

Figure 34:
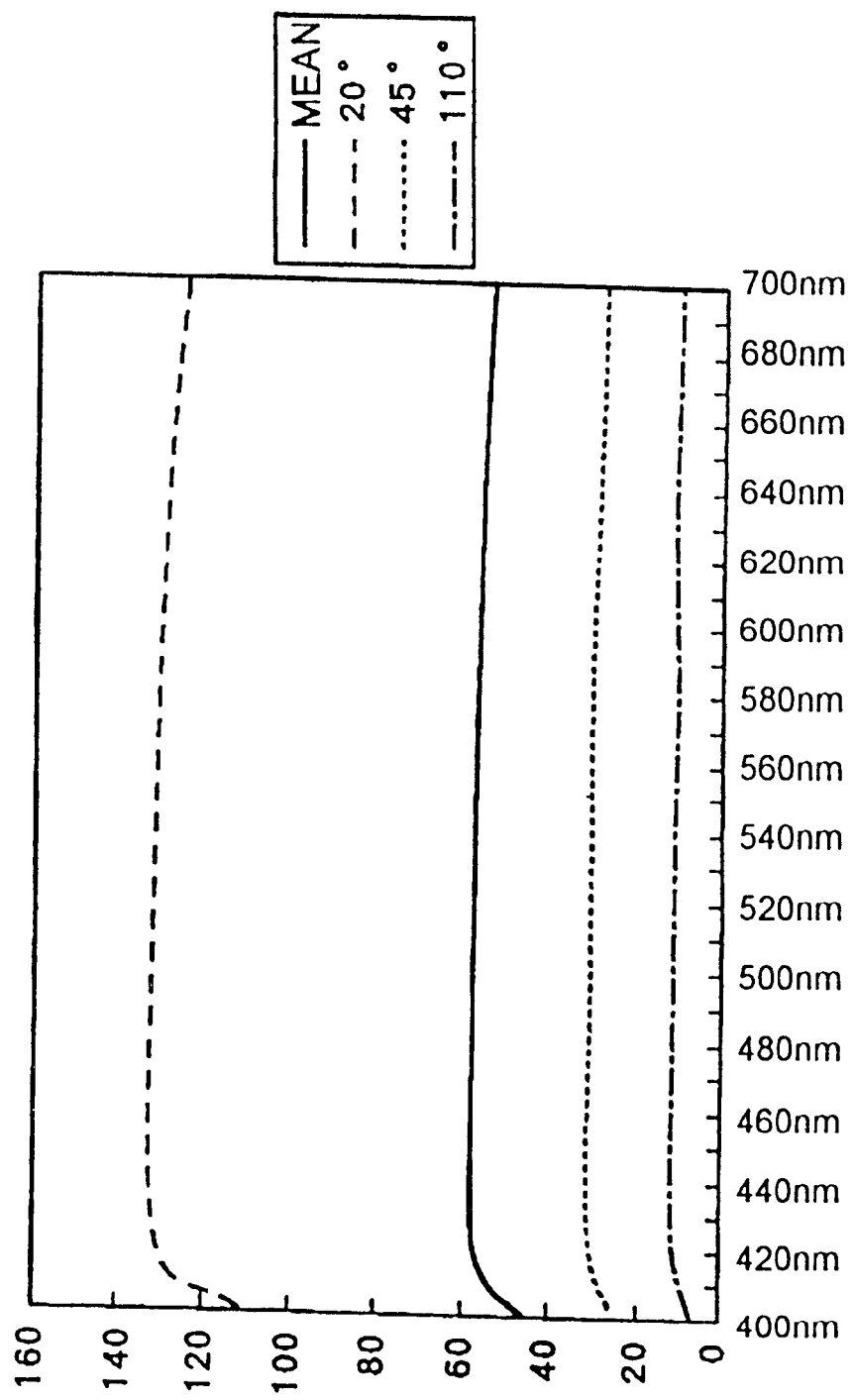
FIG. 34 is a diagram showing a eighth example of metallic or pearlescent pigment (3034)—clear base formulation in metallic or pearlescent pigment base data.

Metallic or pearlescent pigment 30.02%+clear base 69.98% · · · (FIG. 34)

Figure 35:
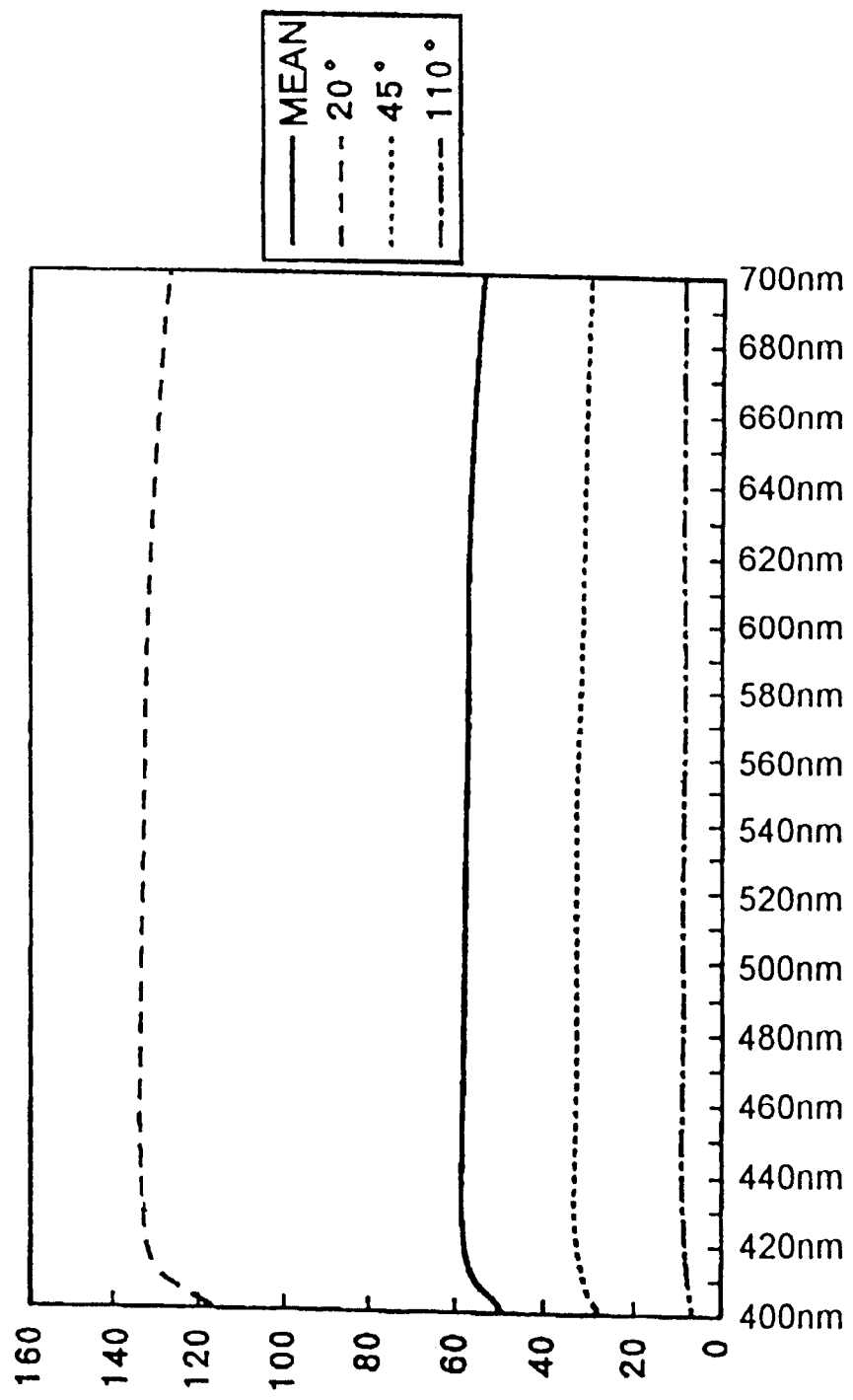
FIG. 35 is a diagram showing a ninth example of metallic or pearlescent pigment (3034)—clear base formulation in metallic or pearlescent pigment base data.

Metallic or pearlescent pigment 50.03%+clear base 49.97% · · · (FIG. 35)

Figure 36:
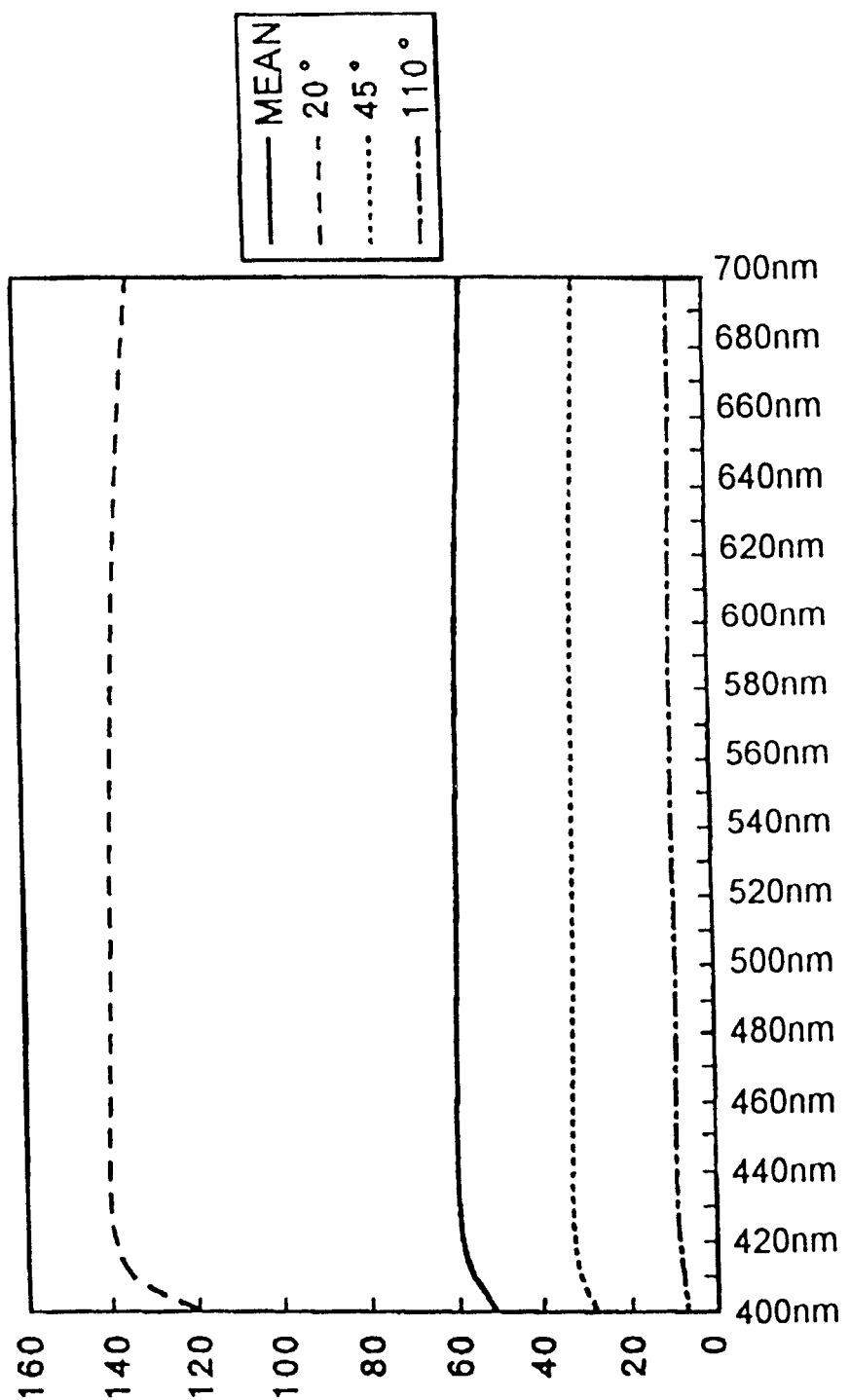
FIG. 36 is a diagram showing a tenth example of metallic or pearlescent pigment (3034)—clear * base formulation in metallic or pearlescent pigment base data.

Metallic or pearlescent pigment 69.86%+clear base 30.14% · · · (FIG. 36)

Figure 37:
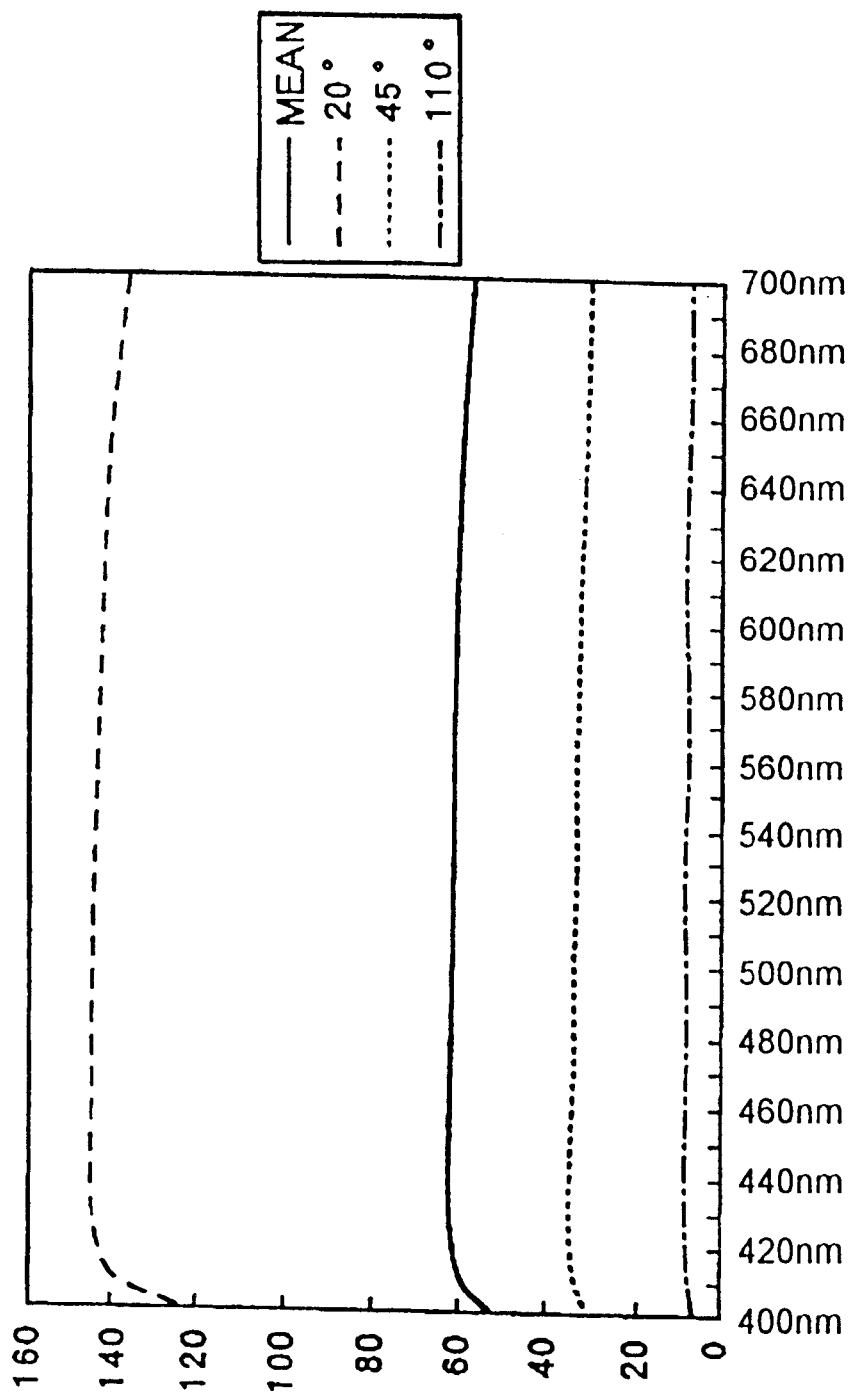
FIG. 37 is a diagram showing a eleventh example of metallic or pearlescent pigment (3034)—clear base formulation in metallic or pearlescent pigment base data.

Metallic or pearlescent pigment 100.00%+clear base 0.00% · · · (FIG. 37)

(3) 3024

Figure 38:
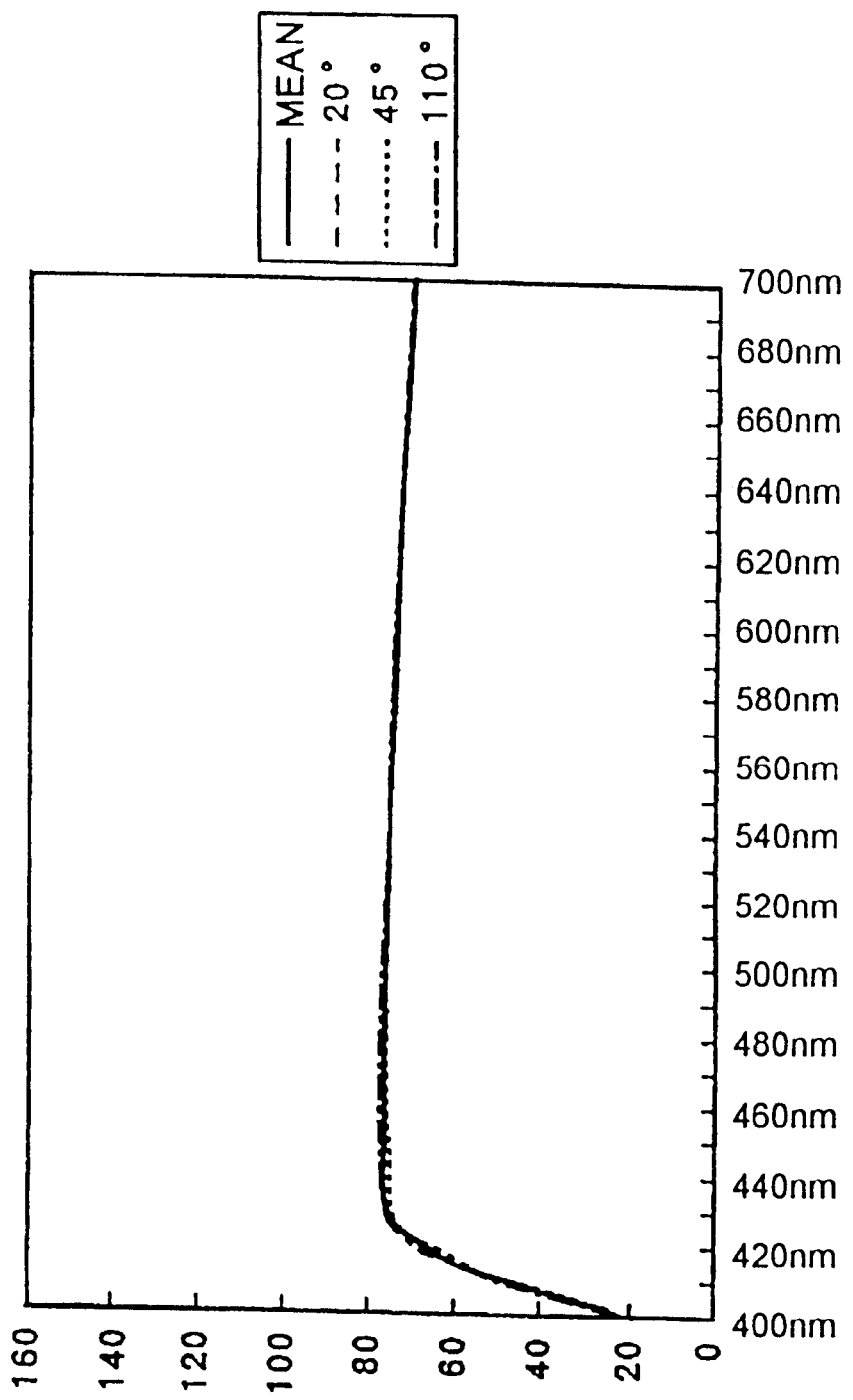
FIG. 38 is a diagram showing a first example of metallic or pearlescent pigment (3024)—clear base formulation in metallic or pearlescent pigment base data.

Metallic or pearlescent pigment 0.00%+clear base 100.00% · · · (FIG. 38)

Figure 39:
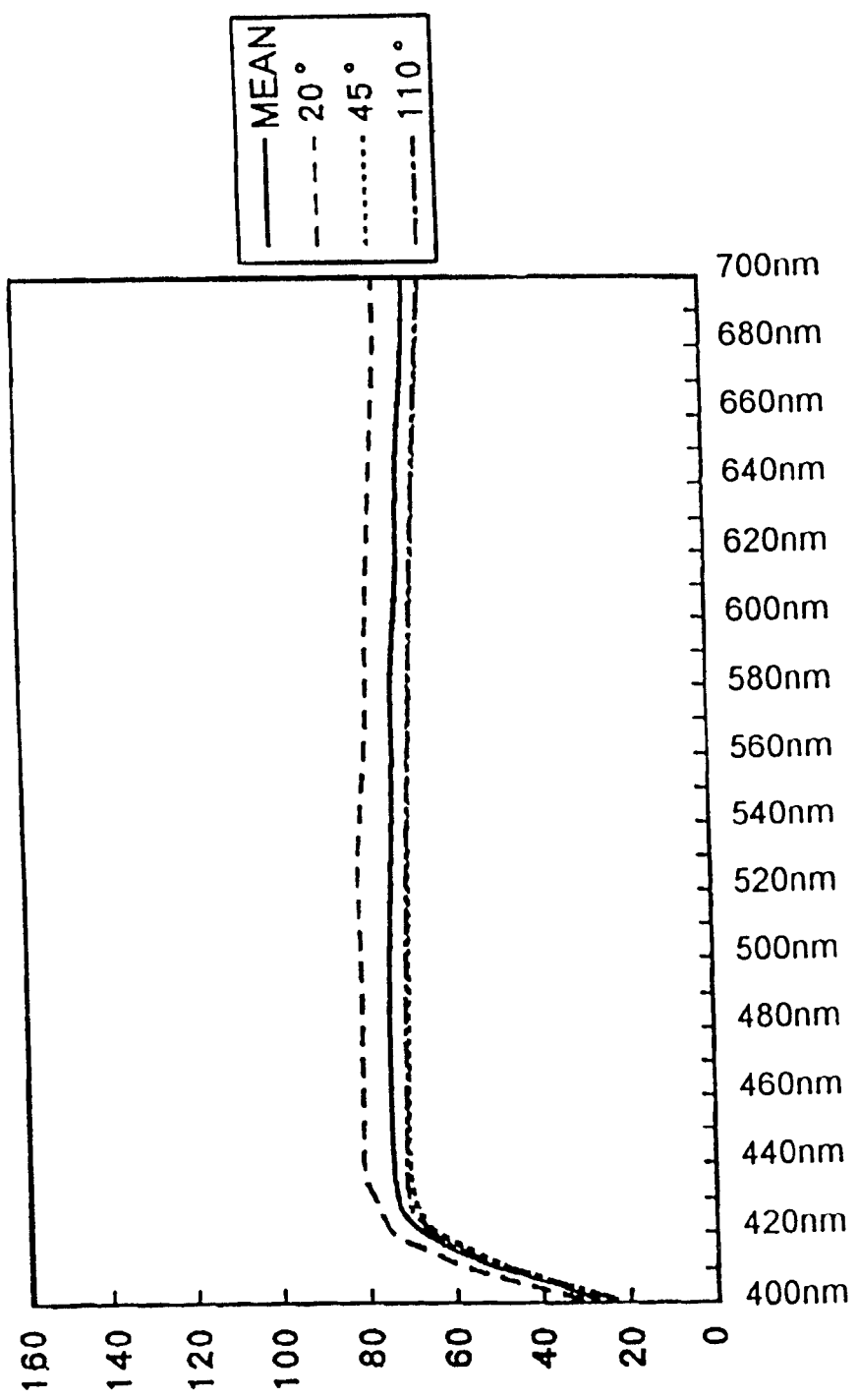
FIG. 39 is a diagram showing a second example of metallic or pearlescent pigment (3024)—clear base formulation in metallic or pearlescent pigment base data.

Metallic or pearlescent pigment 1.00%+clear base 99.00% · · · (FIG. 39)

Figure 40:
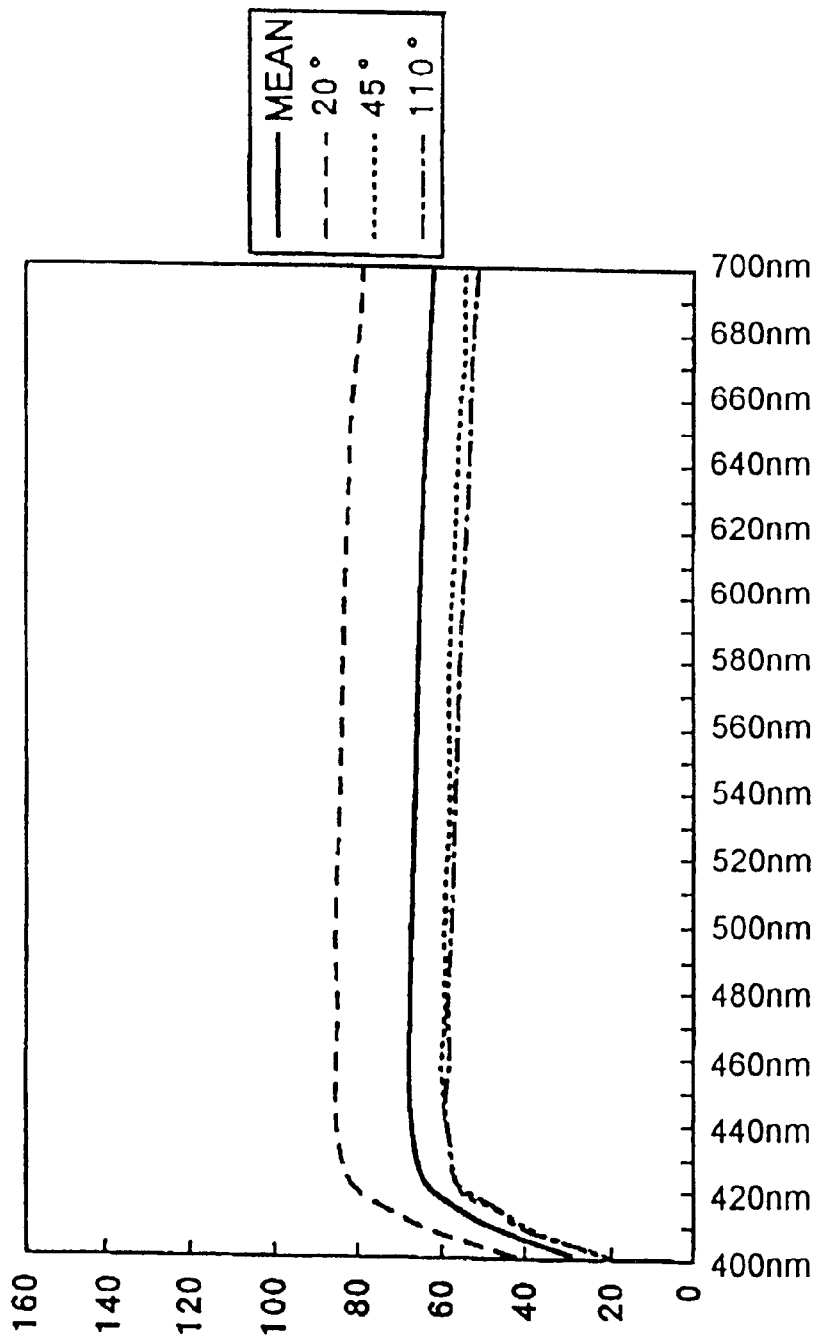
FIG. 40 is a diagram showing a third example of metallic or pearlescent pigment (3024)—clear base formulation in metallic or pearlescent pigment base data.

Metallic or pearlescent pigment 3.06%+clear base 96.94% · · · (FIG. 40)

Figure 41:
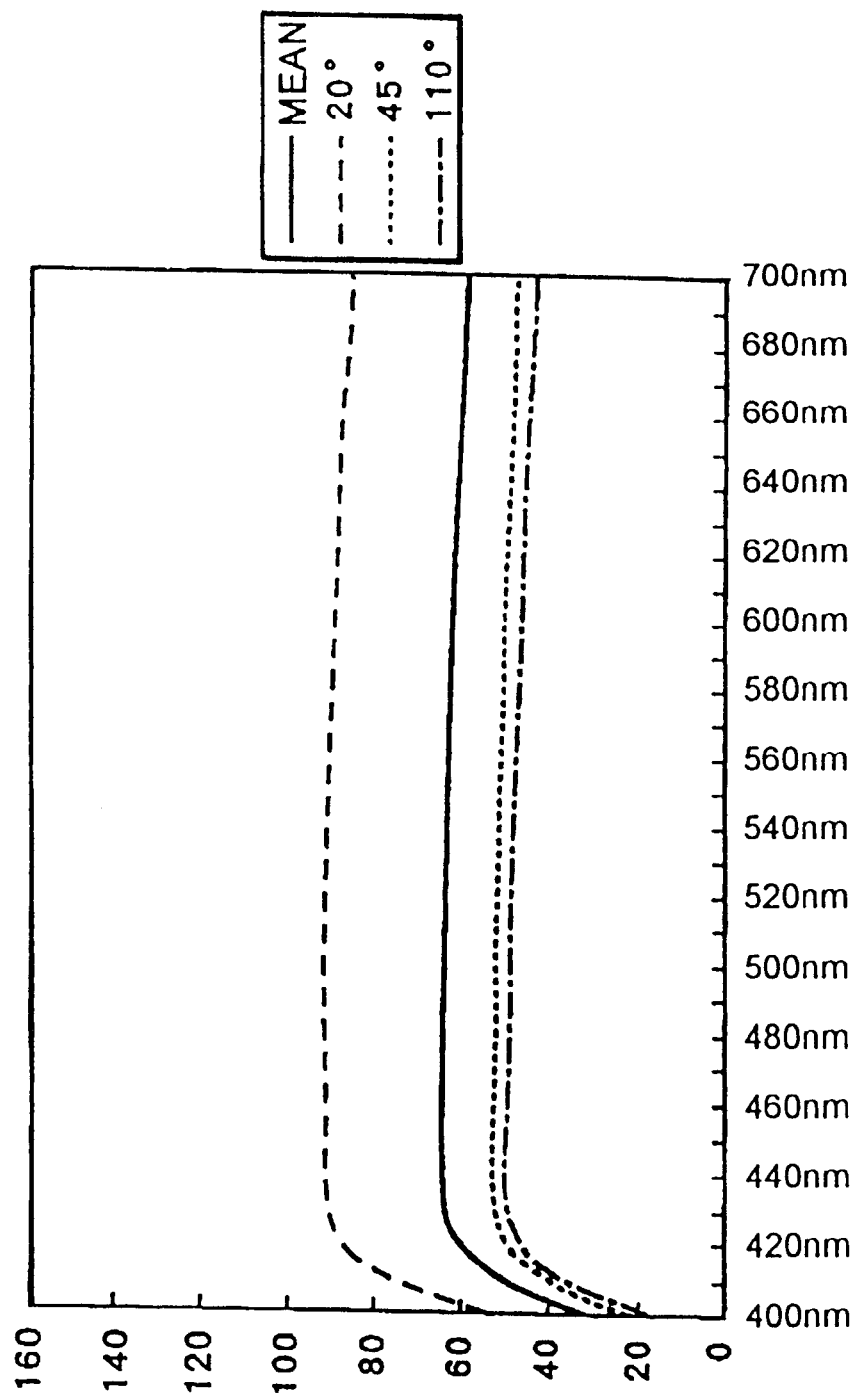

Metallic or pearlescent pigment 5.01%+clear base 94.99% · · · (FIG. 41)

Figure 42:
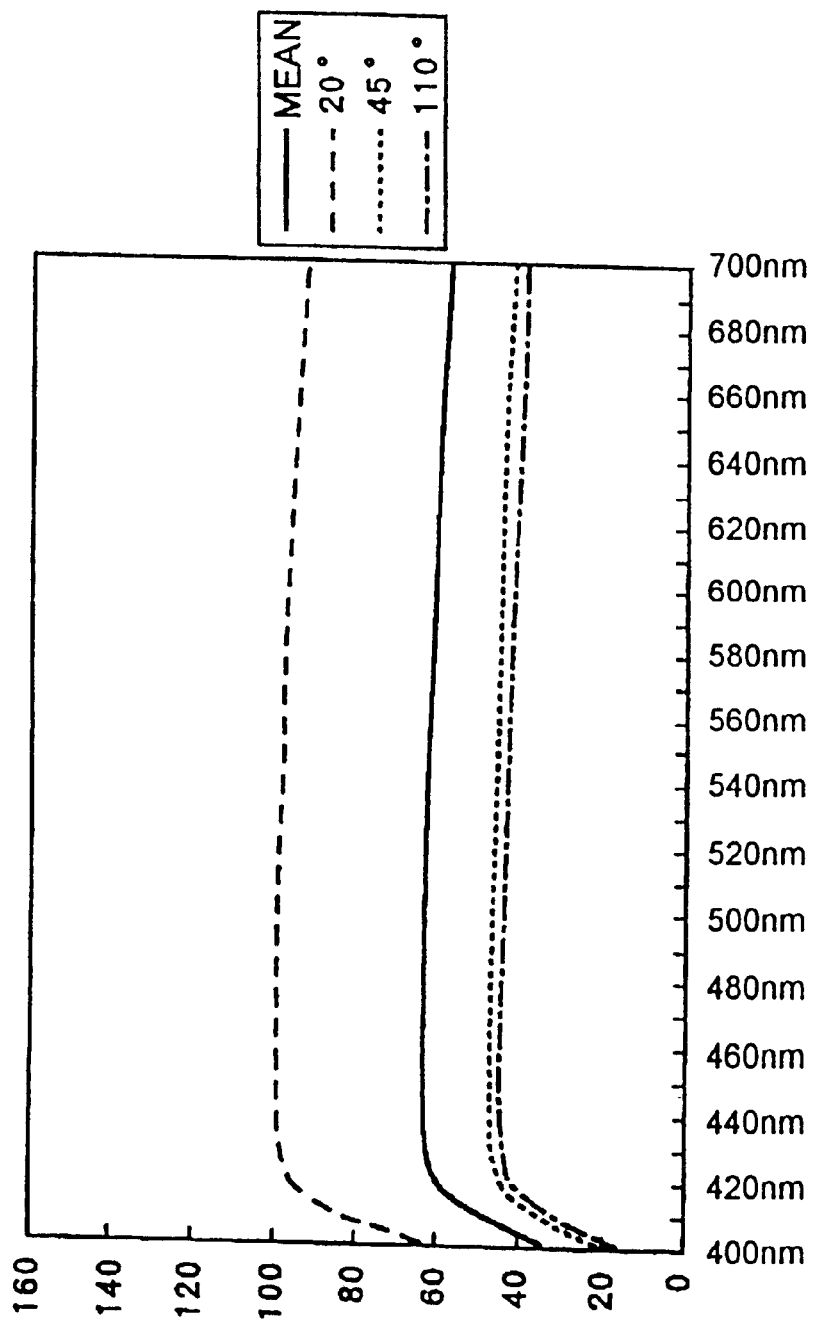
FIG. 42 is a diagram showing a fifth example of metallic or pearlescent pigment (3024)—clear base formulation in metallic or pearlescent pigment base data.

Metallic or pearlescent pigment 7.02%+clear base 92.98% · · · (FIG. 42)

Figure 43:
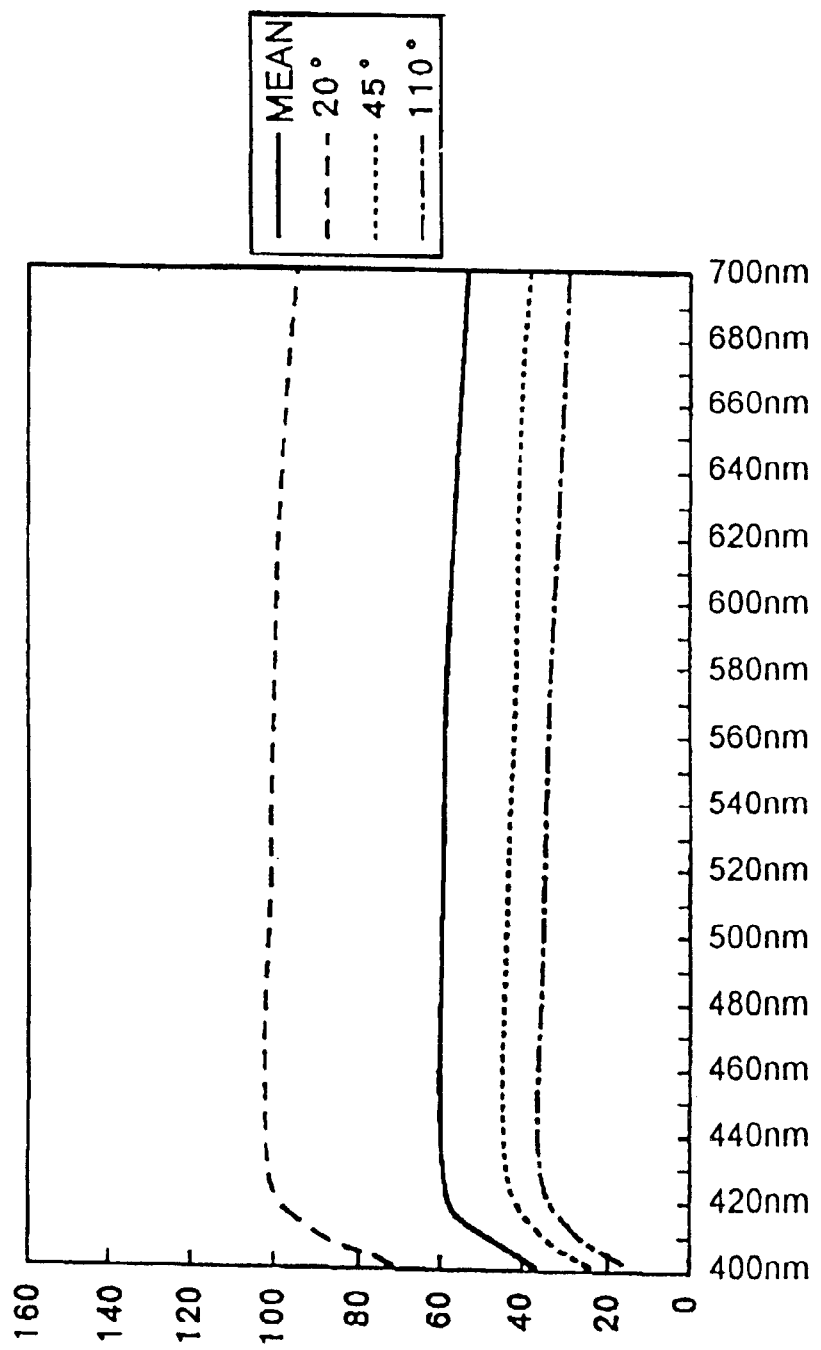
FIG. 43 is a diagram showing a sixth example of metallic or pearlescent pigment (3024)—clear base formulation in metallic or pearlescent pigment base data.

Metallic or pearlescent pigment 10.00%+clear base 90.00% · · · (FIG. 43)

Figure 44:
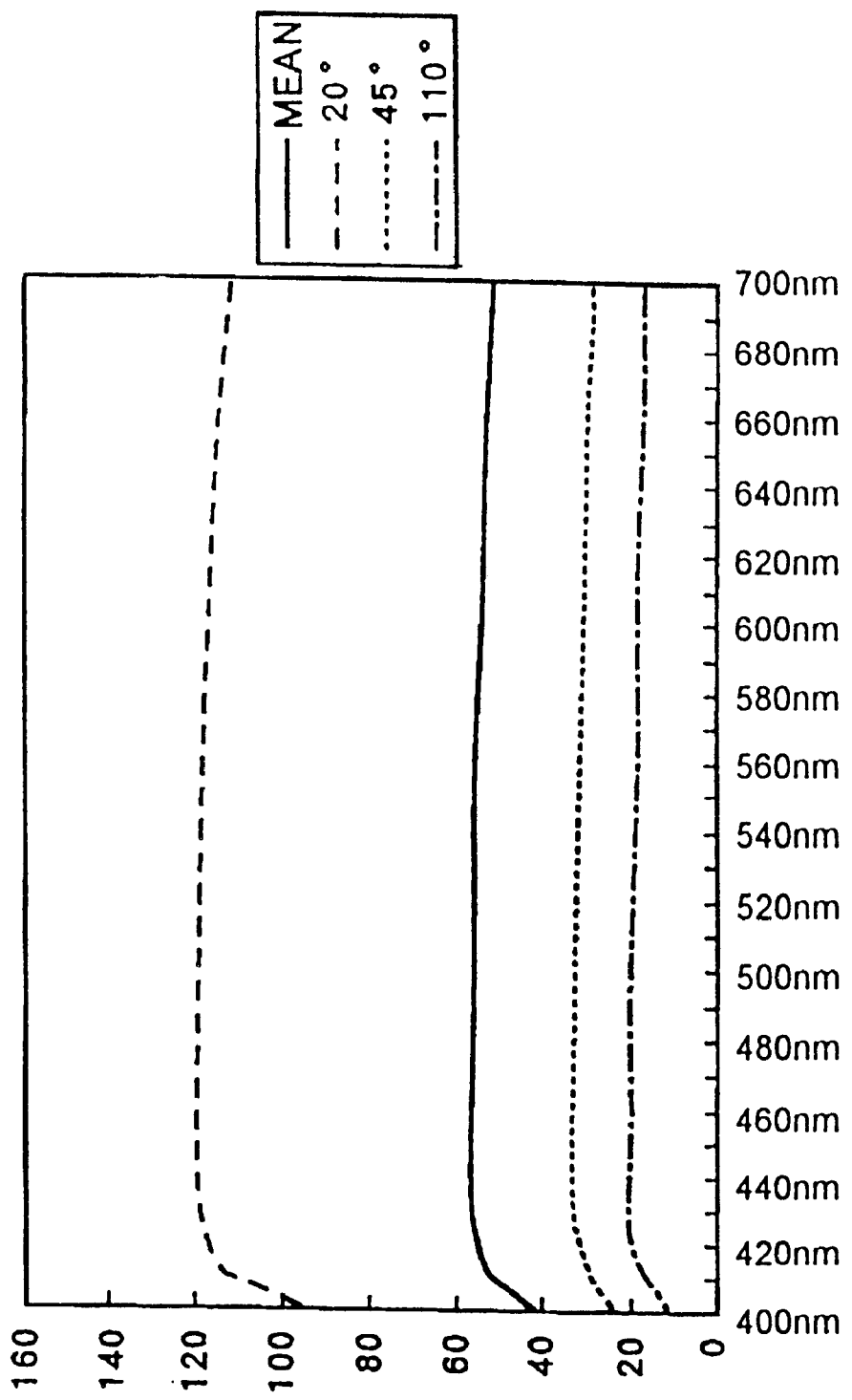
FIG. 44 is a diagram showing a seventh example of metallic or pearlescent pigment (3024)—clear base formulation in metallic or pearlescent pigment base data.

Metallic or pearlescent pigment 20.06%+clear base 79.94% · · · (FIG. 44)

Figure 45:
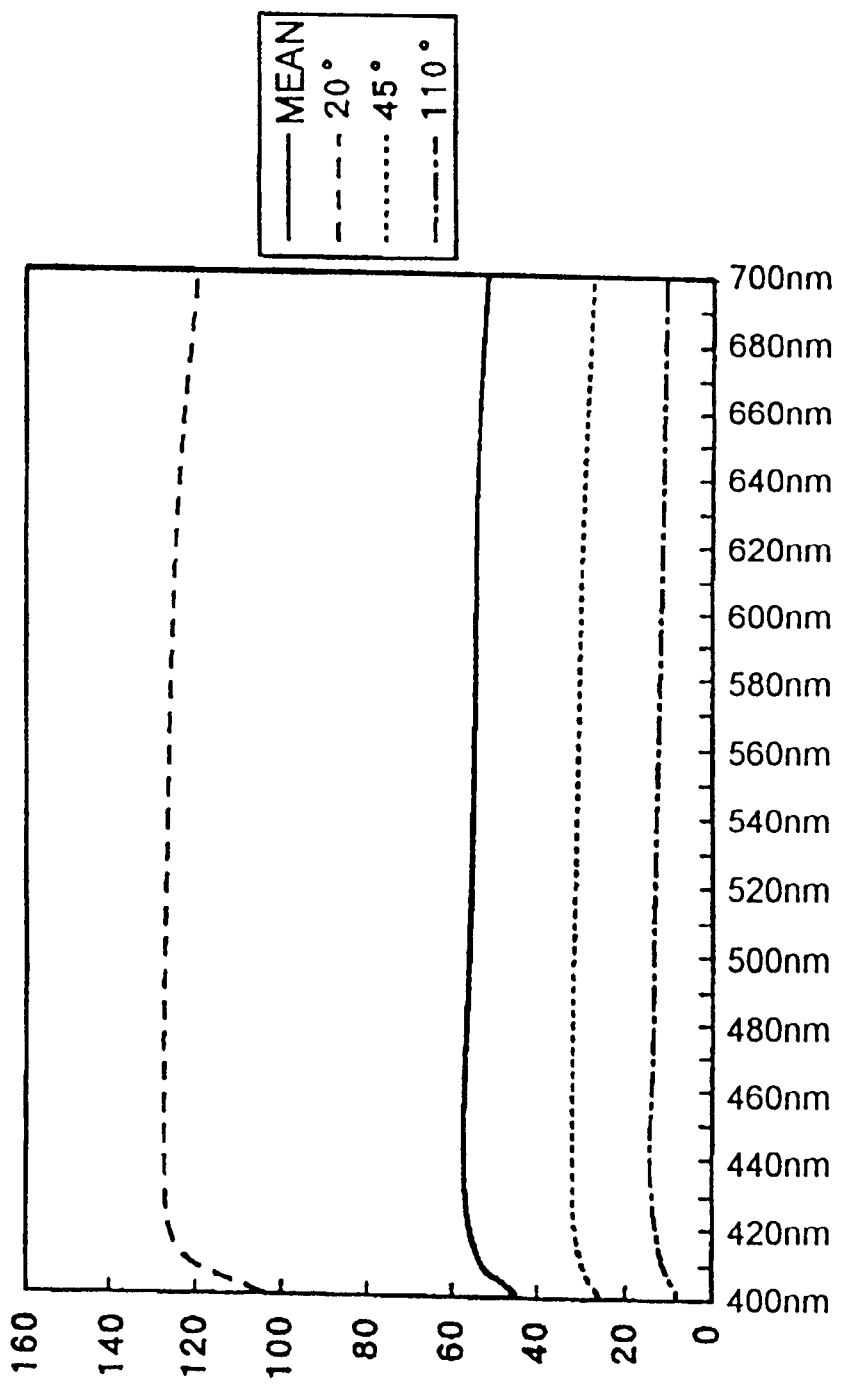
FIG. 45 is a diagram showing a eighth example of metallic or pearlescent pigment (3024)—clear base formulation in metallic or pearlescent pigment base data.

Metallic or pearlescent pigment 30.03%+clear base 69.97% · · · (FIG. 45)

Figure 46:
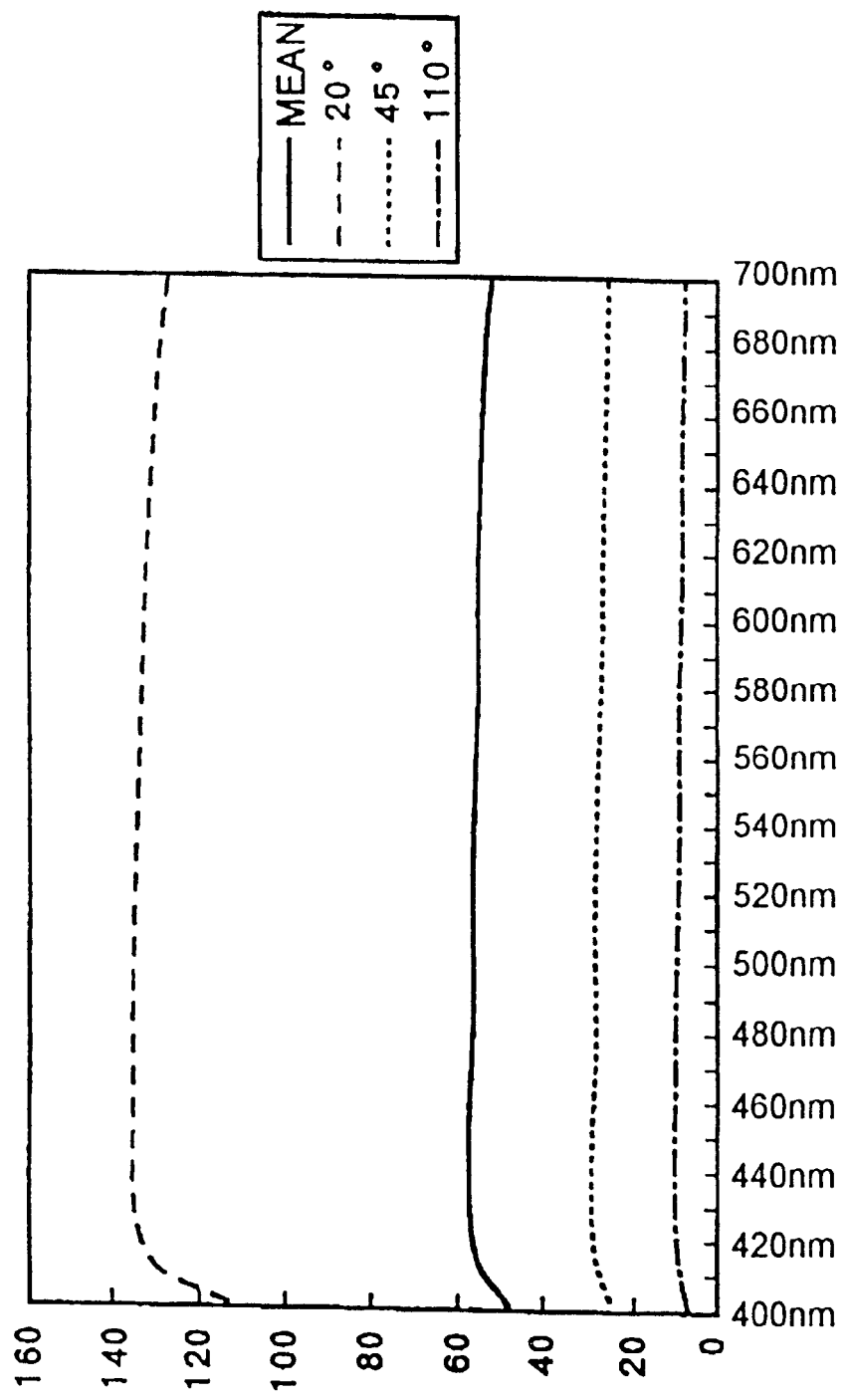
FIG. 46 is a diagram showing a ninth example of metallic or pearlescent pigment (3024)—clear base formulation in metallic or pearlescent pigment base data.

Metallic or pearlescent pigment 50.18%+clear base 49.82% · · · (FIG. 46)

Figure 47:
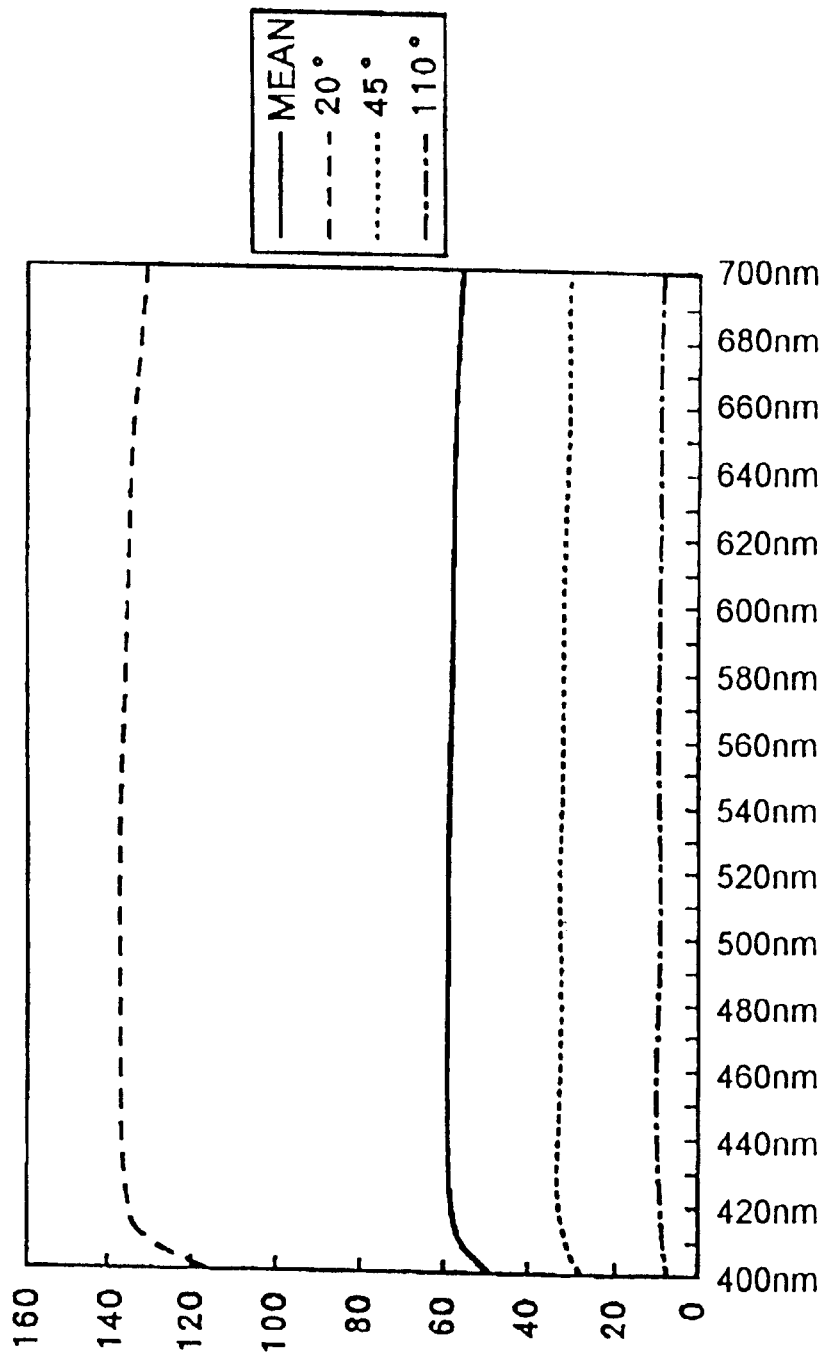
FIG. 47 is a diagram showing a tenth example of metallic or pearlescent pigment (3024)—clear base formulation in metallic or pearlescent pigment base data.

Metallic or pearlescent pigment 70.03%+clear base 29.97% · · · (FIG. 47)

Figure 48:
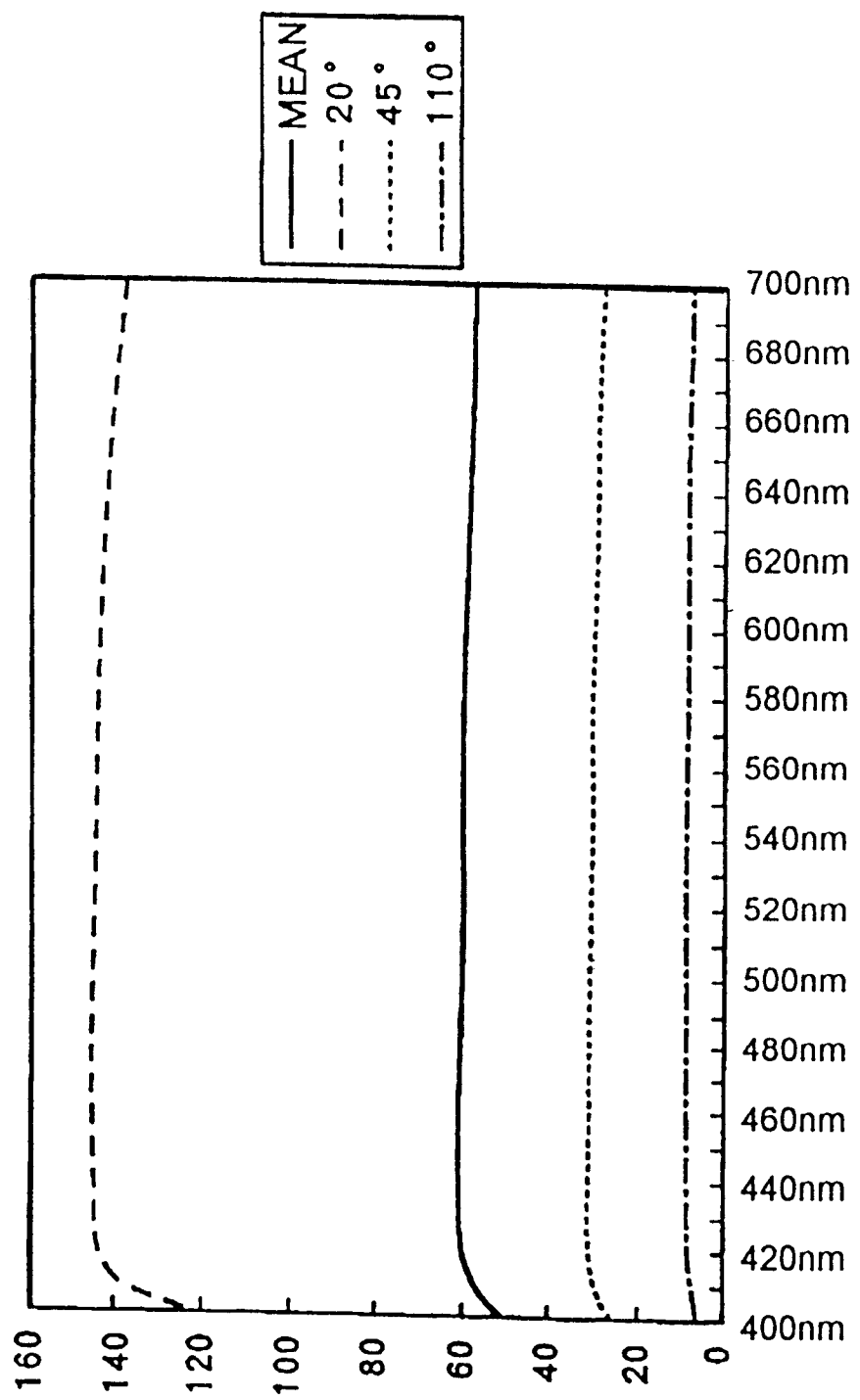
FIG. 48 is a diagram showing a eleventh example of metallic or pearlescent pigment (3024)—clear base formulation in metallic or pearlescent pigment base data.

Metallic or pearlescent pigment 100.00%+clear base 0.00% · · · (FIG. 48)

Preparation of Learning Data

In the present invention, learning data necessary to reproduce a predicted color value are prepared ahead of time. The formulating ratios for the respective learning data are as follows.

Figure 49:
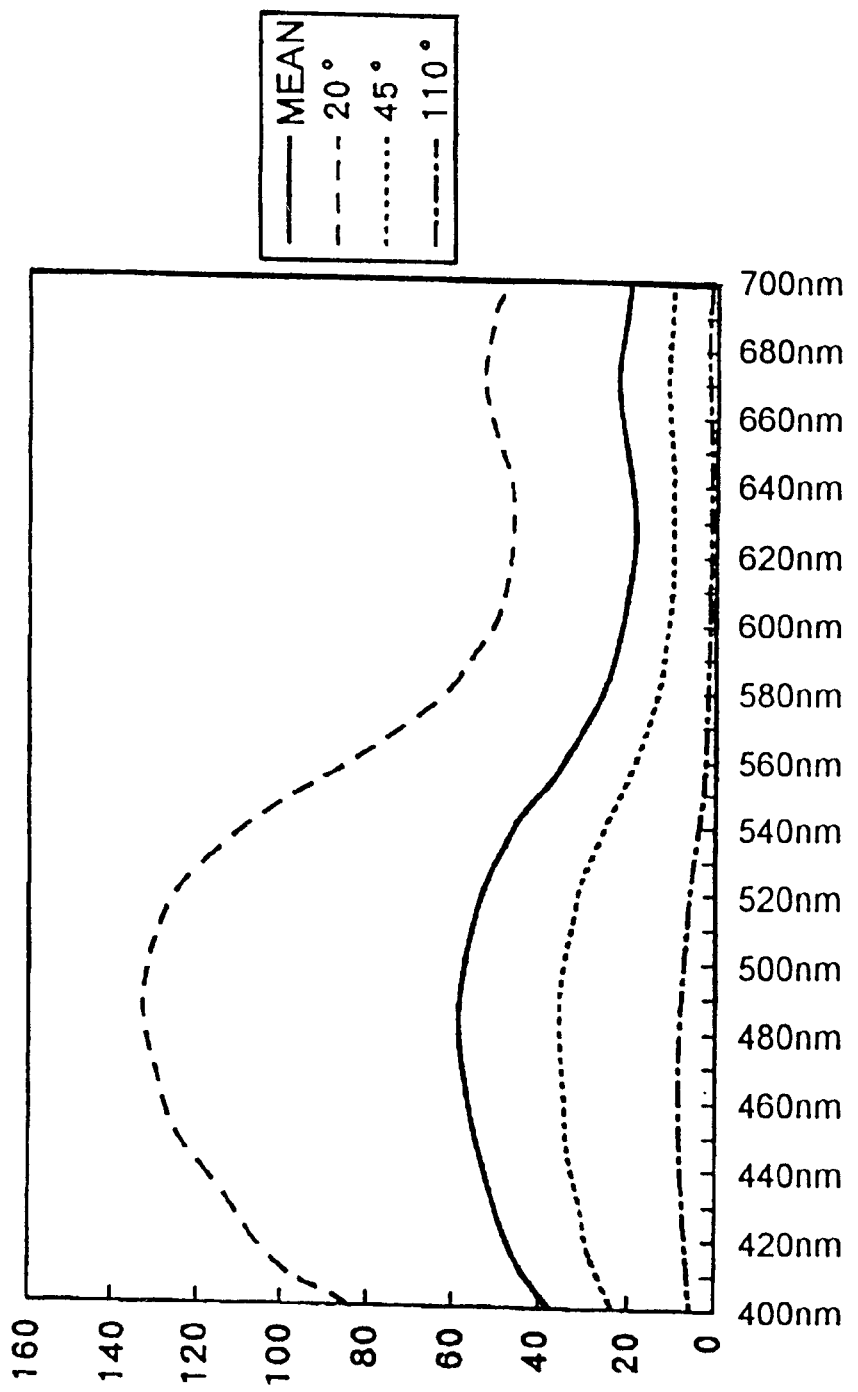
FIG. 49 is a diagram showing a first example of formulation in learning data for reproducing a predicted color value.

Data 1 (FIG. 49)
(1) 3396 · · · 18.04%
(2) 3604 · · · 2.05%
(3) 3411 · · · 0.00%
(4) 3032 · · · 59.11%
(5) 3034 · · · 20.80%
(6) 3024 · · · 0.00%

Figure 50:
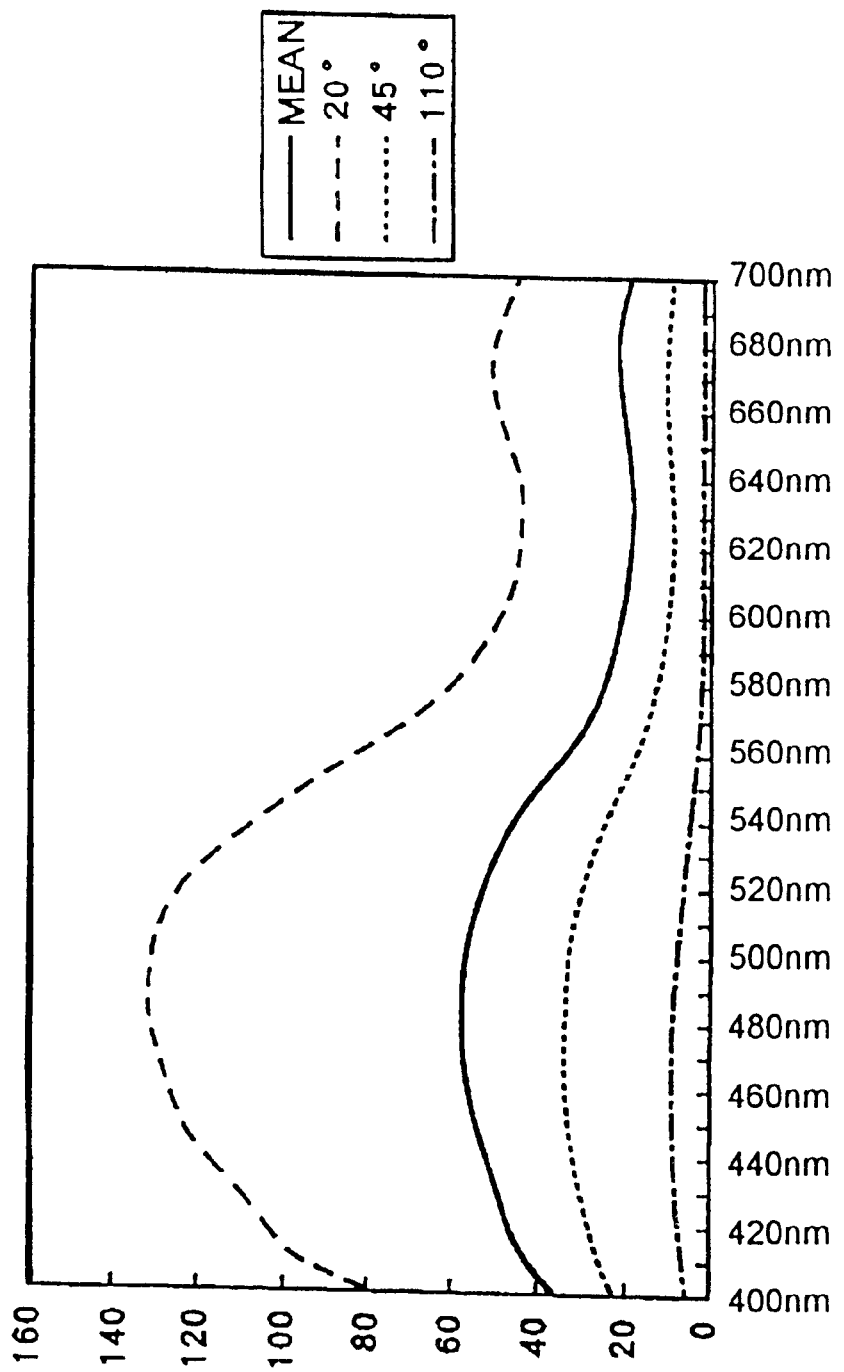
FIG. 50 is a diagram showing a second example of formulation in learning data for reproducing a predicted color value.

Data 2 (FIG. 50)
(1) 3396 · · · 18.19%
(2) 3604 · · · 2.03%
(3) 3411 · · · 0.00%
(4) 3032 · · · 60.28%
(5) 3034 · · · 0.00%
(6) 3024 · · · 19.50%

Figure 51:
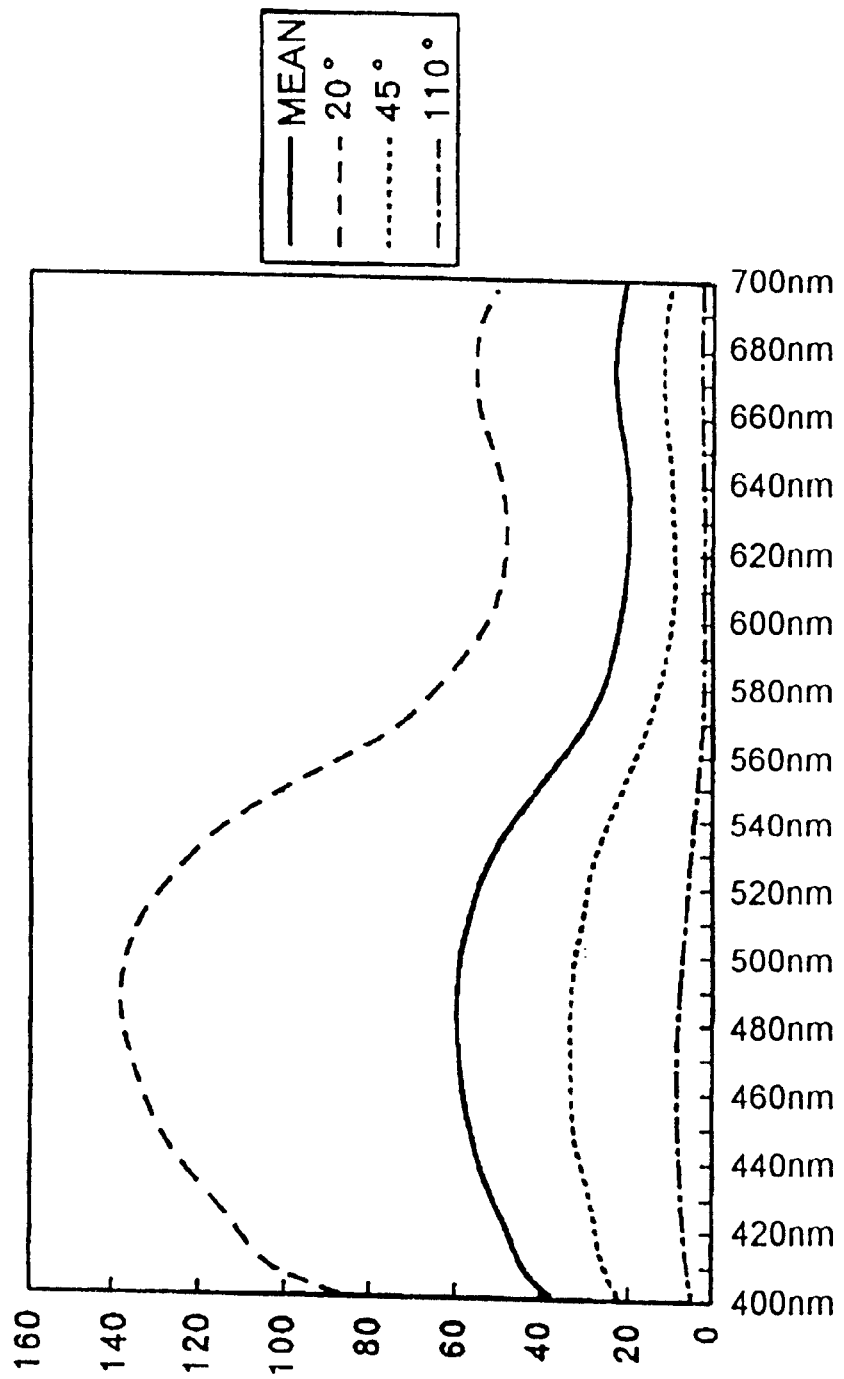
FIG. 51 is a diagram showing a third example of formulation in learning data for reproducing a predicted color value.

Data 3 (FIG. 51)
(1) 3396 · · · 17.83%
(2) 3604 · · · 2.06%
(3) 3411 · · · 0.00%
(4) 3032 · · · 40.08%
(5) 3034 · · · 40.02%
(6) 3024 · · · 0.00%

Figure 52:
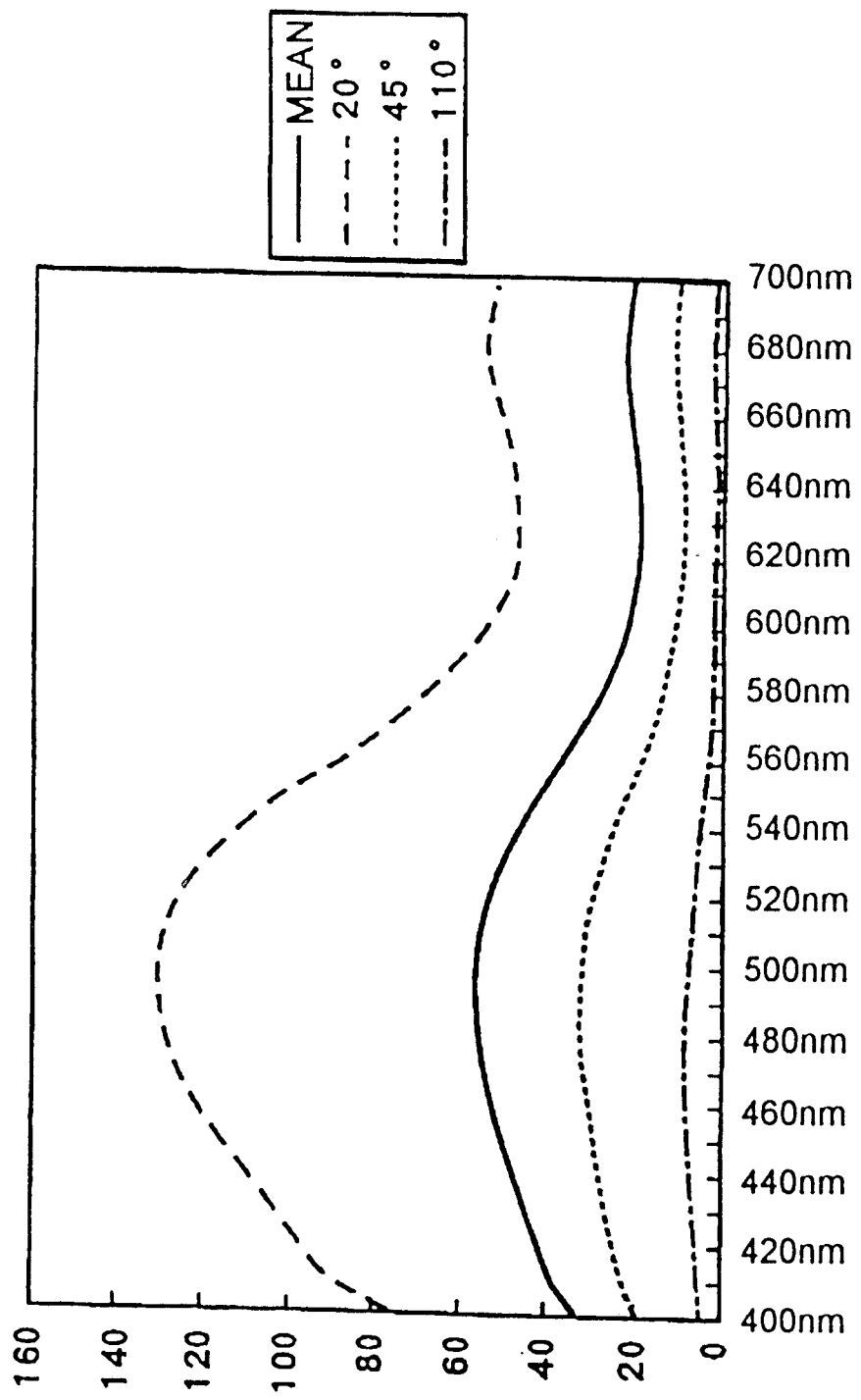
FIG. 52 is a diagram showing a fourth example of formulation in learning data for reproducing a predicted color value.

Data 4 (FIG. 52)
(1) 3396 · · · 11.76%
(2) 3604 · · · 7.93%
(3) 3411 · · · 0.00%
(4) 3032 · · · 40.57%
(5) 3034 · · · 0.00%
(6) 3024 · · · 39.74%

Figure 53:
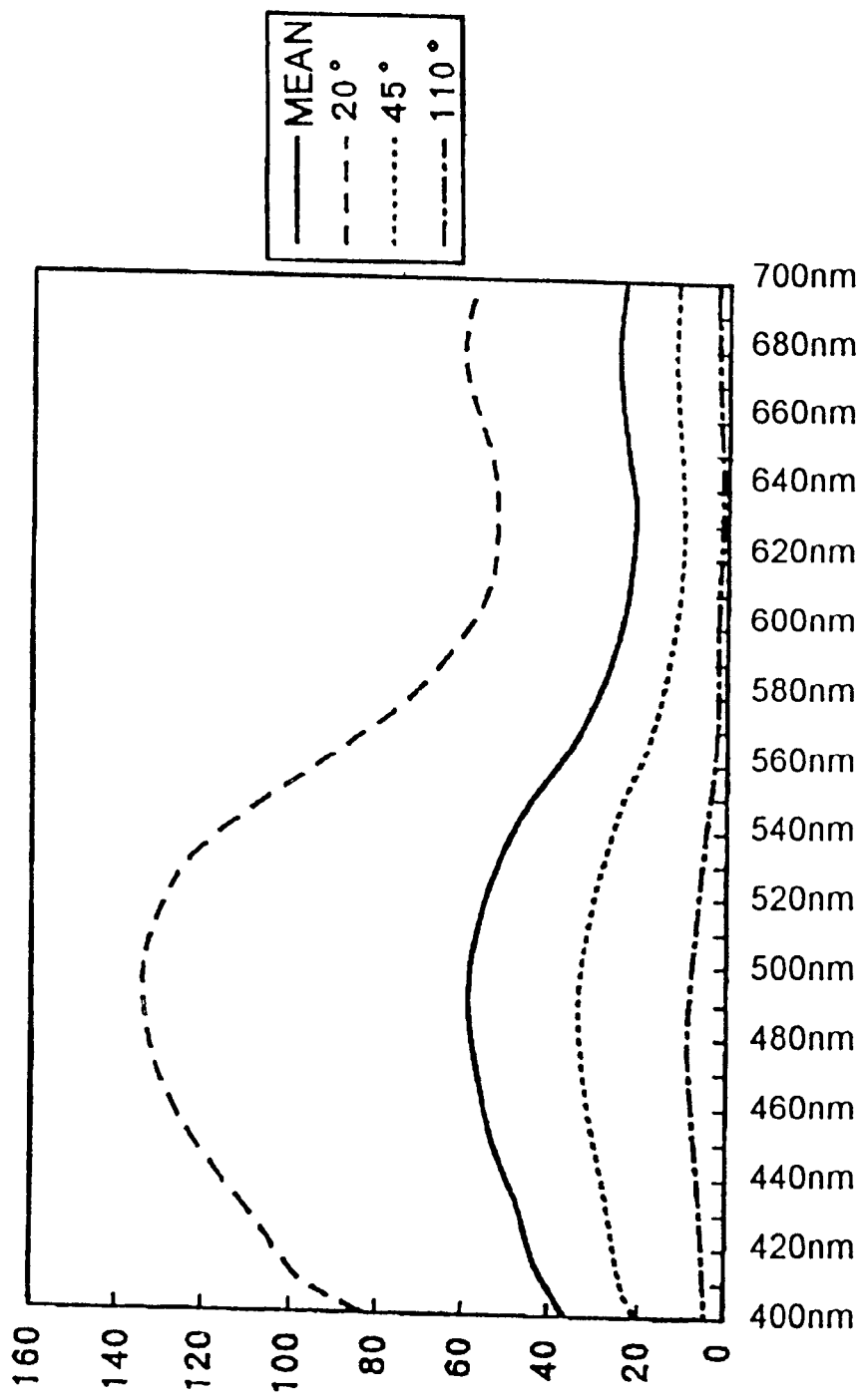
FIG. 53 is a diagram showing a fifth example of formulation in learning data for reproducing a predicted color value.

Data 5 (FIG. 53)
(1) 3396 · · · 12.20%
(2) 3604 · · · 8.00%
(3) 3411 · · · 0.00%
(4) 3032 · · · 20.10%
(5) 3034 · · · 59.69%
(6) 3024 · · · 0.00%

Figure 54:
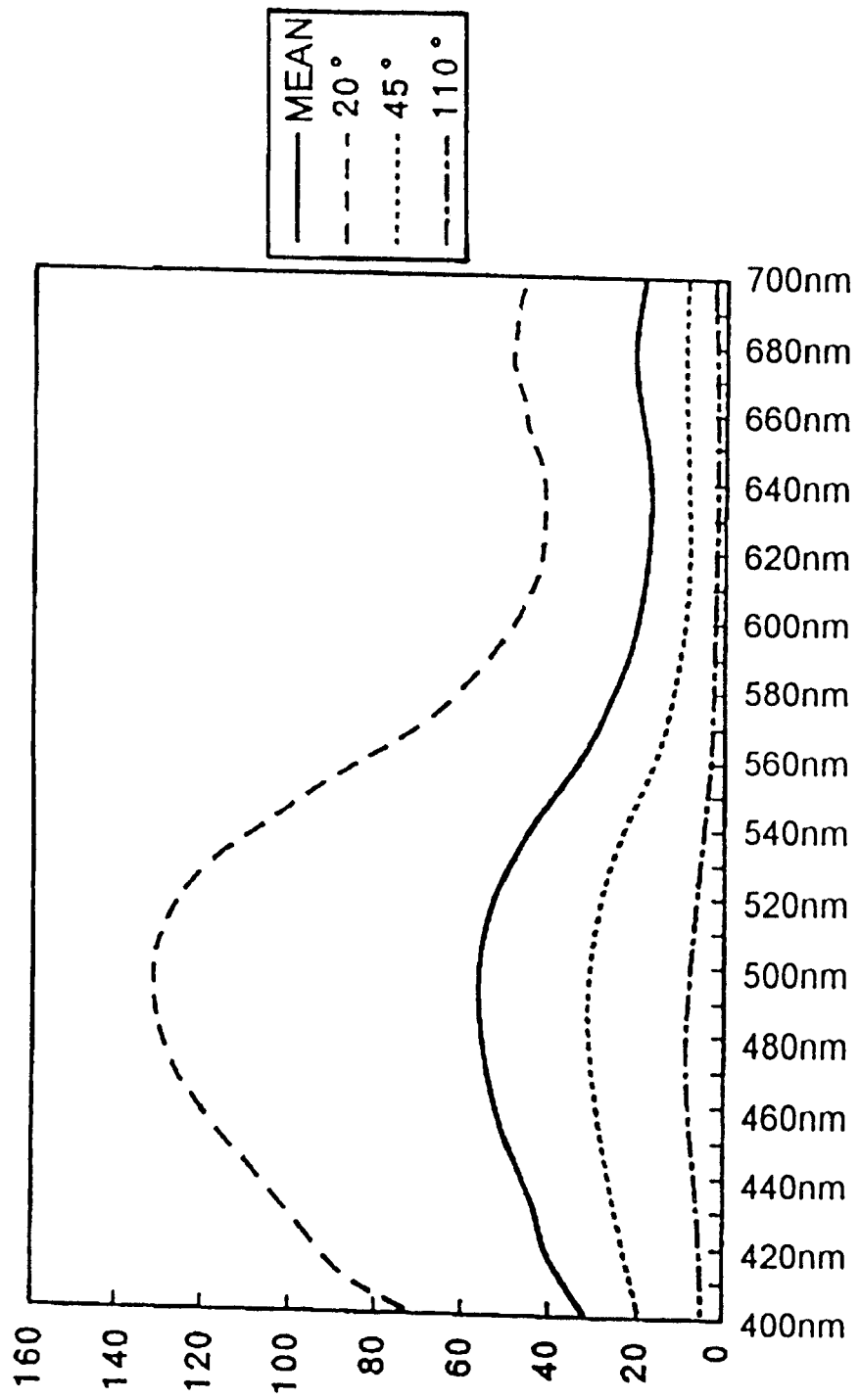
FIG. 54 is a diagram showing a sixth example of formulation in learning data for reproducing a predicted color value.

Data 6 (FIG. 54)
(1) 3396 · · · 14.16%
(2) 3604 · · · 7.07%
(3) 3411 · · · 0.00%
(4) 3032 · · · 26.26%
(5) 3034 · · · 0.00%
(6) 3024 · · · 52.51%

Figure 55:
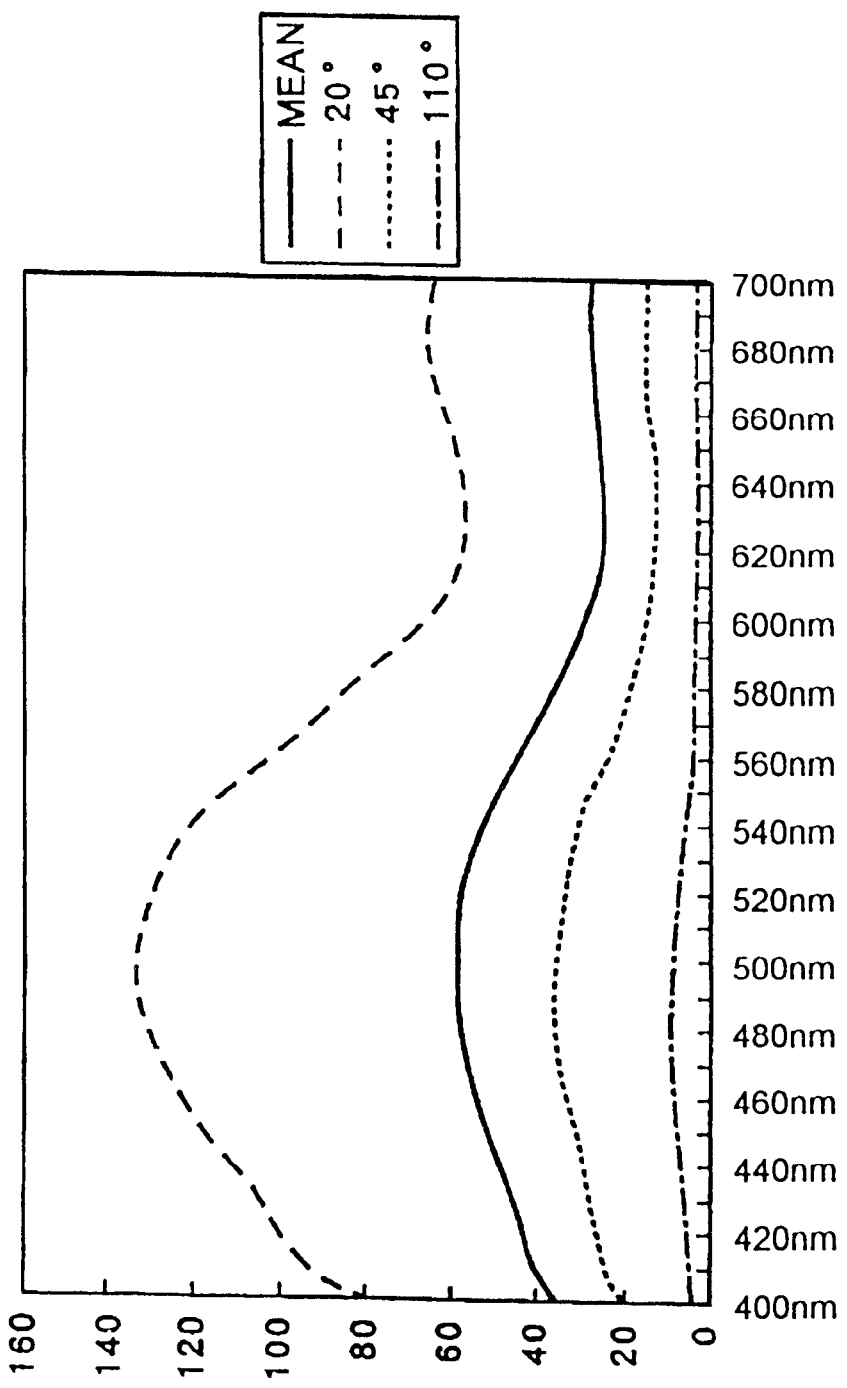
FIG. 55 is a diagram showing a seventh example of formulation in learning data for reproducing a predicted color value.

Data 7 (FIG. 55)
(1) 3396 · · · 8.03%
(2) 3604 · · · 11.96%
(3) 3411 · · · 0.00%
(4) 3032 · · · 59.65%
(5) 3034 · · · 20.35%
(6) 3024 · · · 0.00%

Figure 56:
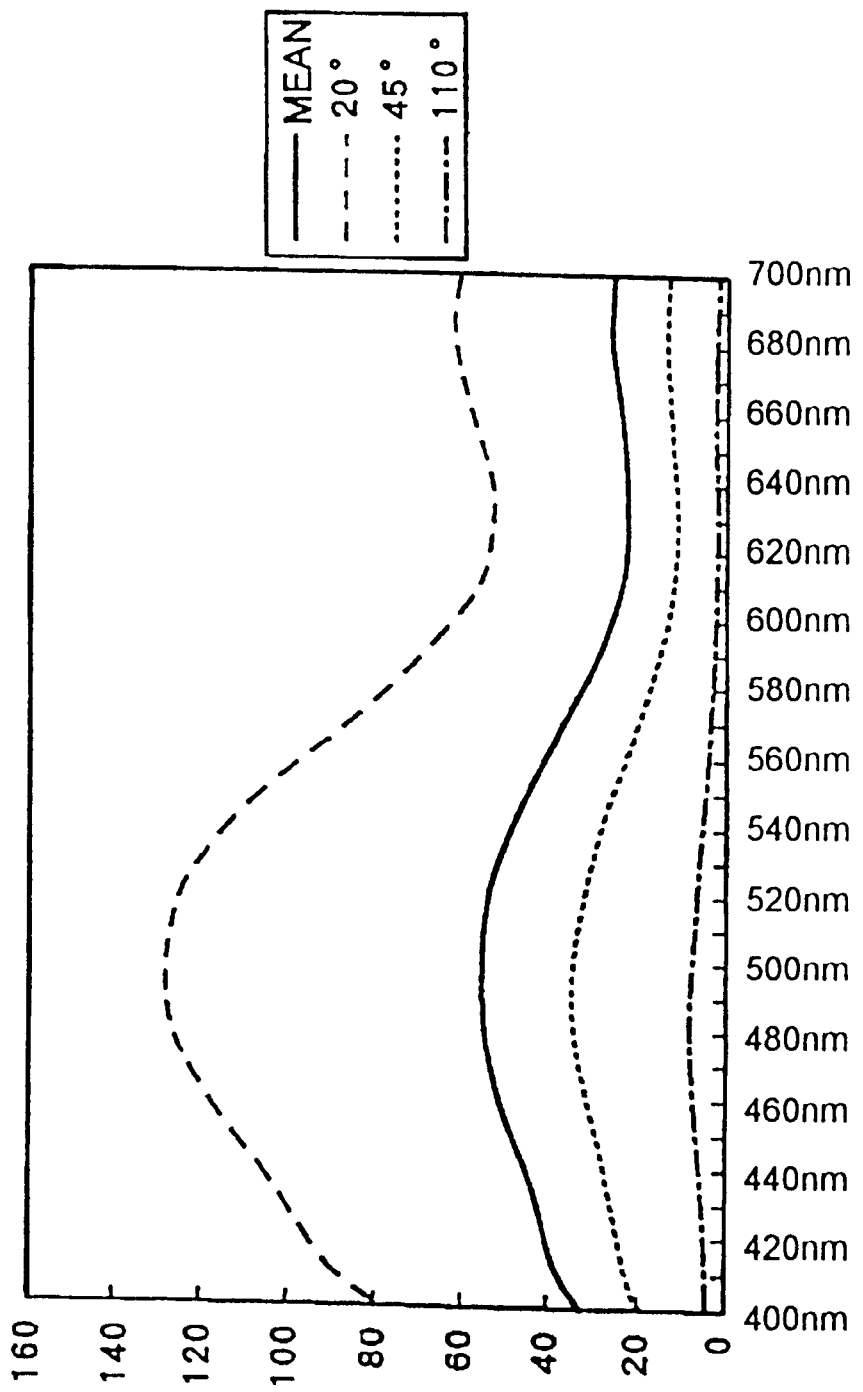
FIG. 56 is a diagram showing a eighth example of formulation in learning data for reproducing a predicted color value.

Data 8 (FIG. 56)
(1) 3396 · · · 7.91%
(2) 3604 · · · 11.87%
(3) 3411 · · · 0.00%
(4) 3032 · · · 59.17%
(5) 3034 · · · 0.00%
(6) 3024 · · · 21.05%

Figure 57:
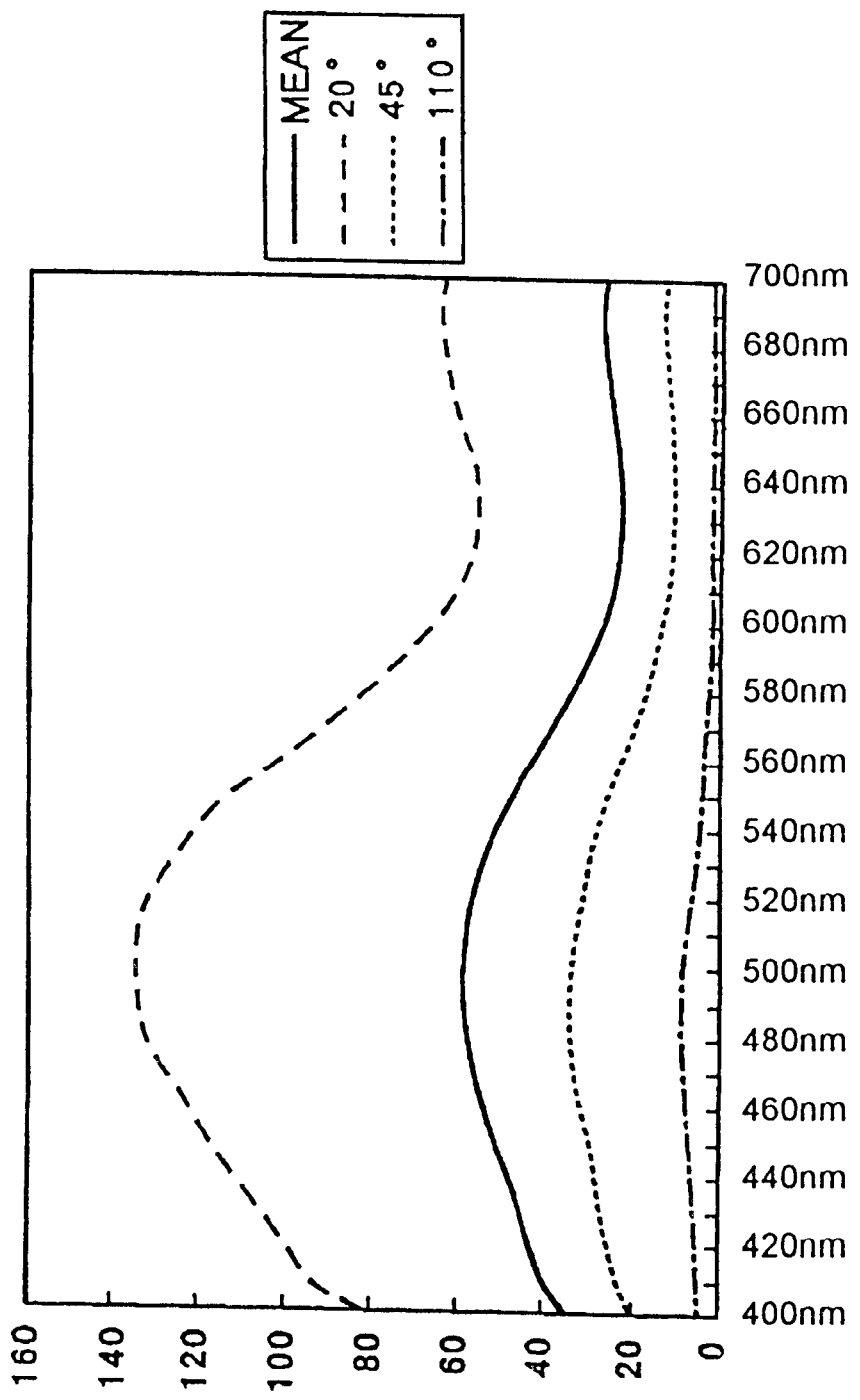
FIG. 57 is a diagram showing a ninth example of formulation in learning data for reproducing a predicted color value.

Data 9 (FIG. 57)
(1) 3396 · · · 8.31%
(2) 3604 · · · 12.03%
(3) 3411 · · · 0.00%
(4) 3032 · · · 40.05%
(5) 3034 · · · 39.61%

Figure 58:
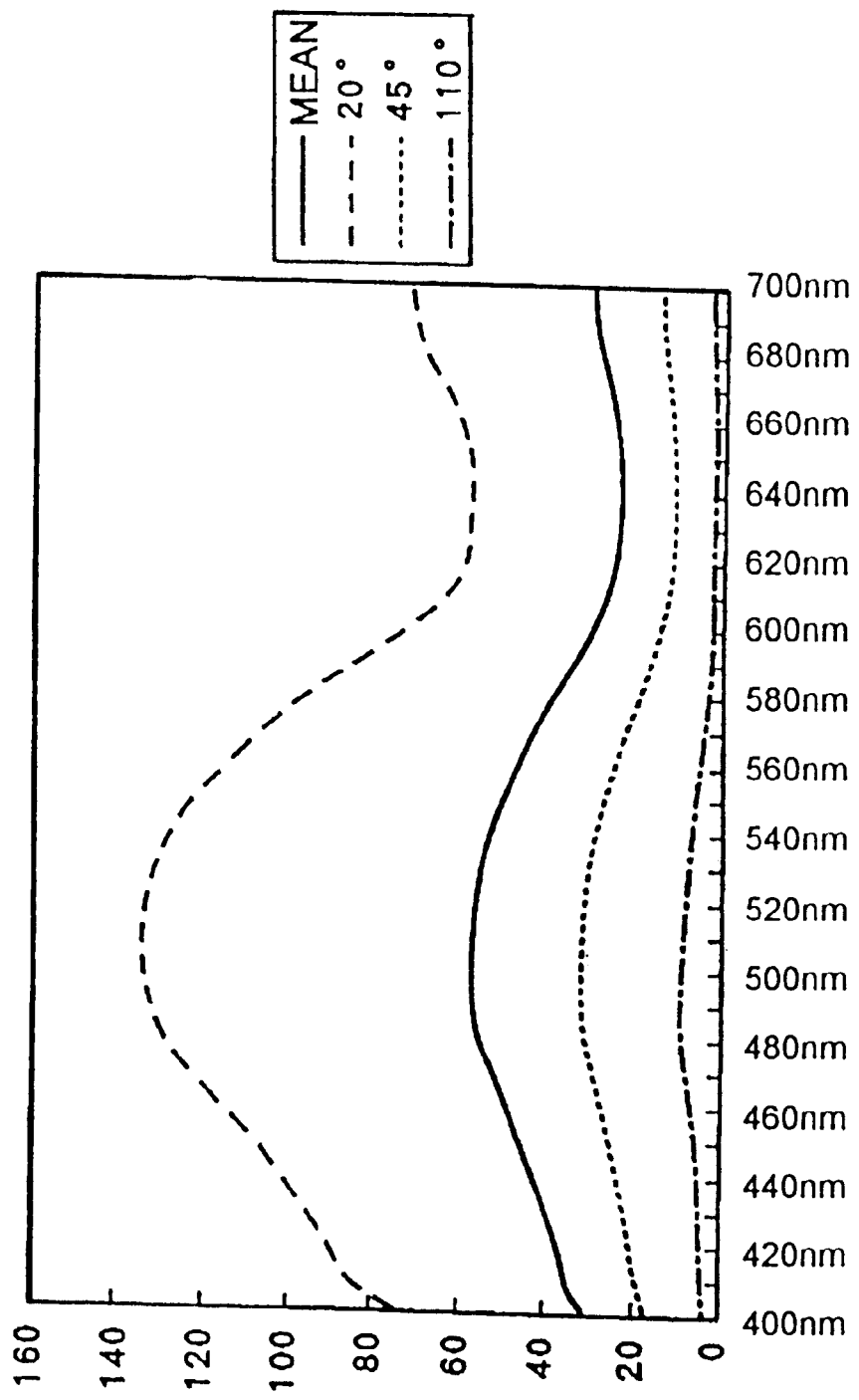
FIG. 58 is a diagram showing a tenth example of formulation in learning data for reproducing a predicted color value.
Figure 59:
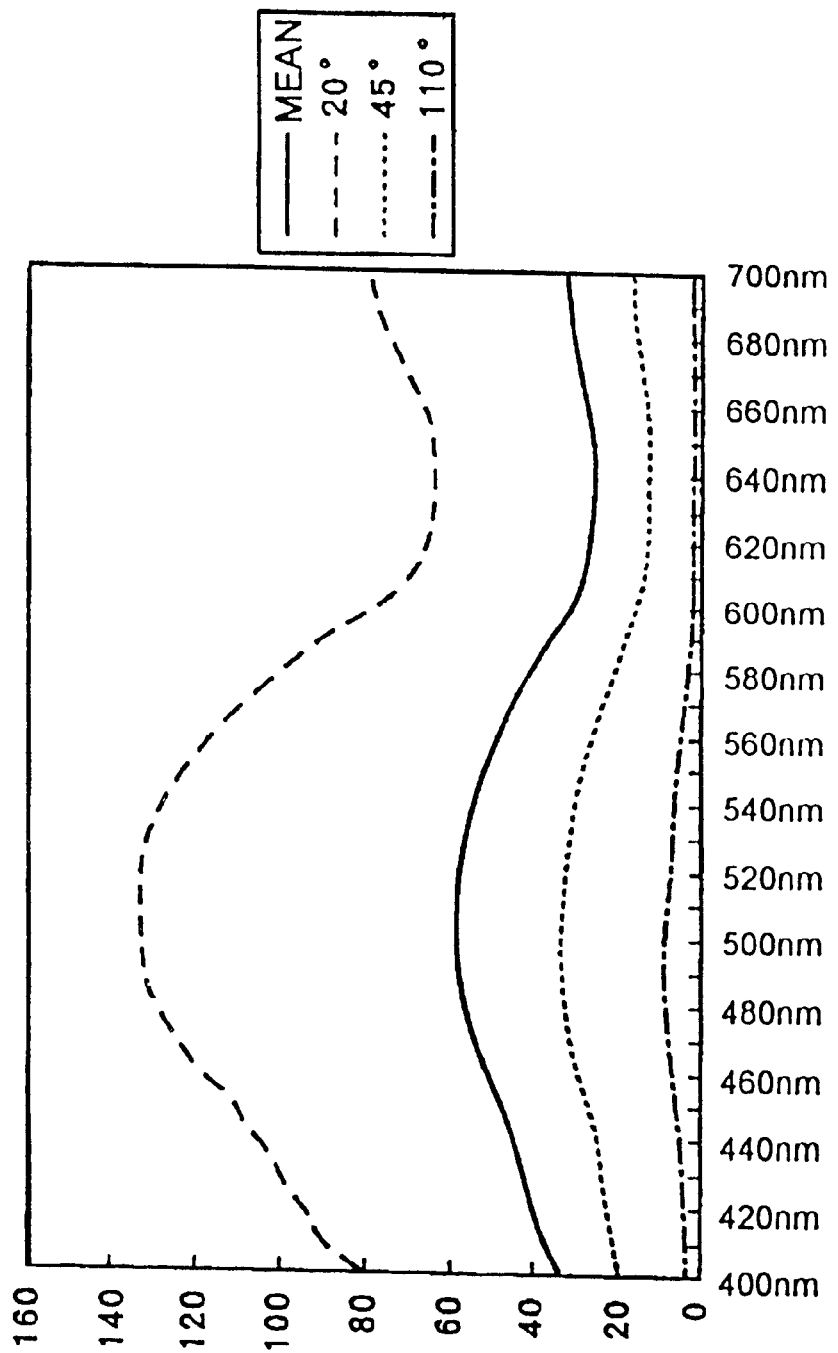
FIG. 59 is a diagram showing a eleventh example of formulation in learning data for reproducing a predicted color value.
Figure 60:
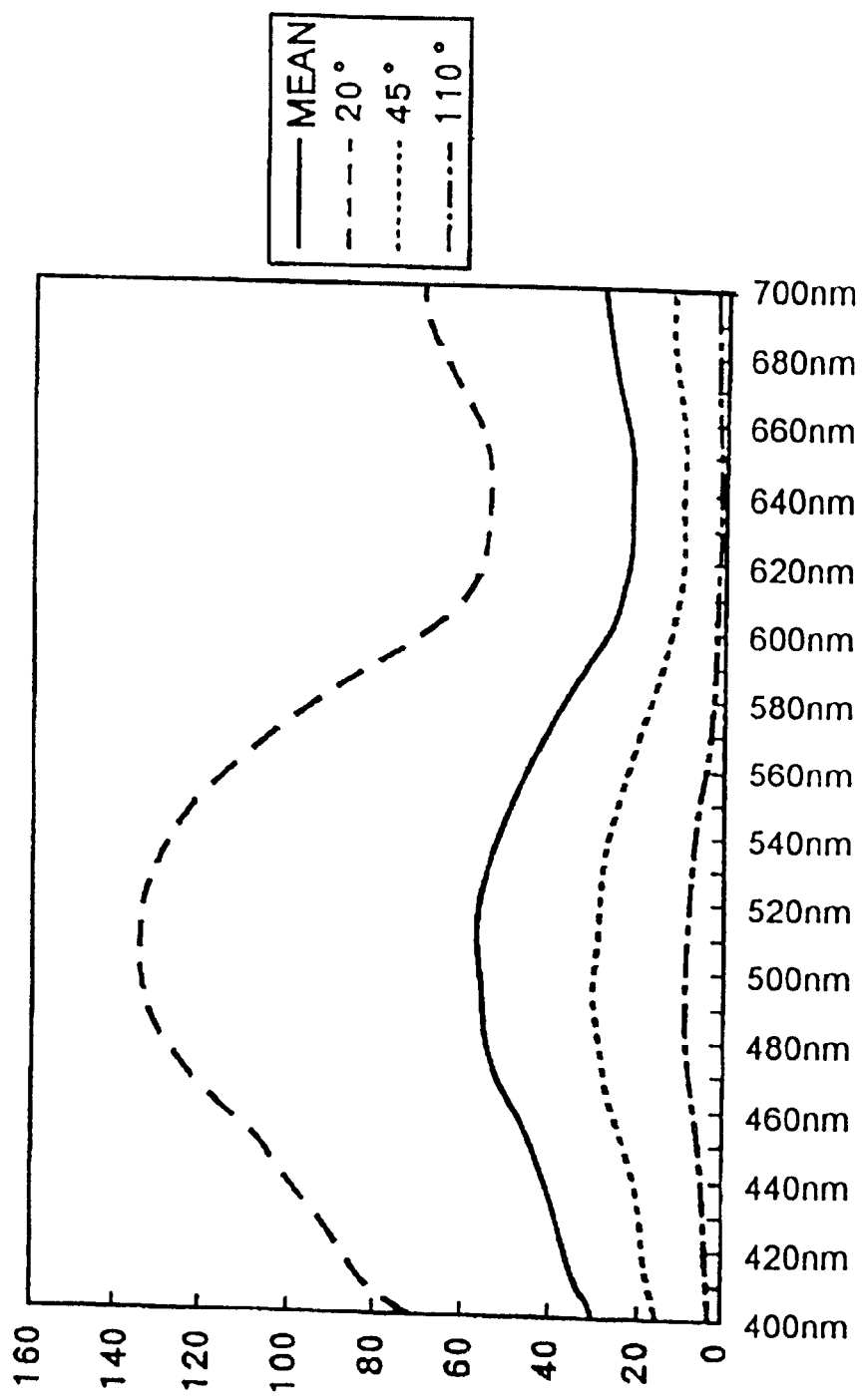
FIG. 60 is a diagram showing a twelfth example of formulation in learning data for reproducing a predicted color value.

(6) 3024 · · · 0.00%
Data 10 (FIG. 58)
(1) 3396 · · · 2.03%
(2) 3604 · · · 17.77%
(3) 3411 · · · 0.00%
(4) 3032 · · · 41.15%
(5) 3034 · · · 0.00%
(6) 3024 · · · 39.05%
Data 11 (FIG. 59)
(1) 3396 · · · 1.95%
(2) 3604 · · · 17.79%
(3) 3411 · · · 0.00%
(4) 3032 · · · 19.12%
(5) 3034 · · · 61.14%
(6) 3024 · · · 0.00%
Data 12 (FIG. 60)
(1) 3396 · · · 2.00%
(2) 3604 · · · 17.94%
(3) 3411 · · · 0.00%
(4) 3032 · · · 20.00%
(5) 3034 · · · 0.00%
(6) 3024 · · · 60.06%

The spectral reflectances of the above samples are then measured. In this spectral reflectance measurement, a goniospectrophotometer is used to measure the reflectances at 31 discrete points over the visible wavelength range (400~700 nm).

Example 1

Figure 61:
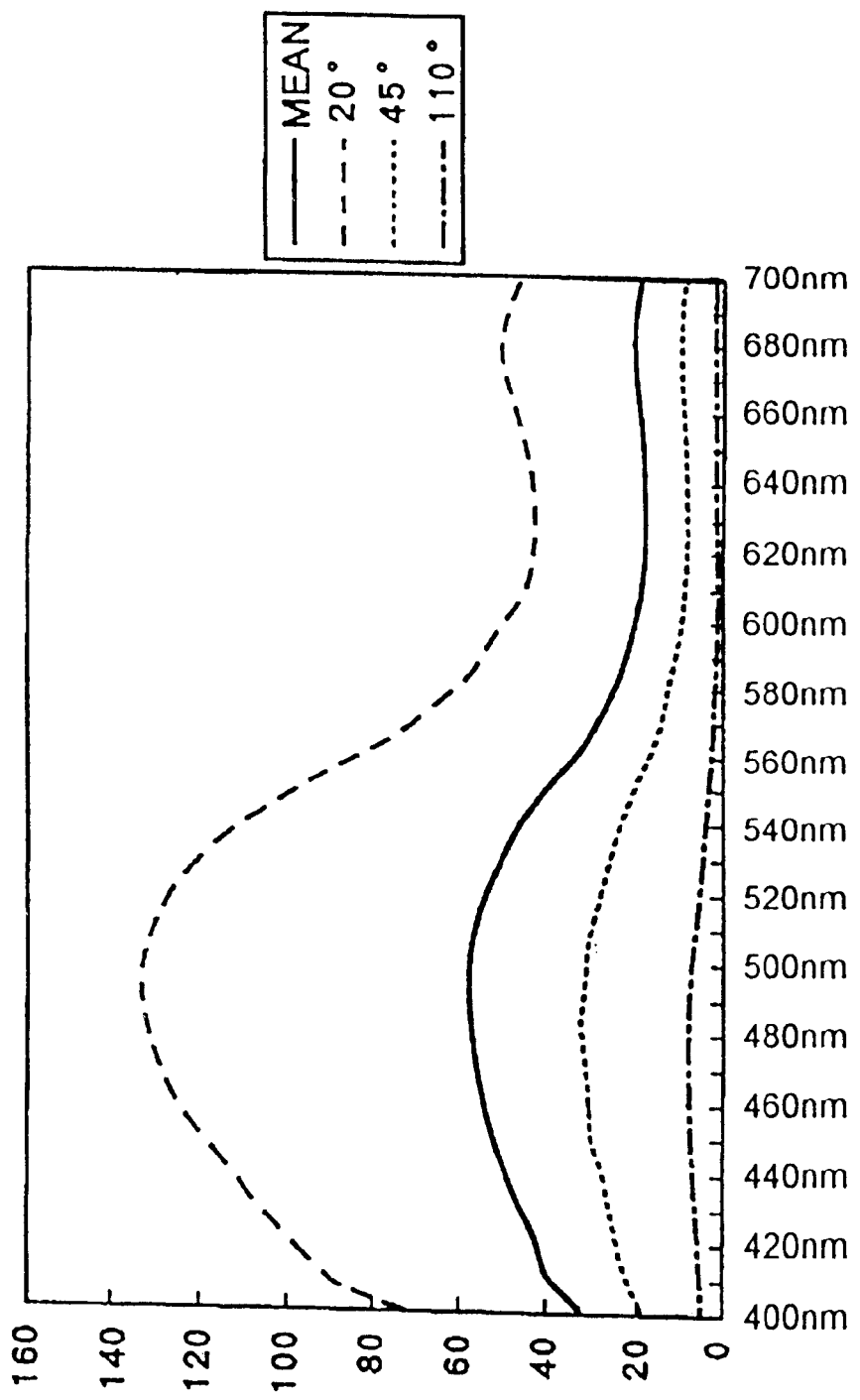
FIG. 61 is a diagrammatic representation of the colorant and metallic or pearlescent pigment formulation obtained by the method of the present invention.

The formulation results obtained by the color matching computation were as follows (FIG. 61).
(1) 3396 · · · 13.96%
(2) 3604 · · · 5.89%
(3) 3411 · · · 0.00%
(4) 3032 · · · 33.22%
(5) 3034 · · · 18.90%
(6) 3024 · · · 22.35%

The $L^*$ $a^*$ $b^*$ values at the respective angles were as follows.

| | | | |
|---|---|---|---|
| Mean | $L^* = 68.66$, | $a^* = -26.23$, | $b^* = -14.80$ |
| 20° | $L^* = 96.74$, | $a^* = -34.55$, | $b^* = -17.20$ |
| 45° | $L^* = 52.55$, | $a^* = -22.46$, | $b^* = -15.41$ |
| 110° | $L^* = 24.27$, | $a^* = -12.02$, | $b^* = -15.35$ |

The formulation of the target coated plate was as follows (FIG. 62)
(1) 3396 · · · 14.00%
(2) 3604 · · · 6.00%
(3) 3411 · · · 0.00%
(4) 3032 · · · 50.00%
(5) 3034 · · · 0.00%
(6) 3024 · · · 30.00%

The $L^*$ $a^*$ $b^*$ values at the respective angles were as follows.

| | | | |
|---|---|---|---|
| Mean | $L^* = 69.55$, | $a^* = -24.68$, | $b^* = -13.93$ |
| 20° | $L^* = 97.63$, | $a^* = -32.17$, | $b^* = -16.05$ |
| 45° | $L^* = 53.88$, | $a^* = -21.53$, | $b^* = -14.62$ |
| 110° | $L^* = 25.23$, | $a^* = -12.61$, | $b^* = -14.69$ |

Example 2

A coated plate was prepared in accordance with the results of formulation of Example 1 and a correction computation was performed.

Figure 63:
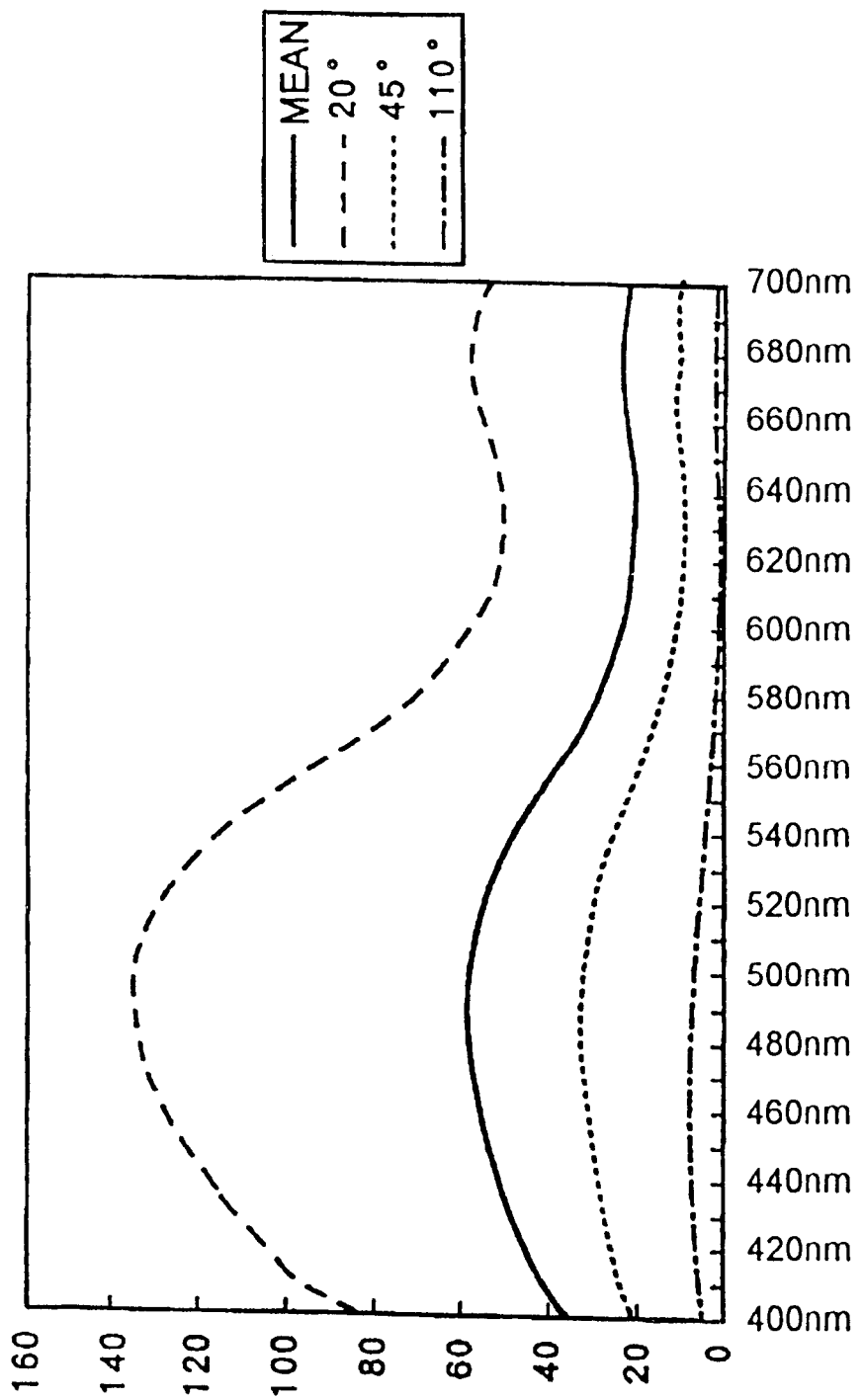
FIG. 63 is a diagrammatic representation of the colorant and metallic or pearlescent pigment formulation obtained by correction computation in accordance with the invention.

The results of formulation thus obtained were as follows (FIG. 63).
(1) 3396 · · · 13.20%
(2) 3604 · · · 5.44%
(3) 3411 · · · 0.27%
(4) 3032 · · · 47.68%
(5) 3034 · · · 1.88%
(6) 3024 · · · 30.23%

The $L^*$ $a^*$ $b^*$ values at the respective angles were as follows.

| | | | |
|---|---|---|---|
| Mean | $L^* = 70.36$, | $a^* = -23.55$, | $b^* = -13.56$ |
| 20° | $L^* = 98.95$, | $a^* = -30.74$, | $b^* = -15.69$ |
| 45° | $L^* = 54.11$, | $a^* = -20.56$, | $b^* = -14.23$ |
| 110° | $L^* = 25.04$, | $a^* = -11.68$, | $b^* = -14.29$ |

Figure 62:
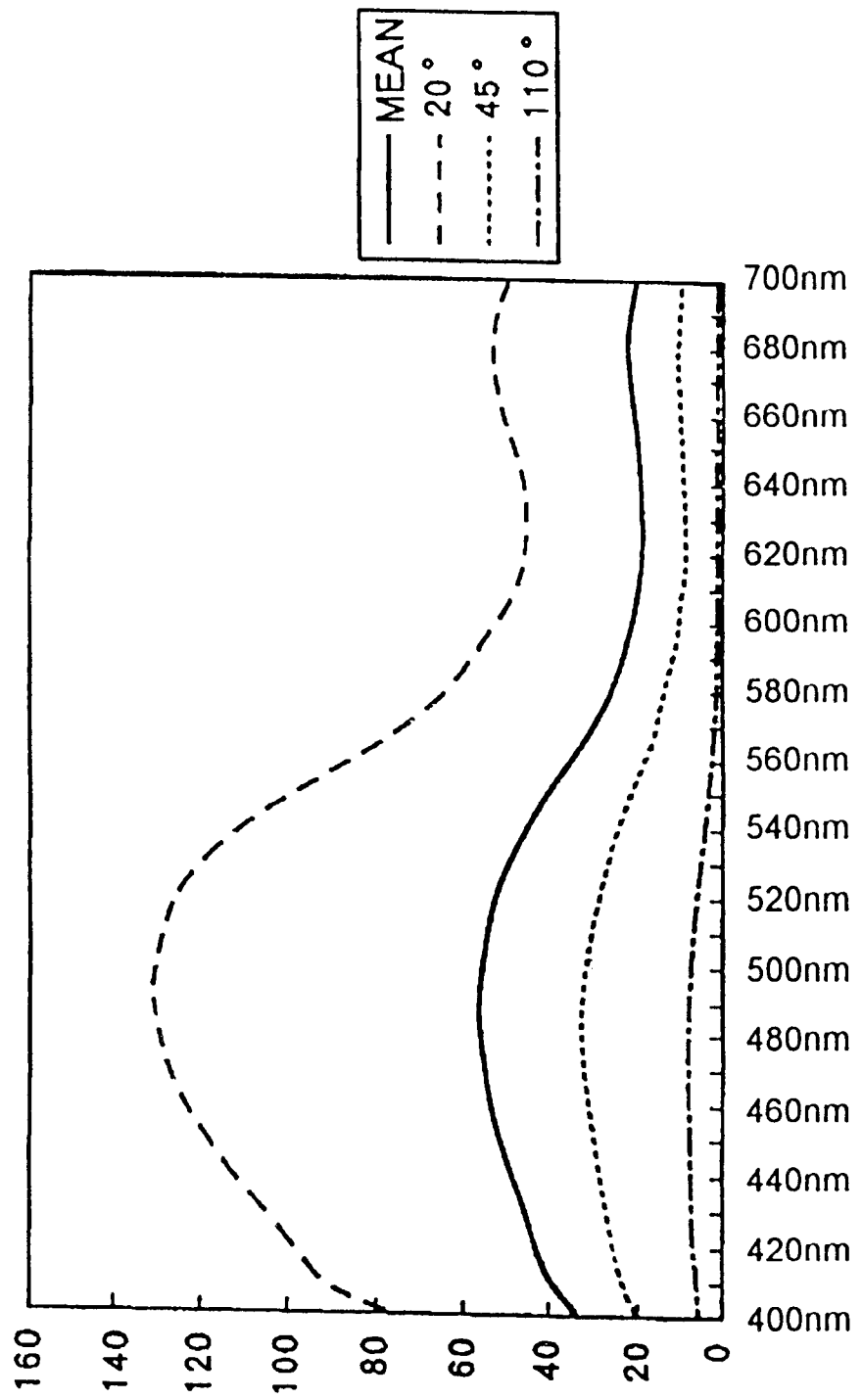
FIG. 62 is a diagrammatic representation of the colorant and metallic or pearlescent pigment formulation of an target coated sheet.

The formulation of the target coated plate was as follows (FIG. 62).
(1) 3396 · · · 14.00%
(2) 3604 · · · 6.00%
(3) 3411 · · · 0.00%
(4) 3032 · · · 50.00%
(5) 3034 · · · 0.00%
(6) 3024 · · · 30.00%

The $L^*$ $a^*$ $b^*$ values at the respective angles were as follows.

| | | | |
|---|---|---|---|
| Mean | $L^* = 69.55$, | $a^* = -24.68$, | $b^* = -13.93$ |
| 20° | $L^* = 97.63$, | $a^* = -32.17$, | $b^* = -16.05$ |
| 45° | $L^* = 53.88$, | $a^* = -21.53$, | $b^* = -14.62$ |
| 110° | $L^* = 25.23$, | $a^* = -12.61$, | $b^* = -14.69$ |

System Used

The specifications of the goniospectrophotometer used in those examples were as follows.
MacBeth AE-741

Measuring light source: 360 nm~750 nm pulse xenon lamp

Measuring wavelength range: 360 nm~750 nm

Wavelength interval: 10 nm

Figure 64:
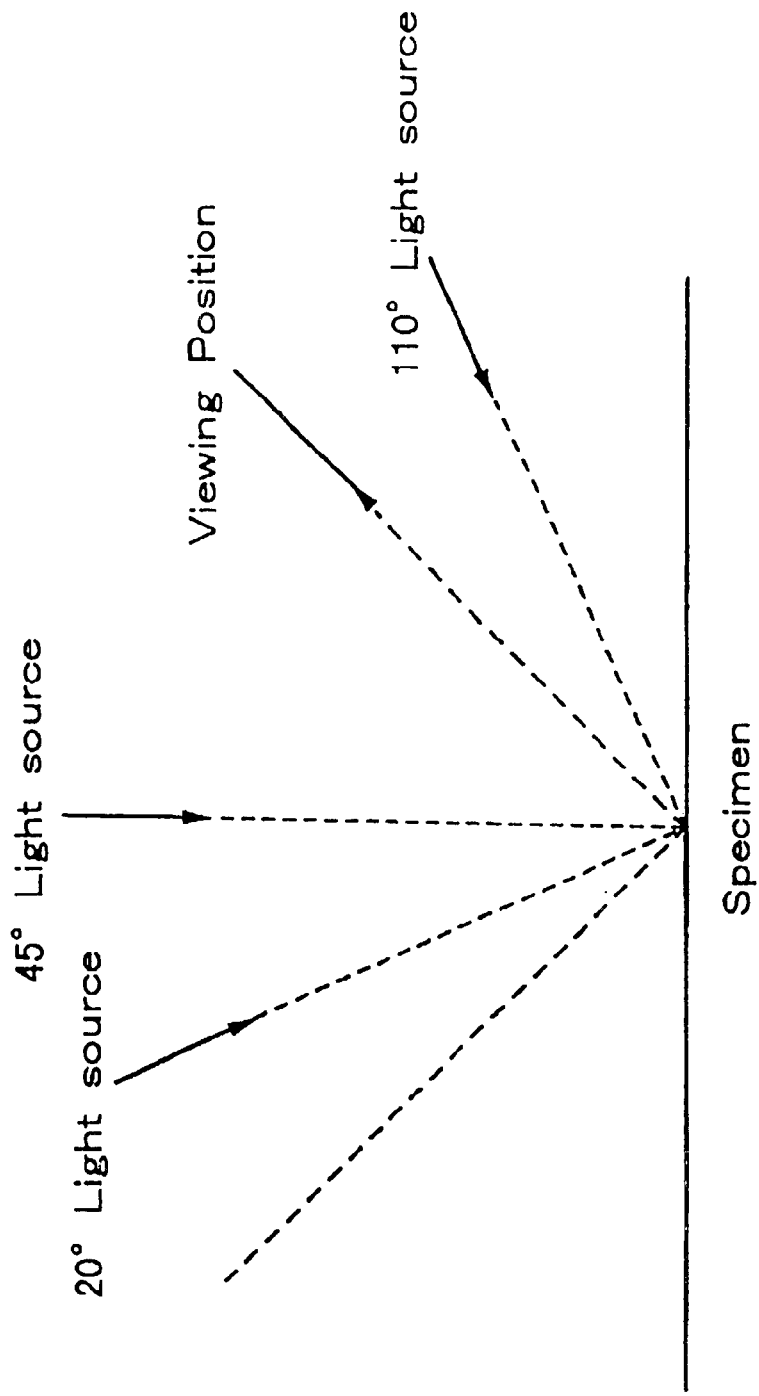
FIG. 64 is a schematic front view showing the measurement of a sample for the method of the present invention.

Measuring angles: 20°, 45°, 110° (FIG. 64)

In the conventional color matching of a metallic or pearlescent coating composition, a computational means for finding the formulation of colorants and metallic or pearlescent pigments necessary to reproduce the desired chromaticity and luster has not been implemented in the CCM system so that in order to find a well-matching formulation in both hue and luster, it is necessary to repeat CCM several times or perform color matching on a trial-and-error basis using visual acuity and experience. In the method of the present invention, assuming that the target color is the color formed by a colorant and a metallic or pearlescent pigment, for instance, the computation of the formulating ratio of the metallic or pearlescent pigment to the colorant, which will be well matching to the hue and luster of the target color, the reproduction spectral reflectance is predicted from the formulated metallic or pearlescent pigment and colorant so that an agreement may be obtained in spectral reflectance at various illuminating and viewing angle correlates relevant to hue or luster as measured with a goniospectrophotometer beforehand to determine an adequate colorant—metallic or pearlescent pigment formulation, with the result that the computation necessary for finding a colorant—metallic or pearlescent pigment formulation reproducing the desired luster and hue can be implemented in a computer color matching system. Therefore, it is no longer necessary to repeat the trial based on visual judgement and experience but a quick and exact color match of a metallic or pearlescent coating composition can now be realized. Of course, the present invention is applicable to the color matching of a metallic or pearlescent coating composition not containing a colorant as well and, in this case, too, the above-mentioned advantage is obtained.

What is claimed is:

1. A method for determining a formulating ratio of at least one colorant inclusive of a translucent pigment to at least one effect material like metallic or pearlescent pigment in a computer color matching of a coating composition containing said at least one effect material comprising the steps of:

measuring spectral reflectances of a plurality of coated plate specimens of varied formulating ratios of the at least one colorant to the at least one effect material to be used;

storing the resulting data in a memory of a computer in advance; and executing an algorithm for predicting reproduction goniospectral reflectances of a target color using measured spectral reflectances from the plurality of coated plate specimens representing differences in gonio-spectral reflectances caused by varying formulating ratios of the at least one colorant to said at least one effect material to find an adequate formulating ratio of the at least one colorant to said at least one effect material.

2. The method according to claim 1, further comprising the step of performing a correction computation after predicting reproduction gonio-spectral reflectances.

3. The method according to claim 1, wherein the step of measuring spectral reflectances of a plurality of coated plate specimens further comprises measuring the spectral reflectances with a goniospectrophotometer over a wavelength range and at a plurality of viewing angles.

4. The method according to claim 1, wherein said wavelength range further comprises wavelengths capable of perception by a human eye.

5. The method according to claim 3, wherein said wavelength range comprising wavelengths not capable of perception by a human eye.

6. The method according to claim 3, wherein the step of measuring spectral reflectances further comprises measuring at a plurality of viewing angles wherein observing light arrives from a fixed angle of incidence.

7. The method according to claim 3, wherein the step of measuring spectral reflectances further comprises measuring at a plurality of viewing angles wherein observing light arrives from a plurality of incidence angles.

8. The method according to claim 2, wherein the step of performing the correction computation further comprises the steps of:

generating data comprising gonio-spectral reflectance data for the target color comprising said least one colorant and said at least one effect material, formulating ratio data thereof, coating thickness data for taking into account an influence of undercoating color or substrate color, and coating thickness as measured for at least one of said plurality of coated plate specimens; and correcting for a difference between said generated data and the predicted reproduction gonio-spectral reflectances over an entire measuring wavelength range and entire angular range with a fuzzy logic algorithm to improve accuracy of color matching.

9. The method according to claim 8, wherein the step of correcting for a difference between said generated data and the predicted gonio-spectral reflectance further comprises performing a fuzzy logic algorithm applying a Mamdani fuzzy inference technique.

10. A method for determining a formulating amount of at least one effect material like metallic or pearlescent pigment in a computer color matching of a coating composition containing said effect material comprising the steps of:

measuring spectral reflectances of a plurality of coated plate specimens of varied formulating amounts of the at least one effect material to be used;

storing the resulting data in a memory of a computer in advance; and predicting reproduction gonio-spectral reflectances of a target color using measured spectral reflectances from the plurality of coated plate specimens representing differences in gonio-spectral reflectances caused by varying formulating amounts of the at least one effect material to find an adequate formulating amount of the at least one effect material.

11. The method according to claim 10, further comprising the step of performing a correction computation after said step of predicting reproduction gonio-spectral reflectances.

12. The method according to claim 10, wherein the step of measuring spectral reflectances of a plurality of coated plate specimens further comprises measuring the spectral reflectances with a goniospectrophotometer over a wavelength range and an angular range.

13. The method according to claim 12, wherein the wavelength range further comprises wavelengths capable of perception by a human eye.

14. The method according to claim 12, wherein the wavelength range further comprises wavelengths not capable of perception by a human eye.

15. The method according to claim 12, wherein the angular range further comprises a plurality of viewing angles wherein observing light arrives from a fixed angle of incidence.

16. The method according to claim 12, wherein the angular range further comprises a plurality of viewing angles wherein observing light arrives from a plurality of incidence angles.

17. The method according to claim 10, wherein the step of storing the resulting data is performed prior to the step of predicting reproduction gonio-spectral reflectances of the target color.

18. The method according to claim 11, wherein the step of performing the correction computation further comprises the steps of:

generating data comprising gonio-spectral reflectance data for the target color comprising the at least one effect material, formulating amount data thereof, coating thickness data for taking into account an influence of undercoating color or substrate color, and coating thickness as measured for at least one of said plurality of coated plate specimens; and correcting for a difference between said stored data and the predicted gonio-spectral reflectance over an entire measuring wavelength range and entire angular range with a fuzzy logic algorithm to improve the accuracy of color matching.

19. The method according to claim 18, wherein the step of correcting for a difference between said generated data and the predicted gonio-spectral reflectance further comprises performing a fuzzy logic algorithm applying a Mamdani fuzzy inference technique.

* * * * *